United States Patent
Chang et al.

(10) Patent No.: US 10,396,063 B2
(45) Date of Patent: Aug. 27, 2019

(54) CIRCUIT WITH COMBINED CELLS AND METHOD FOR MANUFACTURING THE SAME

(71) Applicant: TAIWAN SEMICONDUCTOR MANUFACTURING COMPANY LTD., Hsinchu (TW)

(72) Inventors: Fong-Yuan Chang, Hsinchu County (TW); Lee-Chung Lu, Taipei (TW); Yi-Kan Cheng, Taipei (TW); Sheng-Hsiung Chen, Hsinchu County (TW); Po-Hsiang Huang, Tainan (TW); Shun Li Chen, Tainan (TW); Jeo-Yen Lee, Taipei (TW); Jyun-Hao Chang, Kaohsiung (TW); Shao-Huan Wang, Taichung (TW); Chien-Ying Chen, Chiayi (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 15/264,168

(22) Filed: Sep. 13, 2016

(65) Prior Publication Data
US 2017/0345809 A1  Nov. 30, 2017

Related U.S. Application Data

(60) Provisional application No. 62/343,553, filed on May 31, 2016.

(51) Int. Cl.
  *H01L 27/02* (2006.01)
  *G06F 17/50* (2006.01)
  *H01L 27/118* (2006.01)

(52) U.S. Cl.
  CPC ........ *H01L 27/0207* (2013.01); *G06F 17/505* (2013.01); *H01L 27/11807* (2013.01)

(58) Field of Classification Search
  CPC ............. H01L 27/1104; H01L 27/0207; H01L 2924/0002; H01L 23/528; H01L 2924/00
  See application file for complete search history.

(56) References Cited

U.S. PATENT DOCUMENTS

| | | | |
|---|---|---|---|
| 8,421,205 B2 | 4/2013 | Yang | |
| 8,601,416 B2 | 12/2013 | Kuo et al. | |
| 8,661,389 B2 | 2/2014 | Chern et al. | |
| 8,698,205 B2 | 4/2014 | Tzeng et al. | |
| 8,762,900 B2 | 6/2014 | Shin et al. | |
| 8,775,993 B2 | 7/2014 | Huang et al. | |
| 8,826,212 B2 | 9/2014 | Yeh et al. | |

(Continued)

*Primary Examiner* — Tony Tran
(74) *Attorney, Agent, or Firm* — Juan Carlos A. Marquez; Marquez IP Law Office, PLLC

(57) ABSTRACT

In some embodiments, a first cell layout and a second cell layout are provided and combined into a third cell layout. Each of the first cell layout and the second cell layout includes a higher power line, a lower power line, an output pin, at least one up transistor and at least one down transistor formed to electrically couple the output pin to the higher power line and the output pin to the lower power line, respectively. The at least one up transistor and the at least one down transistor of the second cell layout include a gate line. For the combining, the gate line is non-selectively electrically coupled to the output pin of the first cell layout to form a first node. A design layout in which the third cell layout is used at different locations is generated.

8 Claims, 50 Drawing Sheets

(56) References Cited

U.S. PATENT DOCUMENTS

| | | |
|---|---|---|
| 8,836,141 B2 | 9/2014 | Chi et al. |
| 8,875,076 B2 | 10/2014 | Lin et al. |
| 8,887,116 B2 | 11/2014 | Ho et al. |
| 8,943,445 B2 | 1/2015 | Chen et al. |
| 8,990,762 B2 | 3/2015 | Yuh et al. |
| 9,081,933 B2 | 7/2015 | Liu et al. |
| 9,147,029 B2 | 9/2015 | Ke et al. |
| 9,183,341 B2 | 11/2015 | Chen et al. |
| 9,213,790 B2 | 12/2015 | Hsu et al. |
| 2014/0237435 A1 | 8/2014 | Chen et al. |
| 2014/0264924 A1 | 9/2014 | Yu et al. |
| 2014/0282289 A1 | 9/2014 | Hsu et al. |
| 2014/0304670 A1 | 10/2014 | Su et al. |
| 2015/0278419 A1 | 10/2015 | Yang et al. |
| 2015/0279453 A1 | 10/2015 | Fujiwara et al. |
| 2015/0318241 A1 | 11/2015 | Chang et al. |
| 2015/0347659 A1 | 12/2015 | Chiang et al. |
| 2015/0357279 A1 | 12/2015 | Fujiwara et al. |
| 2015/0370937 A1 | 12/2015 | Liu et al. |
| 2015/0370945 A1 | 12/2015 | Lee |
| 2016/0012169 A1 | 1/2016 | Chiang et al. |

208

310 — Combining a first source or drain region of at least one first up transistor in the first cell layout and a second source or drain region of at least one second up transistor in the second cell layout, and combining a third source or drain region of at least one first down transistor in the first cell layout and a fourth source or drain region of at least one second down transistor in the second cell layout to form a third cell layout 312 — Forming, in the third cell layout, a first node including a first conductive line overlapped with one of the combined first source or drain region and second source or drain region and non-selectively electrically coupled to the one of the combined first source or drain region and second source or drain region and to a higher power line, and a second conductive line in substantially the same direction as the first conductive line and non-selectively electrically coupled to the higher power line, and forming, in the third cell layout, a second node including a third conductive line overlapped with one of the combined third source or drain region and fourth source or drain region and non-selectively electrically coupled to the one of the combined third source or drain region and fourth source or drain region and to a lower power line, and a fourth conductive line in substantially the same direction as the third conductive line and non-selectively electrically coupled to the lower power line 314 — Non-selectively electrically coupling a first output pin in the third cell layout corresponding to a second output pin in the first cell layout to a first gate line in the third cell layout corresponding to a second gate line in the second cell layout to form a third node in the third cell layout

CIRCUIT WITH COMBINED CELLS AND METHOD FOR MANUFACTURING THE SAME

PRIORITY CLAIM AND CROSS-REFERENCE

This application claims priority to U.S. Provisional Application Ser. No. 62/343,553 filed on May 31, 2016, and the disclosure of which is hereby incorporated by reference in its entirety.

BACKGROUND

In an integrated circuit (IC) chip design flow, logic synthesis is a stage that creates a gate-level netlist of an IC chip design, and placement and routing is a stage that creates a design layout corresponding to the gate-level netlist. During logic synthesis, logic gates and registers in the gate-level netlist are mapped to predetermined standard cells in a library. During placement, locations of the mapped standard cells in the design layout are determined. During routing, router-routed interconnects connecting the placed standard cells in the design layout are created.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 3 is a flow chart of a method for an operation 208 in FIG. 2, in accordance with some embodiments.

DETAILED DESCRIPTION

Figure 1:
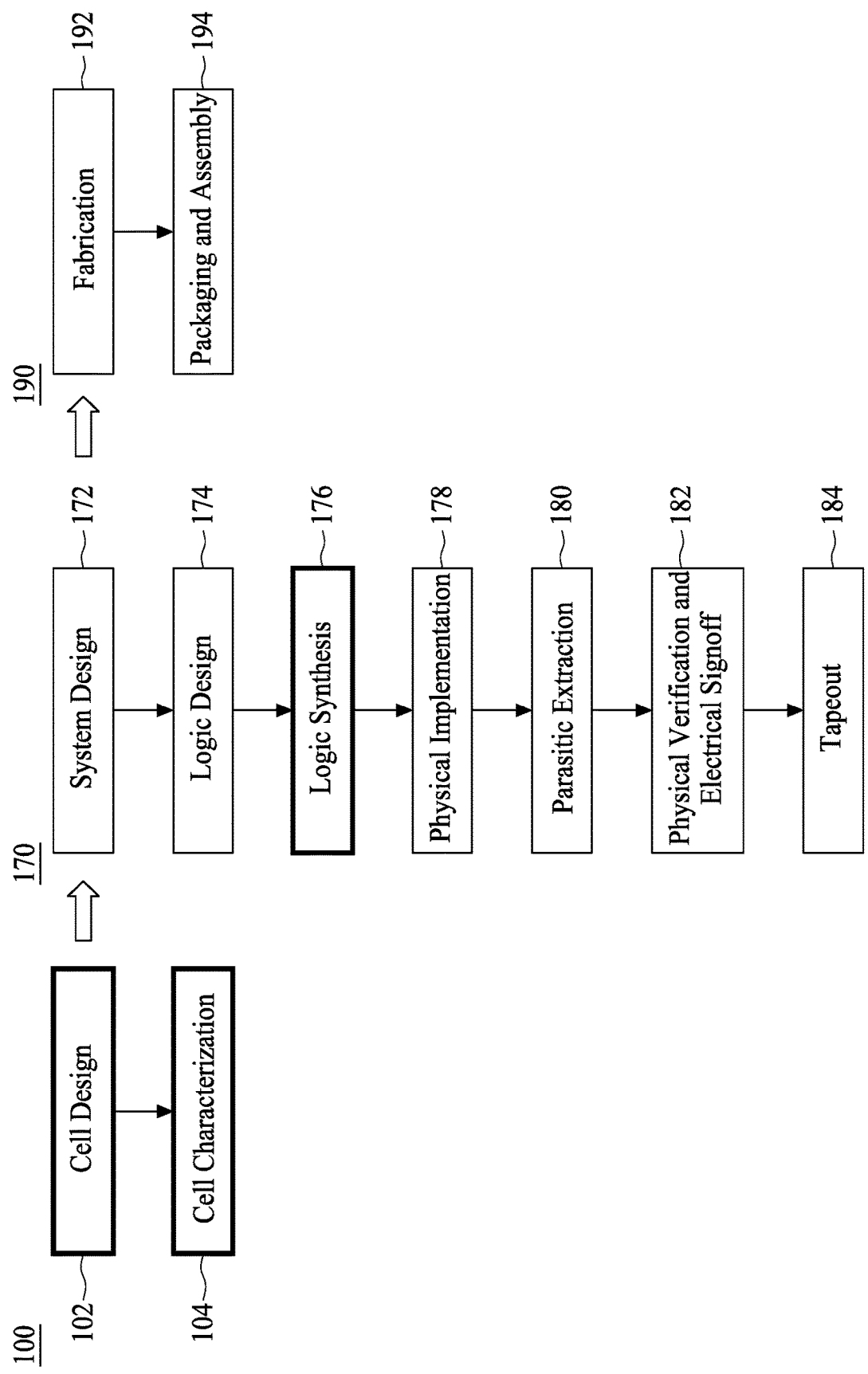
FIG. 1 is a flow chart of a cell design flow, a chip design flow and a chip manufacturing flow of an integrated circuit (IC) chip in accordance with some embodiments.

The following disclosure provides many different embodiments, or examples, for implementing different features of the provided subject matter. Specific examples of elements and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Same reference numerals among different figures indicate substantially the same elements for one of which description is applicable to the others. Like reference numerals being among related figures and differentiable only with respect to the numerals of the related figures indicate corresponding elements for one of which description is related to and/or compared to some of the others.

Spatially relative terms, such as "left" and "right", "horizontally" and "vertically" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

It will be understood when an element is referred to as being "non-selectively electrically coupled to" another element, only passive elements such as interconnects may exist in a conductive path from the element to the other element. When an element is referred to as being "electrically coupled to" another element, passive elements such as interconnects and/or active elements such as transistors may exist in a conductive path from the element to the other element.

The term "netlist" refers to a graphical-based and/or a text-based representation of a circuit.

The term "router-routed interconnect" refers to interconnects created during physical implementation stage of a chip design flow and by, for example, a place-and-route (APR) tool. The term "non-router-routed interconnect" refers to interconnects created during a cell design stage of a cell design flow and not by an APR tool.

The term "substantially the same layout" refers to a first layout and a second layout which have the same labeled components.

The term "substantially a flipped layout" refers to a first layout and a second cell layout flipped with respect to the first cell layout which have correspondingly labeled components.

Combined Cells Layouts Used During Logic Synthesis Stage and Circuit Manufactured Based on the Same FIG. 1 is a flow chart of a cell design flow 100, a chip design flow 170 and a chip manufacturing flow 190 of an integrated circuit (IC) chip in accordance with some embodiments. The cell design flow 100 generates combined cell layouts in a cell design stage 102 and sets an attribute of the combined cells in a cell characterization stage. The chip design flow 170 uses the combined cell layouts based on the attribute of the combined cells during a logic synthesis stage 176.

The cell design flow 100 provides physical design of cells and abstraction of the physically designed cells for the cells to be employed as building blocks in the chip design flow 170. The chip design flow 170 implements an IC chip design from a high-level specification to a physical layout which is verified for, for example, functionality, performance, and power, and is tapped out for production of masks. The flows 100 and 170 utilize one or more electronic design automation (EDA) tools to carry out one or more stages or operations in the flows 100 and 170. The chip manufacturing flow 190 manufactures the IC chip using the masks. In some embodiments, the cell design flow 100 is carried out separately from and prior to, for example, logic synthesis stage 186 of the chip design flow 150 as illustrated in FIG. 1. In other embodiments, the cell design flow 4600 is incorporated into the chip design flow 4670, which is to be described with reference to FIG. 46.

In some embodiments, the cell design flow 100 includes a cell design stage 102 and a cell characterization stage 104.

At the cell design stage 102, cell design is performed at the transistor level and the circuits of the cells are physically laid out and verified according to specifications, technology-related information, and design rules. In some embodiments, combined cells are formed at the stage 102, which is to be described with reference to FIGS. 2 to 44.

At the cell characterization stage 104, the physically implemented cells are characterized to create, for example, area characteristic, timing characteristics and power characteristics for the cells. In some embodiments, netlists of the cells, the physically implemented cells and the characteristics for the cells are collected in a standard cell library as attributes and available for use. In some embodiments, using the combined cells by adjusting attributes in the standard cell library is performed at the stage 104, which is to be described with reference to FIG. 45.

In some embodiments, the chip design flow 170 includes a system design stage 172, a logic design stage 174, a logic synthesis stage 176, a physical implementation 178, a parasitic extraction stage 180 and a physical verification and electrical signoff stage 182, and a tape out stage 184.

At the system design stage 172, the designer describes the IC chip in terms of larger modules that serve specific functions, respectively. Further, exploration for options include design architectures is performed to consider, for example, tradeoffs in optimizing design specifications and cost.

At the logic design stage 174, the modules for the IC chip are described at the register transfer level (RTL) using the VHDL or Verilog, and are verified for functional accuracy.

At the logic synthesis stage 176, the modules for the IC chip described in RTL are translated into a gate-level netlist. Technology mapping of the logic gates and registers to available cells in the created standard cell library from the cell design flow 100 also happen at this stage. In some embodiments, mapping to the combined cells in the standard cell library based on the adjusted attribute for the combined cells is performed at the stage 176, which is to be described with reference to FIG. 45.

At the physical implementation stage 178, the gate-level netlist is partitioned into blocks and a floorplan for the blocks is created for a design layout. Mapped cells of logic gates and registers in the blocks are placed at specific locations in the design layout. Router-routed interconnects connecting the placed cells are created. In some embodiments, during placement and routing, total wire length, wiring congestion and/or timing are optimized. Using the combined cells facilitates such optimization.

At the parasitic extraction stage 180, a physical netlist is extracted from the design layout. The physical netlist includes parasitics such as parasitic resistors and capacitors introduced by the interconnects to the cells.

At the physical verification and electrical signoff stage 182, timing analysis and post-route optimization are performed on the physical netlist to ensure timing closure. The design layout is checked to ensure clean of, for example, design rule check (DRC) issues, layout versus schematic issues (LVS) and electrical rule check (ERC) issues. Incremental fixing can be performed to achieve electrical signoff of the IC design.

At the tapeout stage 184, the design layout is checked to ensure clean of, for example, photolithography issues and is modified using, for example, optical proximity correction (OPC) techniques. For each layer in the final design layout, a corresponding photomask, for example, is created for manufacturing of the IC chip. In some embodiments to be described with reference to FIGS. 4 to 44, a layout includes an effective layer that is formed by a result of a difference operation on a layer and a cut layer for which two corresponding photomasks are created.

In some embodiments, the chip manufacturing flow 190 includes a fabrication stage 192 and a packaging and testing stage 194.

At the fabrication stage 192, each photomask is used, for example, for one patterning operation for forming a feature of ICs, such as gate lines of transistors, source or drain regions for the transistors, metal lines for interconnects and vias for the interconnects, on a wafer.

At the packaging and assembly stage 194, ICs on the wafer are diced into IC chips and are packaged considering, for example, protection from mechanical damaging, cooling, electromagnetic interference and protection from electrostatic discharge. An IC chip may be assembled with other components for use.

The cell design flow 100, the chip design flow 170 and the chip manufacturing flow 190 in FIG. 1 are exemplary. Other sequences of the stages or sequences of operations in the stages, or additional stages or operations before, between or after the stages shown are within the applicable scope of the present disclosure.

Method for Forming Combined Cell Layouts

Figure 2:
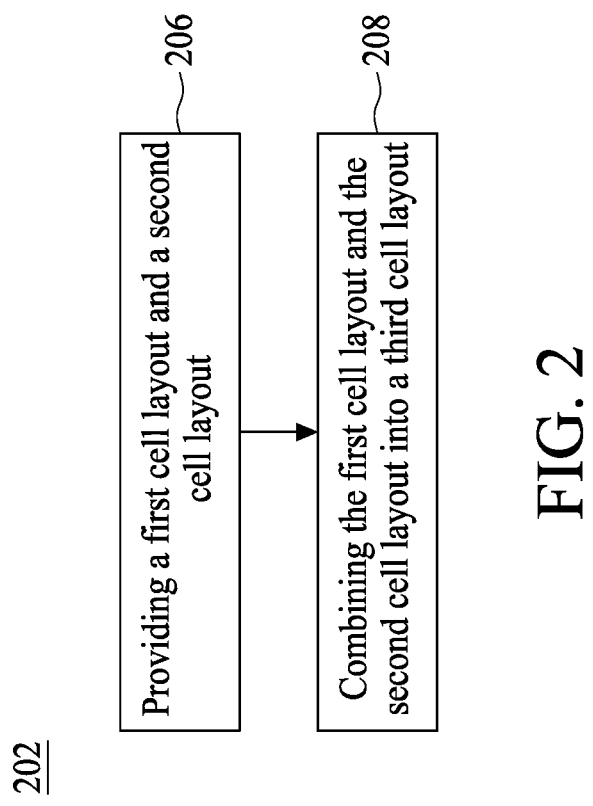
FIG. 2 is a flow chart of a method for combining cells in the cell design stage in FIG. 1, in accordance with some embodiments.

FIG. 2 is a flow chart of a method 202 for combining cells in the cell design stage 102 in FIG. 1, in accordance with some embodiments. In operation 206, a first cell layout and a second cell layout are provided. In operation 208, the first cell layout and the second cell layout are combined into a third cell layout.

FIG. 3 is a flow chart of a method for the operation 208 in FIG. 2, in accordance with some embodiments. In operation 310, a first source or drain region of at least one first up transistor in the first cell layout is combined with a second source or drain region of at least one second up transistor in the second cell layout, and a third source or drain region of at least one first down transistor in the first cell layout is combined with a fourth source or drain region of at least one second down transistor in the second cell layout to form a third cell layout. In operation 312, a first node and a second node are formed in the third cell layout. The first node includes a first conductive line and a second conductive line. The first conductive line is overlapped with one of the combined first source or drain region and the second source or drain region and non-selectively electrically coupled to the one of the combined first source or drain region and the second source or drain region and to a higher power line. The second conductive line is in substantially the same direction as the first conductive line and non-selectively electrically coupled to the higher power line. The second node includes a third conductive line and a fourth conductive line. The third conductive line is overlapped with one of the combined third source or drain region and the fourth source or drain region and non-selectively electrically coupled to the one of the combined third source or drain region and the fourth source or drain region and to a lower power line. The fourth conductive line is in substantially the same direction as the third conductive line and non-selectively electrically coupled to the lower power line. In operation 314, a first output pin in the third cell layout corresponding to a second output pin in the first cell layout is non-selectively electrically coupled to a first gate line in the third cell layout corresponding to a second gate line in the second cell layout to form a third node in the third cell layout.

Figure 4:
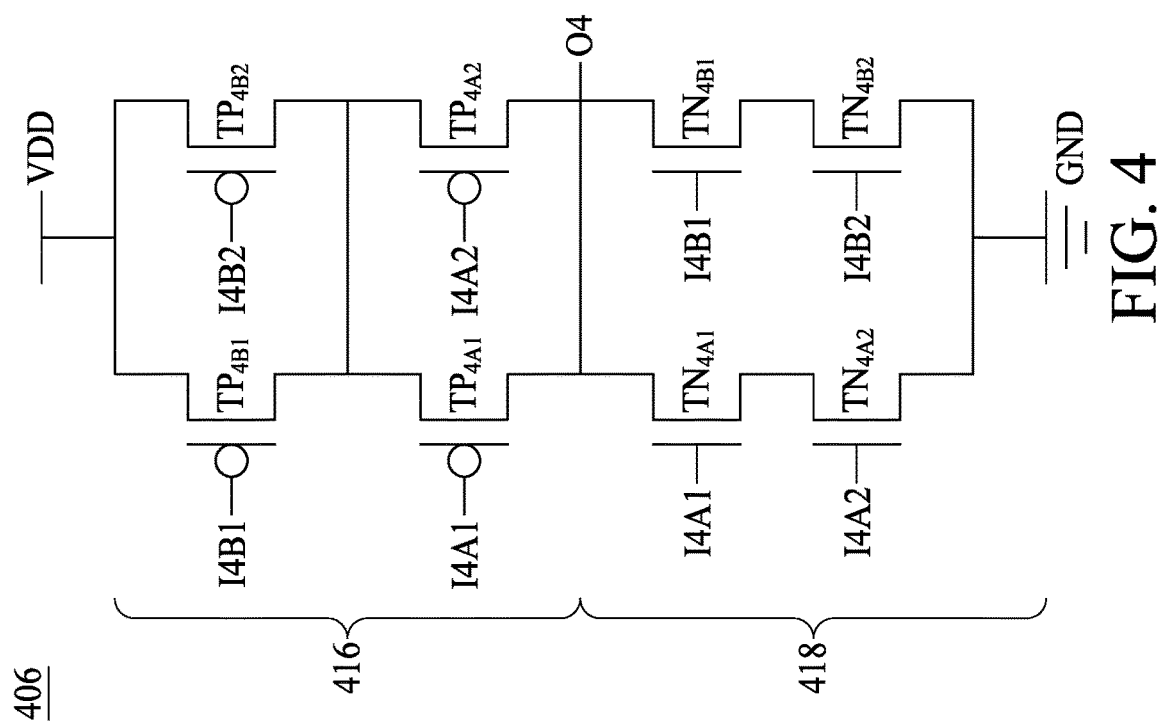
FIG. 4 is a schematic circuit diagram of an AOI22D1 gate, in accordance with some embodiments.

Combined Cell Layouts Through Joining to Joint Portion and Circuit Manufactured Based on the Same FIG. 4 is a schematic circuit diagram of an AOI22D1 gate 406, in accordance with some embodiments. The AOI22D1 gate 406 corresponds to the first cell layout in operation 206. In the AOI22D1 gate 406, an output pin O4 is electrically coupled to a high power node VDD through at least one first up transistor 416 and to a lower power node GND through the at least one first down transistor 418.

The AOI22D1 gate 406 includes at least one first up transistor 416 and at least one first down transistor 418. The at least one first up transistor 416 includes p-channel field effect transistors (PFETs) $TP_{4A1}$, $TP_{4A2}$, $TP_{4B1}$ and $TP_{4B2}$. The at least one first down transistor 418 includes n-channel field effect transistors (NFETs) $TN_{4A1}$, $TN_{4A2}$, $TN_{4B1}$ and $TN_{4B2}$.

Sources of the PFETs $TP_{4B1}$ and $TP_{4B2}$ are non-selectively electrically coupled to a high power node VDD. The PFETs $TP_{4B1}$ and $TP_{4B2}$ are coupled in parallel. The PFETs $TP_{4A1}$ and $TP_{4A2}$ are coupled in parallel. The parallel coupled PFETs $TP_{4B1}$ and $TP_{4B2}$ and the parallel coupled PFETs $TP_{4A1}$ and $TP_{4A2}$ are coupled in series such that the drains of the parallel coupled PFETs $TP_{4B1}$ and $TP_{4B2}$ are non-selectively electrically coupled to the sources of the parallel coupled PFETs $TP_{4A1}$ and $TP_{4A2}$.

Sources of the NFETs $TN_{4A2}$ and $TN_{4A2}$ are non-selectively electrically coupled to a lower power node GND. The NFETs $TN_{4A2}$ and $TN_{4A1}$ are coupled in series such that a drain of the NFET $TN_{4A2}$ is coupled to a source of the NFET $TN_{4A1}$. The NFETs $TN_{4B2}$ and $TN_{4B1}$ are coupled in series such that a drain of the NFET $TN_{4B2}$ is coupled to a source of the NFET $TN_{4B1}$. The serially coupled NFETs $TN_{4A2}$ and $TN_{4A1}$ and the serially coupled NFETs $TN_{4B2}$ and $TN_{4B1}$ are coupled in parallel.

Drains of the PEFTs $TP_{4A1}$ and $TP_{4A2}$ and drains of the NEFTs $TN_{4A1}$ and $TN_{4B1}$ are non-selectively electrically coupled to an output pin O4. In this way, the output pin O4 is electrically coupled to the higher power node VDD through the at least one first up transistor 416 and electrically coupled to the lower power node GND through the at least one first down transistor 418. Gates of the PFET $TP_{4A1}$ and NFET $TN_{4A1}$, the PFET $TP_{4A2}$ and NFET $TN_{4A2}$, the PFET $TP_{4B1}$ and NFET $TN_{4B1}$, and the PFET $TP_{4B2}$ and NFET $TN_{4B2}$ are non-selectively electrically coupled to corresponding input pins I4A1, I4A2, I4B1 and I4B2.

Figure 5:
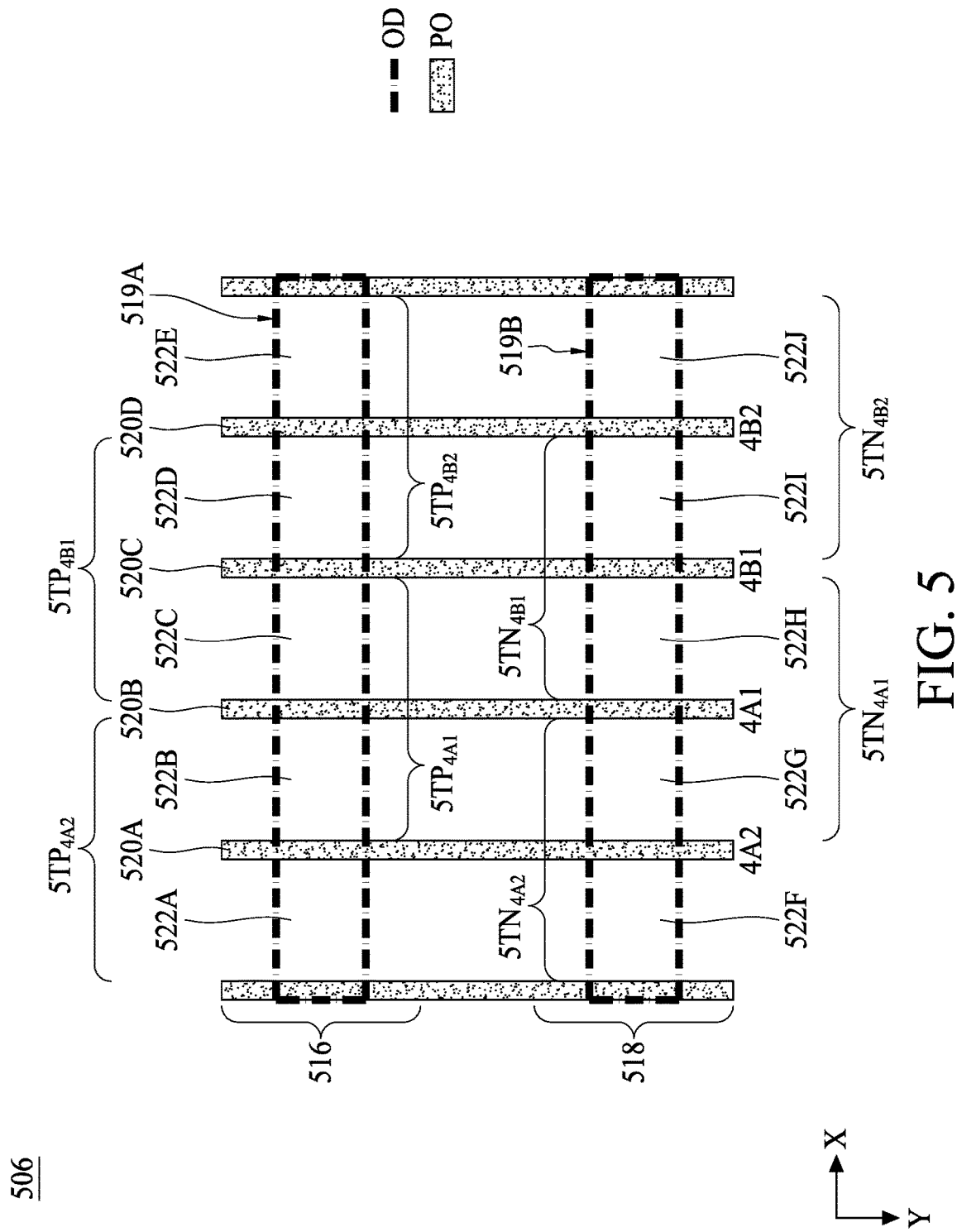
FIG. 5 is a diagram of a layout portion of the AOI22D1 gate in FIG. 4, in accordance with some embodiments.

FIG. 5 is a diagram of a layout portion 506 of the AOI22D1 gate 406 in FIG. 4, in accordance with some embodiments. The first cell layout in operation 206 includes the layout portion 506. In the layout portion 506, horizontal relationships of an OD layer and PO layer are shown. In the layout portion 506, at least one first up transistor 516 corresponds to the at least one first up transistor 416 in FIG. 4 and at least one first down transistor 518 corresponds to the at least one first down transistor 418 in FIG. 4.

The layout portion 506 has shapes in an OD layer substantially along an X direction and a PO layer substantially along a Y direction orthogonal to the X direction. The PO layer of the layout portion 506 includes a plurality of gate lines 520A to 520D, and the OD layer of the layout portion 506 includes a plurality of OD regions 519A and 519B. The gate lines 520A to 520D divide the OD region 519A into source or drain regions 522A to 522E. The gate lines 520A to 520D divide the OD region 519B into source or drain regions 522F to 522J.

The layout portion 506 has at least one first up transistor 516 corresponding to the at least one first up transistor 416 in FIG. 4 and at least one first down transistor 518 corresponding to the at least one first down transistor 418 in FIG. 4. A PFET $5TP_{4A2}$ includes a portion of the gate line 520A corresponding to the at least one first up transistor 516 and the source or drain regions 522A and 522B on opposite sides of the gate line 520A. A PFET $5TP_{4A1}$ includes a portion of the gate line 520B corresponding to the at least one first up transistor 516 and the source or drain regions 522B and 522C on opposite sides of the gate line 520B. A PFET $5TP_{4B1}$ includes a portion of the gate line 520C corresponding to the at least one first up transistor 516 and the source or drain regions 522C and 522D on opposite sides of the gate line 520C. A PFET $5TP_{4B2}$ includes a portion of the gate line 520D corresponding to the at least one first up transistor 516 and the source or drain regions 522D and 522E on opposite sides of the gate line 520D. An NFET $5TN_{4A2}$ includes a portion of the gate line 520A corresponding to the at least one first down transistor 518 and the source or drain regions 522F and 522G on opposite sides of the gate line 520A. An NFET $5TN_{4A1}$ includes a portion of the gate line 520B corresponding to the at least one first down transistor 518 and the source or drain regions 522G and 522H on opposite sides of the gate line 520B. An NFET $5TN_{4B1}$ includes a portion of the gate line 520C corresponding to the at least one first up transistor 518 and the source or drain regions 522H and 522I on opposite sides of the gate line 520C. An NFET $5TN_{4B2}$ includes a portion of the gate line 520D corresponding to the at least one first down transistor 518 and the source or drain regions S22I and 522J on opposite sides of the gate line 520D.

For simplicity, only a subscript of a PFET and an NFET exemplarily shown in FIG. 5 is labeled under a gate line hereafter, based on which labels of the PFET and the NFET and their components are implied and are for referred to. For example, a subscript 4A2 of the PFET $5TP_{4A2}$ and the NFET $5TN_{4A2}$ is labeled under the gate line 520A. Based on a reference numeral of a first cell layout 506 or second cell layout 1206, or a reference numeral of a layout portion (e.g. 1508) in the third cell layout 1708, and on the subscript 4A2, a label $5TG_{4A2}$ of a gate line 520A is implied and is for referred to. Further, a label $5TP_{4A2}$ of the PFET $5TP_{4A2}$, a label $5TPL_{4A2}$ of the source or drain region 522A corresponding to the PFET $5TP_{4A2}$ and on the left of the gate line $5TG_{4A2}$ and a label $5TPR_{4A2}$ of the source or drain region 522B corresponding to the PFET $5TP_{4A2}$ and on the right of the gate line $5TG_{4A2}$ are implied and are for referred to. Further, a label $5TN_{4A2}$ of the NFET $5TN_{4A2}$, a label $5TNL_{4A2}$ of the source or drain region 522F corresponding to the NFET $5TN_{4A2}$ and on the left of the gate line $5TG_{4A2}$ and a label $5TNR_{4A2}$ of the source or drain region 522G corresponding to the NFET $5TN_{4A2}$ and on the right of the gate line $5TG_{4A2}$ are implied and are for referred to.

Figure 6:
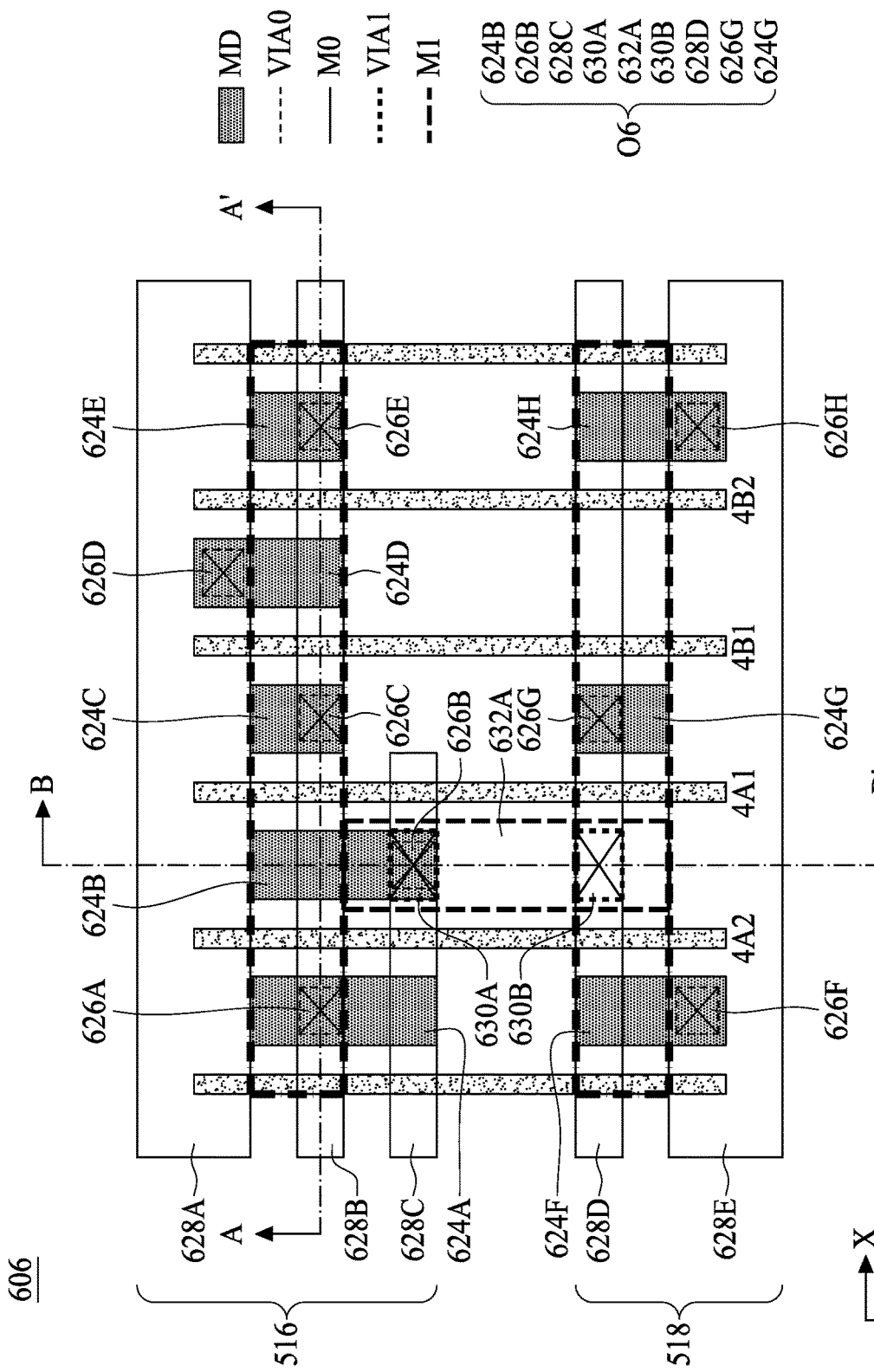
FIG. 6 is a diagram of a layout portion of the AOI22D1 gate in FIG. 4, in accordance with some embodiments.

FIG. 6 is a diagram of a layout portion 606 of the AOI22D1 gate 406 in FIG. 4, in accordance with some embodiments. The first cell layout in operation 206 includes the layout portion 606. In the layout portion 606, horizontal relationships of an effective MD layer, a VIA0 layer, an effective M0 layer, a VIA1 layer and an M1 layer in addition to the OD layer, the PO layer in FIG. 5 are shown. In the layout portion 606, an output pin O6 corresponds to the output pin O4 in FIG. 4, a first higher power line 628A corresponds to the higher power node VDD in FIG. 4, and a first lower power line 628E corresponds to the lower power node GND in FIG. 4. The output pin O6 is electrically coupled to the first higher power line 628A through the at least one first up transistor 516 labeled in FIG. 5 and to the first lower power line 628E through the at least one first down transistor 518 labeled in FIG. 5.

In addition to the layout portion 506, the layout portion 606 has shapes in an effective MD layer substantially along the Y direction, a VIA0 layer, an effective M0 layer substantially along the X direction, a VIA1 layer and an M1 layer substantially along the Y direction. The effective MD layer of the layout portion 606 includes a plurality of conductive lines 624A to 624H. The VIA0 layer of the layout portion 606 includes a plurality of conductive vias 626A to 626H. The effective M0 layer of the layout portion 606 includes a first higher power line 628A, a first lower power line 628E and a plurality of conductive lines 628B to 628D. The VIA1 layer of the layout portion 606 includes plurality of conductive vias 630A to 630B. The M1 layer of the layout portion 606 includes a conductive line 632A.

In some embodiments, the effective MD layer is a result of a difference operation of an actual MD layer (not shown) and a first cut layer (not shown). For example, the actual MD layer includes conductive lines running across the at least one first up transistor 516 and the at least one first down transistor 518. The first cut layer cuts the conductive lines in the actual MD layer into the conductive lines 624A to 624E for the at least one first up transistor 516 and the conductive lines 624F to 624H for the at least one first down transistor 518. The term "the effective MD layer" used throughout the present disclosure refers to the effective MD layer implemented by a single MD layer and also to the effective MD layer implemented by the actual MD layer and the first cut layer.

The source or drain region 522D in FIG. 5 is shared between the PFETs $5TP_{4B1}$ and $5TP_{4A2}$. The source or drain region 522D is non-selectively electrically coupled to the first higher power line 628A through the conductive line 624D and the conductive via 626D. The conductive line 624D overlaps with the source or drain region 522D. The first higher power line 628A overlaps with the conductive line 624D. The conductive via 626D is located at where the first higher power line 628A overlaps with the conductive line 624D. The source or drain region 522D corresponds to the sources of the PFETs $TP_{4B1}$ and $TP_{4B2}$ which are non-selectively electrically coupled to the higher power node VDD.

The source or drain regions 522C and 522E in FIG. 5 are non-selectively electrically coupled to the conductive line 628B through the corresponding conductive lines 624C and 624E and the corresponding conductive vias 626C and 626E. The conductive lines 624C and 624E overlap with the corresponding source or drain regions 522C and 522E. The conductive line 628B overlaps with the conductive lines 624C and 624E. The conductive vias 626C and 626E are located at where the conductive line 628B overlaps with the conductive lines 624C and 624E. The source or drain regions 522C and 522E correspond to the corresponding drains of the PFETs $TP_{4B1}$ and $TP_{4B2}$. In this way, the PFETs $TP_{4B1}$ and $TP_{4B2}$ are parallel coupled.

The source or drain regions 522A and 522C in FIG. 5 are non-selectively electrically coupled to the conductive line 628B through the corresponding conductive lines 624A and 624C and the corresponding conductive vias 626A and 626C. The conductive lines 624A and 624C overlap with the corresponding source or drain regions 522A and 522C. The conductive line 628B overlaps with the conductive lines 624A and 624C. The conductive vias 626A and 626C are located at where the conductive line 628B overlaps with the corresponding conductive lines 624A and 624C. The source or drain regions 522A and 522C correspond to the corresponding sources of PFETs $TP_{4A2}$ and $TP_{4A1}$.

The source or drain region 522B in FIG. 5 is shared between the PFETs $5TP_{4A1}$ and $5TP_{4A2}$. The source or drain region 522B corresponds to the drains of the PFETs $TP_{4A1}$ and $TP_{4A2}$. In this way, the PFETs $TP_{4A2}$ and $TP_{4A1}$ are parallel coupled.

The source or drain region 522C is shared between the PFETs $5TP_{41}$ and $5TP_{4A1}$. In this way, the parallel coupled PFETs $TP_{4B1}$ and $TP_{4B2}$ is coupled in series with the parallel coupled PFETs $TP_{4A1}$ and $TP_{4A2}$.

The source or drain regions 522F and 522J are non-selectively electrically coupled to the first lower power line 628E through the corresponding conductive lines 624F and 624H and the corresponding vias 626F and 626H. The conductive lines 624F and 624H overlap with the corresponding source or drain regions 522F and 522J. The first lower power line 628E overlaps with the conductive lines 624F and 624H. The conductive vias 626F and 626H are located at where the first lower power line 628E overlaps with the corresponding conductive lines 624F and 624H. The source or drain regions 522F and 522J correspond to the corresponding sources of the NFETs $TN_{4A2}$ and $TN_{4B2}$ which are non-selectively electrically coupled to the lower power node GND.

The source or drain region 522G is shared between the NFETs $5TN_{4A2}$ and $5TN_{4A1}$. The source or drain region 522G corresponds to the drain of the NFET $TN_{4A2}$ and a source of the NFET $TN_{4A1}$. In this way, the NFETs $TN_{4A2}$ and $TN_{4A1}$ are coupled in series.

The source or drain region S22I is shared between the NFETs $5TN_{4B2}$ and $5TN_{4B1}$. The source or drain region S22I corresponds to the drain of the NFET $TN_{4B2}$ and a source of the NFET $TN_{4A1}$. In this way, the NFETs $TN_{4A2}$ and $TN_{4B1}$ are coupled in series.

The source or drain region 522H in FIG. 5 is shared between the NFETs $5TN_{4A1}$ and $5TN_{4B1}$. The source or drain region 522H corresponds to the drains of the NFETs $TN_{4A1}$ and $TN_{4B1}$. In this way, the serially coupled NFETs $TN_{4A2}$ and $TN_{4A1}$ and the serially coupled NFETs $TN_{4B2}$ and $TN_{4B1}$ are coupled in parallel.

The source or drain regions 522B and 522H are non-selectively electrically coupled to an output pin O6. The output pin O6 corresponds to the output pin O4 in FIG. 4. The output pin O6 includes the conductive line 624B, the conductive via 626B, the conductive line 628C, the conductive via 630A, the conductive line 632A, the conductive via 630B, the conductive line 628D, the conductive via 626G and the conductive line 624G. The conductive line 624B overlaps with the source or drain region 522B. The conductive line 628C overlaps with the conductive line 624B. The conductive via 626B is located at where the conductive line 628C overlaps with the conductive line 624B. The conductive line 632A overlaps with the conductive line 628C. The conductive via 630A is located at where the conductive line 632A overlaps with the conductive line 628C. The conductive line 632A also overlaps with the conductive line 628D.

The conductive via 630B is located at where the conductive line 632A overlaps with the conductive line 628D. The conductive line 628D overlaps with the conductive line 624G. The conductive via 626G is located at where the conductive line 628D overlaps with the conductive line 624G. The conductive line 624G overlaps with the source or drain region 522H. In this way, the drains of the PFETs $TP_{4A1}$ and $TP_{4A2}$ and the drains of the NFETs $TN_{4A1}$ and $TN_{4B1}$ are non-selectively electrically coupled to the output pin O4.

Figure 7:
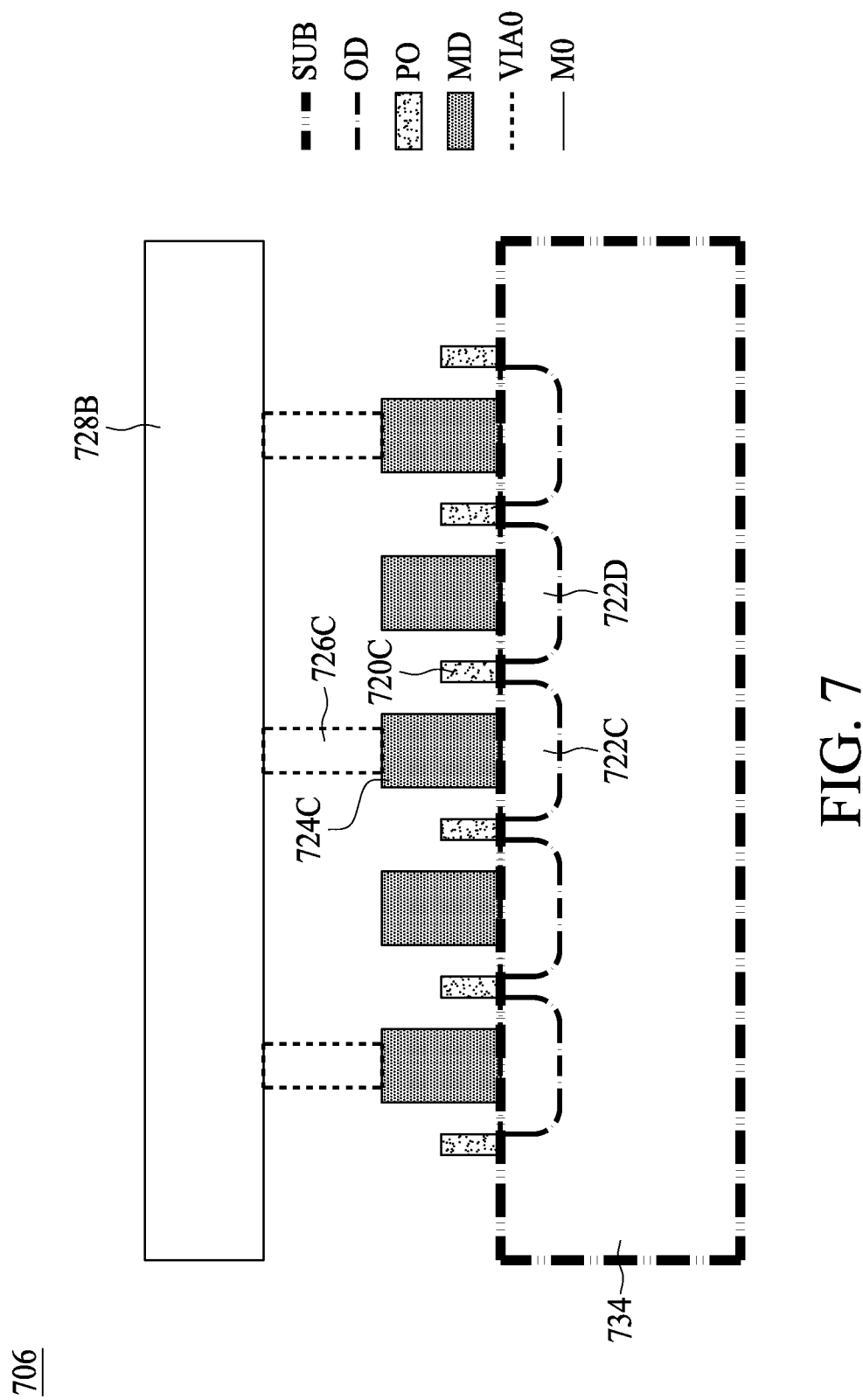
FIG. 7 is a diagram of a cross-section of the AOI22D1 gate in FIG. 4 taken along a line corresponding to line AA' in FIG. 6, in accordance with some embodiments.

FIG. 7 is a diagram of a cross-section 706 of the AOI22D1 gate 406 in FIG. 4 taken along a line corresponding to line AA' in FIG. 6, in accordance with some embodiments. Shapes in the layout portion 506 in FIG. 5 and the layout portion 606 in FIG. 6 and correspondingly manufactured structures in FIG. 7 are labeled by like reference numerals. In the cross-section 706, vertical relationships of a substrate layer SUB, the OD layer, the PO layer, the effective MD layer, the VIA0 layer and the effective M0 layer are shown.

The cross-section 706 includes a substrate 734 associated with a substrate layer SUB, a gate line 720C associated with the PO layer in FIG. 5, source or drain regions 722C and 722D associated with the OD layer in FIG. 5, a conductive line 724C associated with the effective MD layer in FIG. 6, a conductive via 726C associated with the VIA0 layer in FIG. 6 and a conductive line 728B associated with the effective M0 layer in FIG. 6.

The gate line 720C is formed on the substrate 734. The substrate 734 is also referred to as a wafer described with reference to FIG. 1. The gate line 720C includes a gate dielectric on the substrate 734 and gate metal stacked on the gate dielectric. The source or drain regions 722C and 722D are formed in the substrate 734 and on opposite sides of the gate line 720C. The gate line 720C and the source or drain regions 722C and 722D correspond to the PFET $5TP_{4B1}$ in FIG. 5. Other transistors defined by the OD layer and the PO layer in FIG. 5 have similar cross-sections as that for the PFET $5TP_{4B1}$ in FIG. 7 and are omitted to be described hereafter.

The conductive line 724C is formed in contact with the source or drain region 722C. The conductive line 728B is formed over the conductive line 724C. The conductive via 726C is formed between and directly connected to the conductive lines 728B and 724C. The conductive line 724C, the conductive via 726C and the conductive line 728C form a portion of non-router-routed interconnects for the PFET $5TP_{4B1}$. Other interconnects defined by the effective MD layer, the VIA0 layer and the effective M0 layer in FIG. 7 have similar cross-sections as that for the interconnects for the PFET $5TP_{4B1}$ in FIG. 7 and are omitted to be described hereafter.

In the layout portion 606 in FIG. 6 and the cross-section 706 in FIG. 7, the PFETs and NFETs in FIG. 4 is implemented by a p-channel metal oxide field effect transistor (PMOS). Other implementations of the PFETs and NFETs in FIG. 4 are within the contemplated scope of the present disclosure. For example, the PFETs and the NFETs in FIG. 4 can be implemented by FinFETs and gate-all-around FETs.

Figure 8:
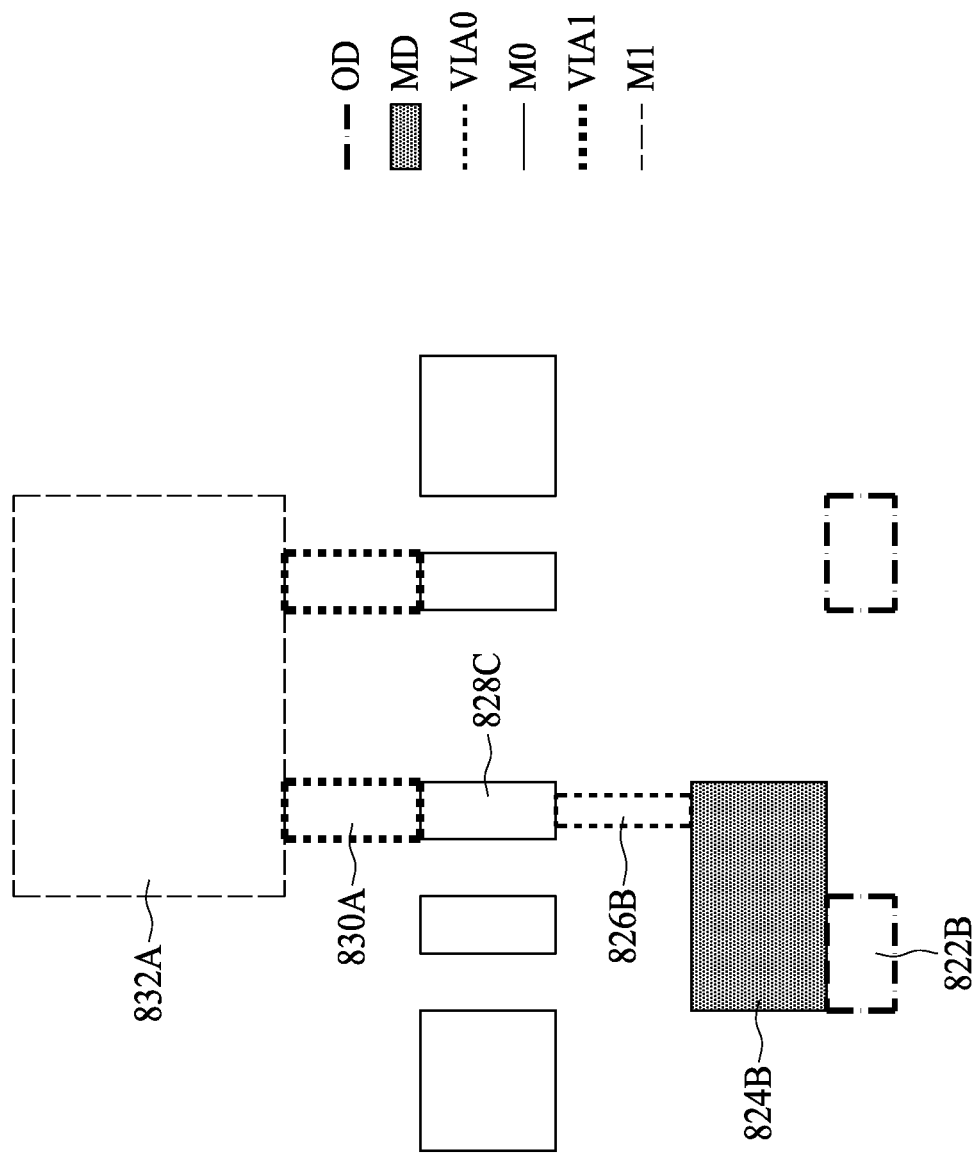
FIG. 8 is a diagram of a cross-section of the AOI22D1 gate in FIG. 4 taken along a line corresponding to line BB' in FIG. 6, in accordance with some embodiments.

FIG. 8 is a diagram of a cross-section 806 of the AOI22D1 gate 406 in FIG. 4 taken along a line corresponding to line BB' in FIG. 6, in accordance with some embodiments. Shapes in the layout portion 506 in FIG. 5 and the layout portion 606 in FIG. 6 and correspondingly manufactured structures in FIG. 8 are labeled by like reference numerals. In the cross-section 806, vertical relationships of the OD layer, the effective MD layer, the VIA0 layer, the effective M0 layer, the VIA1 layer and the M1 layer are shown.

The cross-section 806 includes a source or drain region 822B associated with the OD layer in FIG. 5, a conductive line 824B associated with the effective MD layer in FIG. 6, a conductive via 826B associated with the VIA0 layer in FIG. 6, a conductive line 828C associated with the effective M0 layer in FIG. 6, a conductive line 830A associated with the VIA1 layer in FIG. 6, and a conductive line 832A associated with the M1 layer in FIG. 6.

The conductive line 824B is formed in contact with the source or drain region 822B. The conductive line 828C is formed over the conductive line 824B. The conductive via 826B is formed between and directly connected to the conductive line 828C and the conductive line 824B. The conductive line 832A is formed over the conductive line 828C. The conductive via 830A is formed between and directly connected to the conductive line 832A and the conductive line 828C. The conductive line 824B, the conductive via 826B, the conductive line 828C, the conductive via 830A and the conductive line 832A form non-router-routed interconnects of the PFETs $5TP_{4A2}$ and PFETs $5TP_{4A1}$. Other interconnects defined by the effective MD layer, the VIA0 layer, the effective M0 layer, the VIA1 layer and the M1 layer in FIG. 8 have similar cross-sections as that for the interconnects for the PFETs $5TP_{4A2}$ and PFETs $5TP_{4A1}$ in FIG. 8 and are omitted to be described hereafter.

Figure 9:
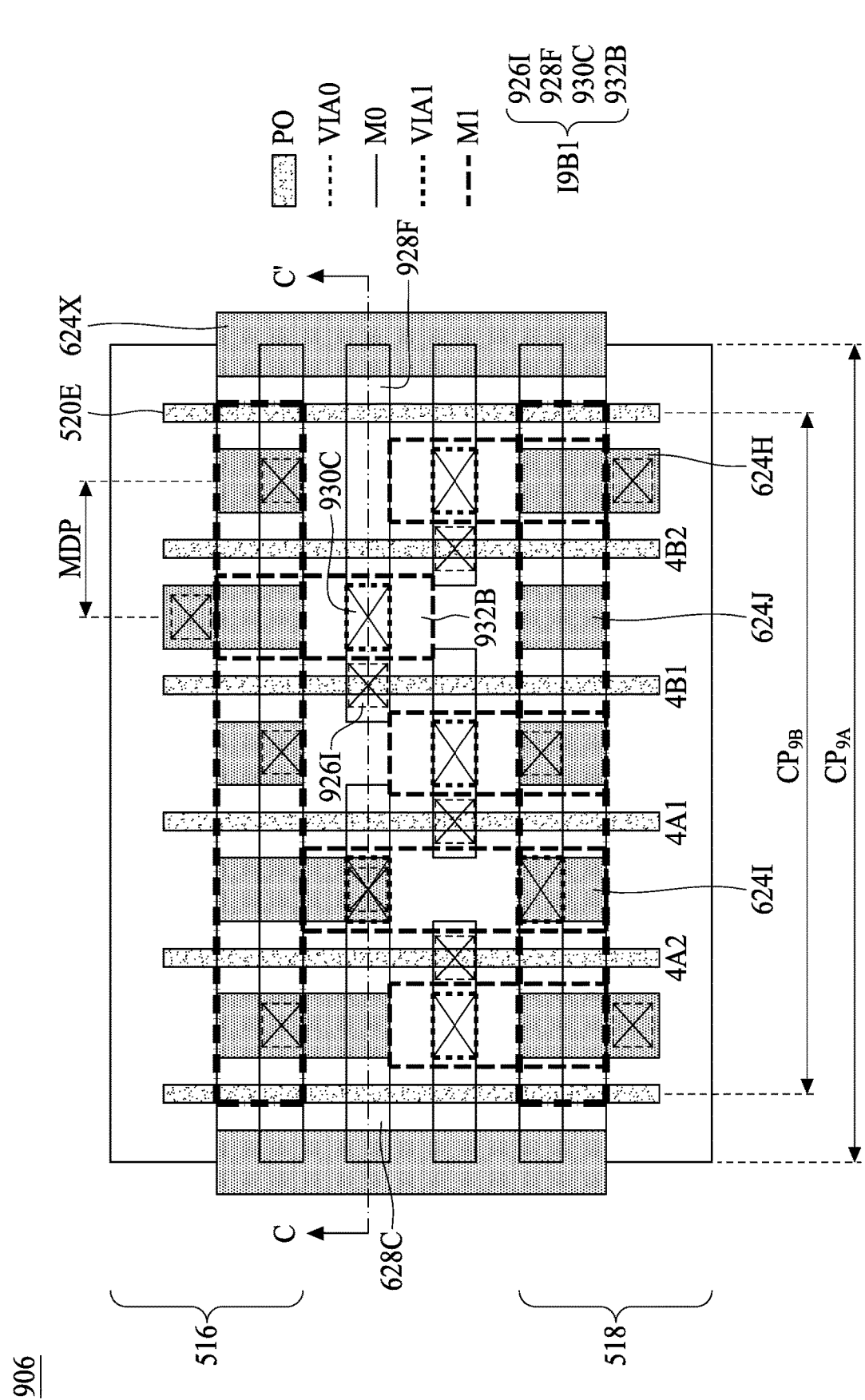
FIG. 9 is a diagram of a layout of the AOI22D1 gate in FIG. 4, in accordance with some embodiments.

FIG. 9 is a diagram of a layout 906 of the AOI22D1 gate 406 in FIG. 4, in accordance with some embodiments. The first cell layout in operation 206 further includes shapes in the layout 906 in addition to those in the layout portion 606 in FIG. 6 for input pins (e.g. I9B1). The input pins (e.g. I9B1) correspond to the corresponding input pins (e.g. I4B1) in FIG. 4. Furthermore, a cell pitch $CP_{9A}$ of the layout 906 of the AOI22D1 gate 406 is 6 MDPs.

For the input pins I4A2, I4A1, I4B1 and I4B2, the VIA0 layer, effective M0 layer, VIA1 layer and M1 layer of the layout 906 further includes a plurality of shapes in addition to those in the layout portion 606. For example, for the gate line $5TG_{4B1}$ (implicitly labeled in FIG. 5), the VIA0 layer further includes a conductive via 926I, the effective M0 layer further includes a conductive line 928F, the VIA1 layer further includes a conductive via 930C, and the M1 layer further includes a conductive line 932B.

For gate lines $5TG_{4A2}$, $5TG_{4A1}$, $5TG_{4B1}$, or $5TG_{4B2}$ (implicitly labeled in FIG. 5), input pins corresponding to the input pins I4A2, I4A1, I4B1 and I4B2 in FIG. 4 are created. For example, for the gate line $5TG_{4j}$, an input pin I9B1 corresponding to the input pin I4B1 is created. The input pin I9B1 includes the conductive via 926I, the conductive line 928F, the conductive via 930C and the conductive line 932B. The conductive line 928F overlaps with the gate line $5TG_{4B1}$. The conductive via 926I is located at where the conductive line 928F overlaps with the gate line $5TG_{4B1}$. The conductive line 932B overlaps with the conductive line 928F. The conductive via 930C is located at where the conductive line 932B overlaps with the conductive line 928F. In this way, the input pins I4A2, I4A1, I4B1 and I4B2 can be non-selectively electrically coupled to other nodes in the design layout during, for example, the physical implementation stage 178 described with reference to FIG. 1.

In some embodiments, the effective M0 layer is a result of a difference operation of an actual M0 layer (not shown) and a second cut layer (not shown). For example, the actual M0 layer includes conductive lines spanning the cell pitch $CP_{9A}$. The second cut layer cuts the conductive lines in the actual M0 layer into the conductive lines for the different input pins I4A2, I4A1, I4B1 and I4B2 and the output pin O4. For example, the second cut layer cuts a conductive line in the actual M0 layer into the conductive line 628C for the output pin O4 and the conductive line 928F for the input pin I4B1. The term "the effective M0 layer" used throughout the present disclosure refers to the effective M0 layer implemented by a single M0 layer and by the actual MD layer and the second cut layer.

In some embodiments, the layout 906 further includes dummy conductive lines (e.g. 624X) in the MD layer on opposite sides of the at least one first up transistor 516 and the at least one first down transistor 518 in FIG. 5. The layout 906 has a dummy conductive line-bordered cell pitch $CP_{9A}$ which is bordered by the dummy conductive lines (e.g. 624X) and is of 6 MDPs. An MDP is a pitch between two adjacent conductive lines in the effective MD layer such as the conductive lines 624H and 624X. In other embodiments, the layout (not shown) does not include the dummy conductive lines (e.g. 624X) of the layout 906 which form borders of the dummy conductive line-bordered cell pitch $CP_{9A}$ and has a dummy gate line-ordered cell pitch $CP_{9B}$ which is bordered by dummy gate lines (e.g. 520E) and is of 5MDPs.

Figure 10:
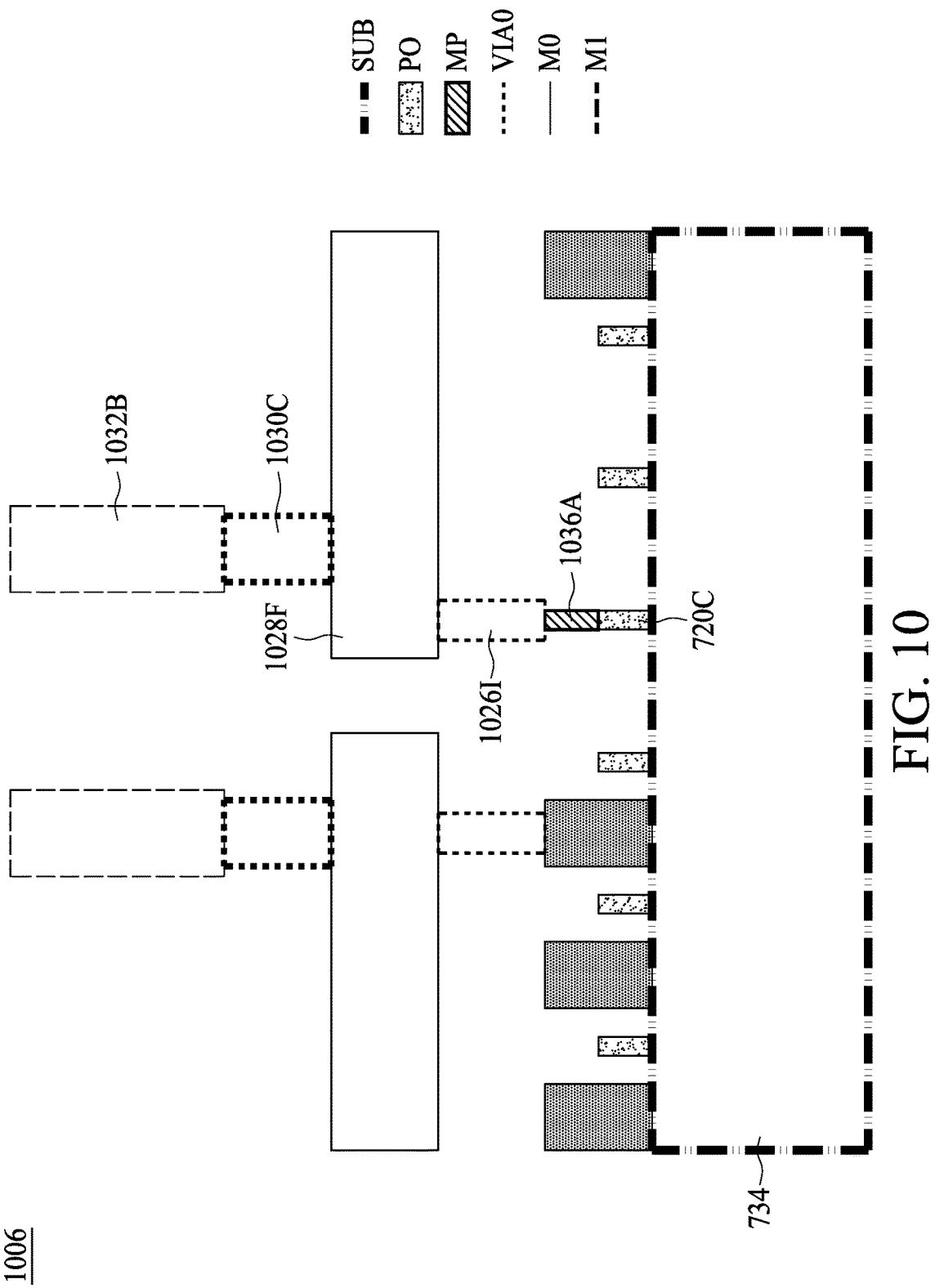
FIG. 10 is a diagram of a cross-section of the AOI22D1 gate in FIG. 4 taken along a line corresponding to line CC' in FIG. 9, in accordance with some embodiments.

FIG. 10 is a diagram of a cross-section 1006 of the AOI22D1 gate 406 in FIG. 4 taken along a line corresponding to line CC' in FIG. 9, in accordance with some embodiments. Shapes in the layout portion 506 in FIG. 5, the layout portion 606 in FIG. 6 and the layout 906 in FIG. 9 and correspondingly manufactured structures in FIG. 10 are labeled by like reference numerals. In the cross-section 1006, vertical relationships of the substrate layer SUB, the PO layer, an MP layer and the VIA0 layer, the effective M0 layer, the VIA1 layer and the M1 layer are shown.

The cross-section 1006 includes the substrate 734, the gate line 720C associated with the PO layer in FIG. 5, a conductive line 1036A associated with an MP layer not shown in FIG. 9, a conductive via 1026I associated with the VIA0 layer in FIG. 9, a conductive line 1028F associated with the effective M0 layer in FIG. 9, a conductive via 1030C associated with the M1 layer in FIG. 9, and a conductive line 1032B associated with the M1 layer in FIG. 9.

The conductive line 1036A is formed over and directly connected to the gate line 720C. The conductive line 1028F overlaps with the conductive line 1036A. The conductive via 1026I is formed between and directly connected to the conductive lines 1028F and 1036I. The conductive line 1032B overlaps with the conductive line 1028F. The conductive via 1030C is formed between and directly connected to the conductive lines 1032B and 1028F. The conductive line 1036A, the conductive via 1026I, the conductive line 1028F, the conductive via 1030C and the conductive line 1032B form a non-router routed input pin I9B1 in FIG. 9. Other interconnects defined by the MP layer, the VIA0 layer, the effective M0 layer, the VIA1 layer and the M1 layer in FIG. 10 have similar cross-sections as that for the input pin I9B1 and are omitted to be described.

Figure 11:
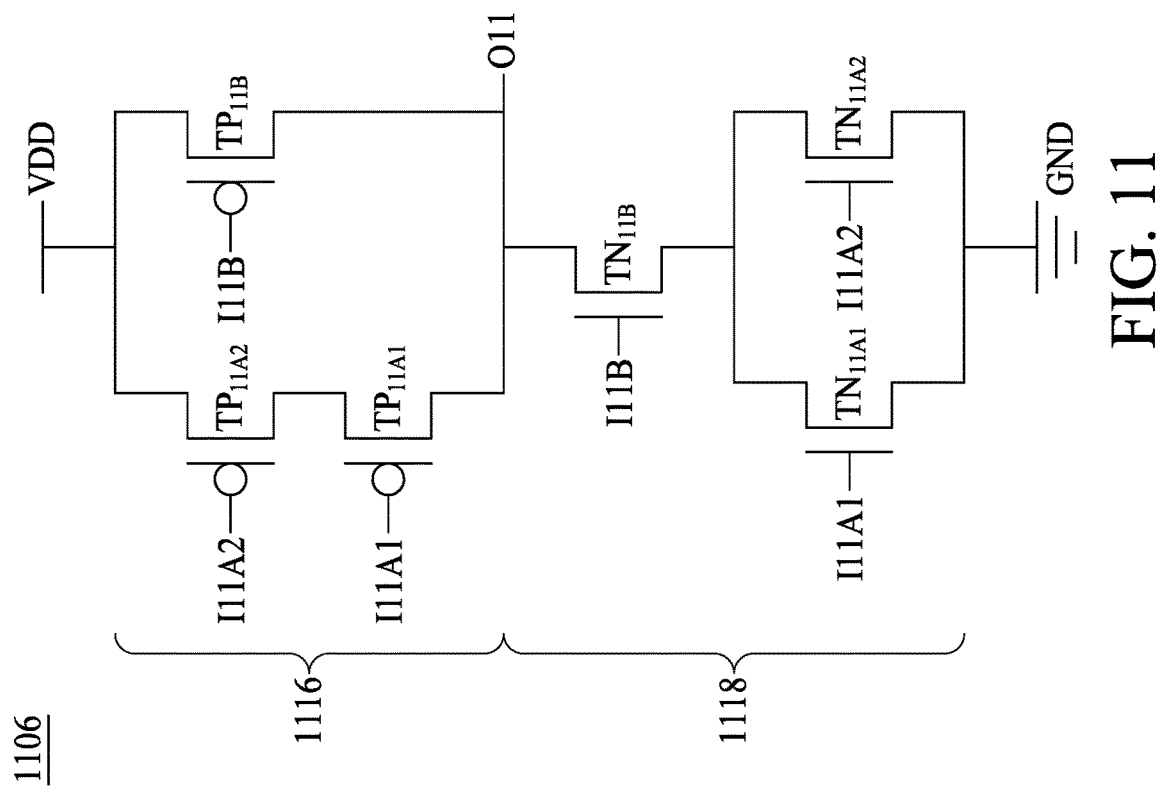
FIG. 11 is a schematic circuit diagram of an OAI21D1 gate, in accordance with some embodiments.

FIG. 11 is a schematic circuit diagram of an OAI21D1 gate 1106, in accordance with some embodiments. The OAI21D1 gate 1106 corresponds to the second cell layout in operation 206. In the OAI21D1 gate 1106, an output pin O11 is electrically coupled to the high power node VDD through at least one first up transistor 1116 and to the lower power node GND through the at least one first down transistor 1118.

The OAI21D1 gate 1106 includes at least one first up transistor 1116 and at least one first down transistor 1118. The at least one first up transistor 1116 includes PFETs $TP_{11A1}$, $TP_{11A2}$ and $TP_{11B}$. The at least one first up transistor 1118 includes NFETs $TN_{11A1}$, $TN_{11A2}$ and $TN_{11B}$.

Sources of the PFETs $TP_{11A2}$ and $TP_{11B1}$ are non-selectively electrically coupled to the high power node VDD. The PFETs $TP_{11A2}$ and $TP_{11A1}$ are coupled in series such that a drain of the PFET $TP_{11A2}$ is non-selectively electrically coupled to a source of the PFET $TP_{11A1}$. The serially coupled PFETs $TP_{11A2}$ and $TP_{11A1}$ and the PFET $TP_{11B}$ are coupled in parallel.

Sources of the NFETs $TN_{11A1}$ and $TN_{11A2}$ are non-selectively electrically coupled to the lower power node GND. The NFETs $TN_{11A1}$ and $TN_{11A2}$ are coupled in parallel. The parallel coupled NFETs $TN_{11A1}$ and $TN_{11A2}$ and the NFET $TN_{11B}$ are coupled in series such that the drains of the NFETs $TN_{11A1}$ and $TN_{11A2}$ are non-selectively electrically coupled to the source of the NFET $TN_{11B}$.

Drains of the PFETs $TP_{11A1}$, and $TP_{11B}$ and a drain of the NFET $TN_{11B}$ are non-selectively electrically coupled to an output pin O11. In this way, the output pin O11 is electrically coupled to the higher power node VDD through the at least one first up transistor 1116 and electrically coupled to the lower power node GND through the at least one first down transistor 1118. Gates of the PFET $TP_{11A1}$ and NFET $TN_{11A1}$, the PFET $TP_{11A2}$ and NFET $TN_{11A2}$, the PFET $TP_{11B}$ and NFET $TN_{11B}$ are non-selectively electrically coupled to corresponding input pins I11A1, I11A2 and I11B.

Figure 12:
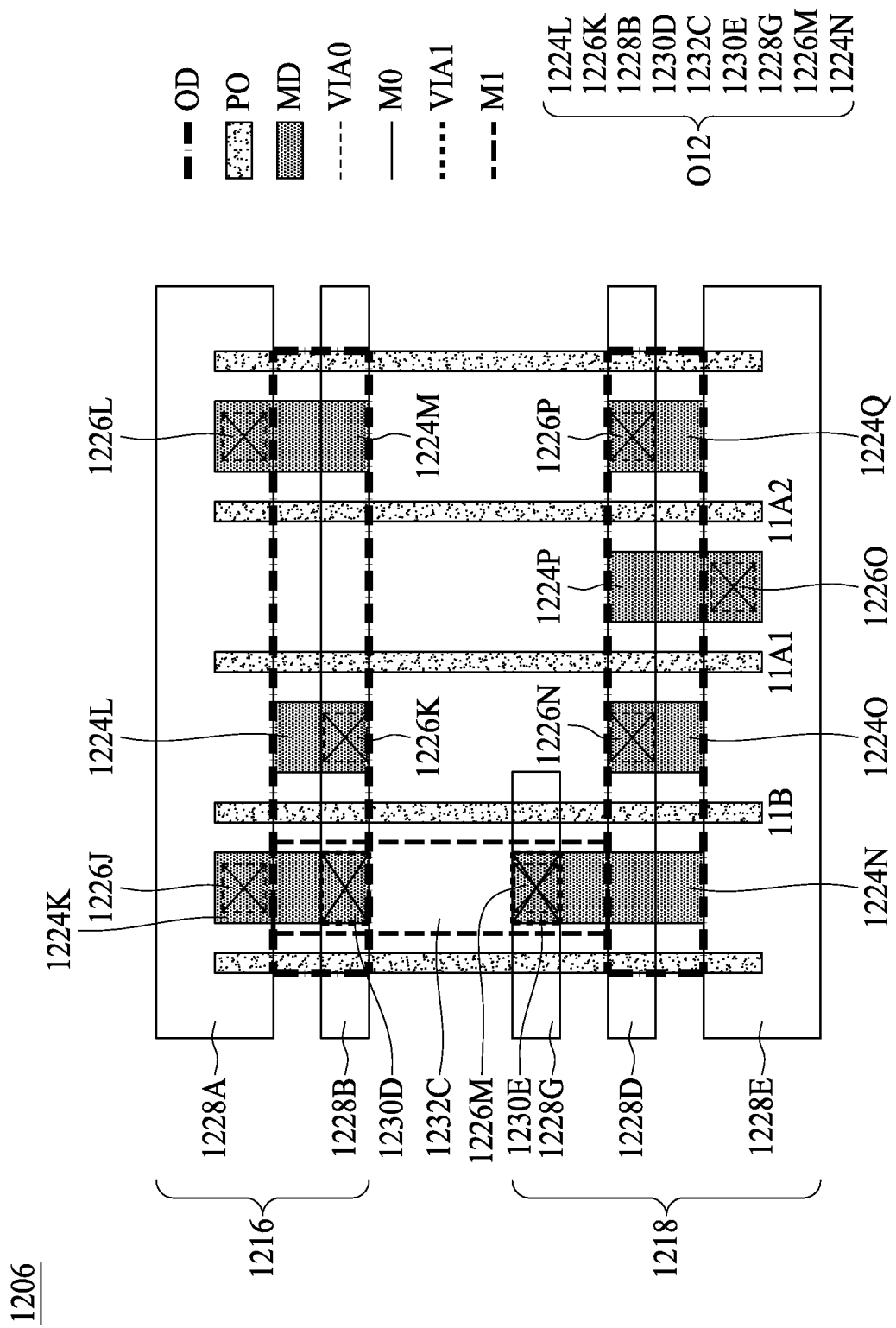
FIG. 12 is a diagram of a layout portion of the OAI21D1 gate in FIG. 11, in accordance with some embodiments.

FIG. 12 is a diagram of a layout portion 1206 of the OAI21D1 gate 1106 in FIG. 11, in accordance with some embodiments. The second cell layout in operation 206 includes the layout portion 1206. In the layout portion 1206, at least one first up transistor 1216 corresponds to the at least one first up transistor 1116 in FIG. 11. At least one first down transistor 1218 corresponds to the at least one first down transistor 1118 in FIG. 11. An output pin O12 corresponds to the output pin O11 in FIG. 11. A second higher power line 1228A corresponds to the high power node VDD in FIG. 11. A second lower power line 1228E corresponds to the lower power node GND in FIG. 11. The output pin O12 is electrically coupled to the second higher power line 1228A through the at least one first up transistor 1216 and to the first lower power line 1228E through the at least one first down transistor 1218.

The layout portion 1206 has shapes in the OD layer, the PO layer, the effective MD layer, the VIA0 layer, the effective M0 layer, the VIA1 layer and the M1 layer. Shapes in the PO layer include a plurality of gate lines $12TG_{11B}$, $12TG_{11A1}$ and $12TG_{11A2}$. Shapes in the OD layer includes a plurality of source or drain regions $12TPL_{11B}$, $12TPR_{11B}$, $12TPL_{11A1}$, $12TPR_{11A1}$, $12TPL_{11A2}$, $12TPR_{11A2}$, $12TNL_{11A1}$, $12TNR_{11B}$, $12TNL_{11A1}$, $12TNR_{11A1}$, $12TNL_{11A2}$ and $12TNR_{11A2}$. Shapes in the effective MD layer include a plurality of conductive lines 1224K to 1224Q. Shapes in the VIA0 layer include a plurality of conductive vias 1226J to 1226P. Shapes in the effective M0 layer include a second higher power line 1228A, a second lower power line 1228E and a plurality of conductive lines 1228B, 1228D and 1228G. Shapes in the VIA1 layer include a plurality of conductive vias 1230D and 1230E. Shapes in the M1 layer of include a conductive line 1232C.

The source or drain region $12TPL_{11B}$ and the source or drain region $12TPR_{11A2}$ are non-selectively electrically coupled to the second higher power line 1228A through the corresponding conductive lines 1224K and 1224M and the corresponding conductive vias 1226J and 1226L. The conductive lines 1224K and 1224M overlap with the corresponding source or drain regions $12TPL_{11B}$ and $12TPR_{11A2}$. The second higher power line 1228A overlaps with the conductive lines 1224K and 1224M. The conductive vias 1226J and 1226L are located at where the second higher power line 1228A overlaps with the corresponding conductive lines 1224K and 1224M. The source or drain region 12TPL$_{11B}$ and the source or drain region 12TPR$_{11A2}$ correspond to the corresponding sources of the PFETs TP$_{11A1}$ and TP$_{11B}$ which are non-selectively electrically coupled to the higher power node VDD.

The source or drain region 12TPR$_{11A1}$ and 12TPL$_{11A2}$ are shared and correspond to the corresponding drain of the PFET TP$_{11A2}$ and source of the PFET TP$_{11A1}$ which are non-selectively electrically coupled together. In this way, the PFETs TP$_{11A2}$ and TP$_{11A1}$ are coupled in series.

The source or drain regions 12TPL$_{11A1}$ and 12TPR$_{11B}$ are shared and correspond to the corresponding drains of the PFETs TP$_{11A1}$ and TP$_{11B}$ which are non-selectively electrically coupled together. In this way, the serially coupled PFETs TP$_{11A2}$ and TP$_{11A1}$ and the PFET TP$_{11B}$ are coupled in parallel.

The source or drain regions 12TNR$_{11A1}$ and 12TNL$_{11A2}$ are shared and are non-selectively electrically coupled to the second lower power line 1228E through the conductive line 1224P and the conductive via 1226O. The conductive line 1224P overlaps with the shared source or drain regions 12TPR$_{11A1}$ and 12TPL$_{11A2}$. The second lower power line 1228E overlaps with the conductive line 1224P. The conductive via 1226O is located at where the second lower power line 1228E overlaps with the conductive line 1224P. The shared source or drain regions 12TNR$_{11A1}$ and 12TNL$_{11A2}$ correspond to the sources of the NFETs TN$_{11A1}$ and TN$_{11A2}$ non-selectively electrically coupled to the lower power node GND.

The source or drain regions 12TNL$_{11A1}$ and 12TNR$_{11A2}$ are non-selectively electrically coupled together through the corresponding conductive lines 1224O and 1224Q, the corresponding conductive vias 1226N and 1226P, and the conductive line 1228D. The conductive line 1224O and 1224Q overlap with the corresponding source or drain regions 12TNL$_{11A1}$ and 12TNR$_{11A2}$. The conductive line 1228D overlaps with the conductive lines 1224O and 1224Q. The conductive vias 1226N and 1226P are located at where the corresponding conductive lines 1224O and 1224Q overlap with the conductive line 1228D. The source or drain regions 12TNL$_{11A1}$ and 12TNR$_{11A2}$, correspond to the corresponding drains of the NFETs TN$_{11A1}$ and TN$_{11A2}$. In this way, the NFETs TN$_{11A1}$ and TN$_{11A2}$ are coupled in parallel.

The source or drain regions 12TNL$_{11A1}$ and 12TNR$_{11B}$ are shared and correspond to corresponding drain of the NFET TN$_{11A1}$ and source of the NFET TN$_{11B}$ which are non-selectively electrically coupled together. In this way, the parallel coupled NFETs TN$_{11A1}$ are coupled in series with the NFET TN$_{11B}$.

The source or drain regions 12TPR$_{11B}$, 12TPL$_{11A1}$ and 12TNL$_{11B}$ are non-selectively electrically coupled to an output pin O12. The output pin O12 corresponds to the output pin O11 in FIG. 11. The output pin O12 includes the conductive line 1224L, the conductive via 1226K, the conductive line 1228B, the conductive via 1230D, the conductive line 1232C, the conductive via 1230E, the conductive line 1228G, the conductive via 1226M and the conductive line 1224N. The conductive line 1224L overlaps with the shared source or drain regions 12TPR$_{11B}$ and 12TPL$_{11A1}$. The conductive line 1228B overlaps with the conductive line 1224L. The conductive via 1226K is located at where the conductive line 1228B overlaps with the conductive line 1224L. The conductive line 1232C overlaps with the conductive line 1228B. The conductive via 1230D is located at where the conductive line 1232C overlaps with the conductive line 1228B. The conductive line 1232C also overlaps with the conductive line 1228G. The conductive via 1230E is located at where the conductive line 1232C overlaps with the conductive line 1228G. The conductive line 1228G overlaps with the conductive line 1224N. The conductive via 1226M is located at where the conductive line 1228G overlaps with the conductive line 1224N. The conductive line 1224N overlaps with the source or drain region 12TNL$_{11B}$. In this way, the drains of the PFETs TP$_{11A1}$ and PFET TP$_{11B}$, and the drain of the NFET TN$_{11B}$ are non-selectively electrically coupled to the output pin O11.

Figure 13:
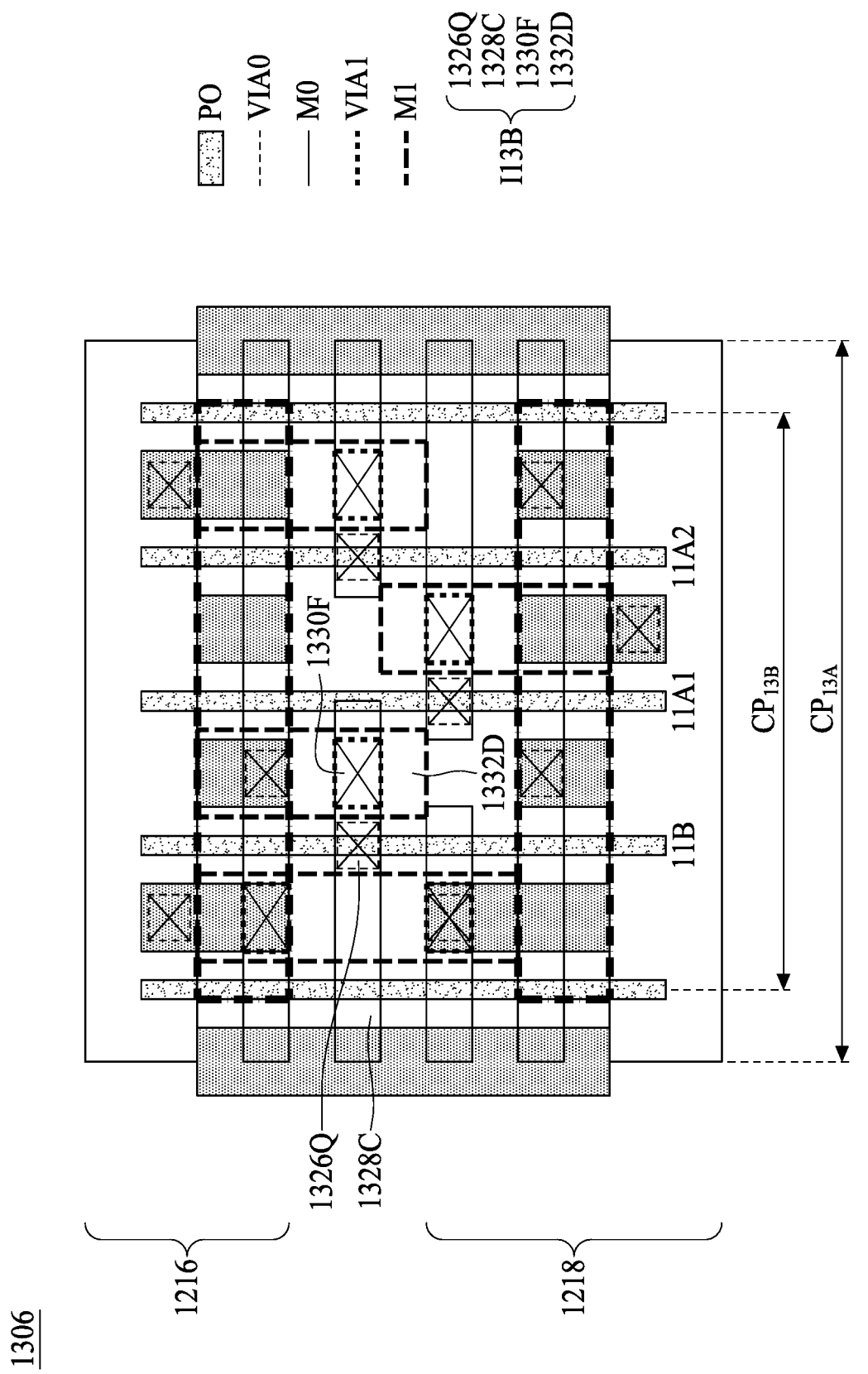
FIG. 13 is a diagram of a layout of the OAI12D1 gate in FIG. 11, in accordance with some embodiments.

FIG. 13 is a diagram of a layout 1306 of the OAI21D1 gate 1106 in FIG. 11, in accordance with some embodiments. The second cell layout in operation 206 further includes shapes in the layout 1306 for input pins (e.g. I13B). The input pins (e.g. I13B) correspond to the corresponding input pins (e.g. I11B) in FIG. 4. Furthermore, a cell pitch CP$_{13A}$ of the layout 1306 of the OAI21D1 gate 1106 is 5 MDPs.

For the input pins I11B, I11A1 and I11A2, the VIA0 layer, the effective M0 layer, the VIA1 layer and the M layer in the layout portion 1306 further includes shapes in addition to those in the layout portion 1206. For example, for the input pin I11B, the VIA0 layer further includes a conductive via 1326Q, the effective M0 layer further includes a conductive line 1328C, the VIA1 layer further includes a conductive via 1330F, and the M1 layer further includes a conductive line 1332D. The conductive via 1326Q, the conductive line 1328C, the conductive via 1330F and the conductive line 1332D form the input pin I13B in FIG. 13. The conductive line 1328C overlaps with the gate line 12TG$_{11B}$ (implicitly labeled in FIG. 12). The conductive via 1326Q is located at where the conductive line 1328C overlaps with the gate line 12TG$_{11B}$. The conductive line 1332D overlaps with the conductive line 1328C. The conductive via 1330F is located at where the conductive line 1332D overlaps with the conductive line 1328C. In this way, the input pins (e.g. I13B) can be non-selectively electrically coupled to other nodes in the design layout during, for example, the physical implementation stage 178 described with reference to FIG. 1.

In some embodiments, the layout 1306 has a dummy conductive line-bordered cell pitch CP$_{13A}$ of 5 MDPs. In other embodiments, the layout (not shown) does not include the dummy conductive lines of the layout 1306 which form borders of the dummy conductive line-bordered cell pitch CP$_{13A}$ and has a dummy gate line-bordered cell pitch CP$_{13B}$ of 4 MDPs.

Figure 14:
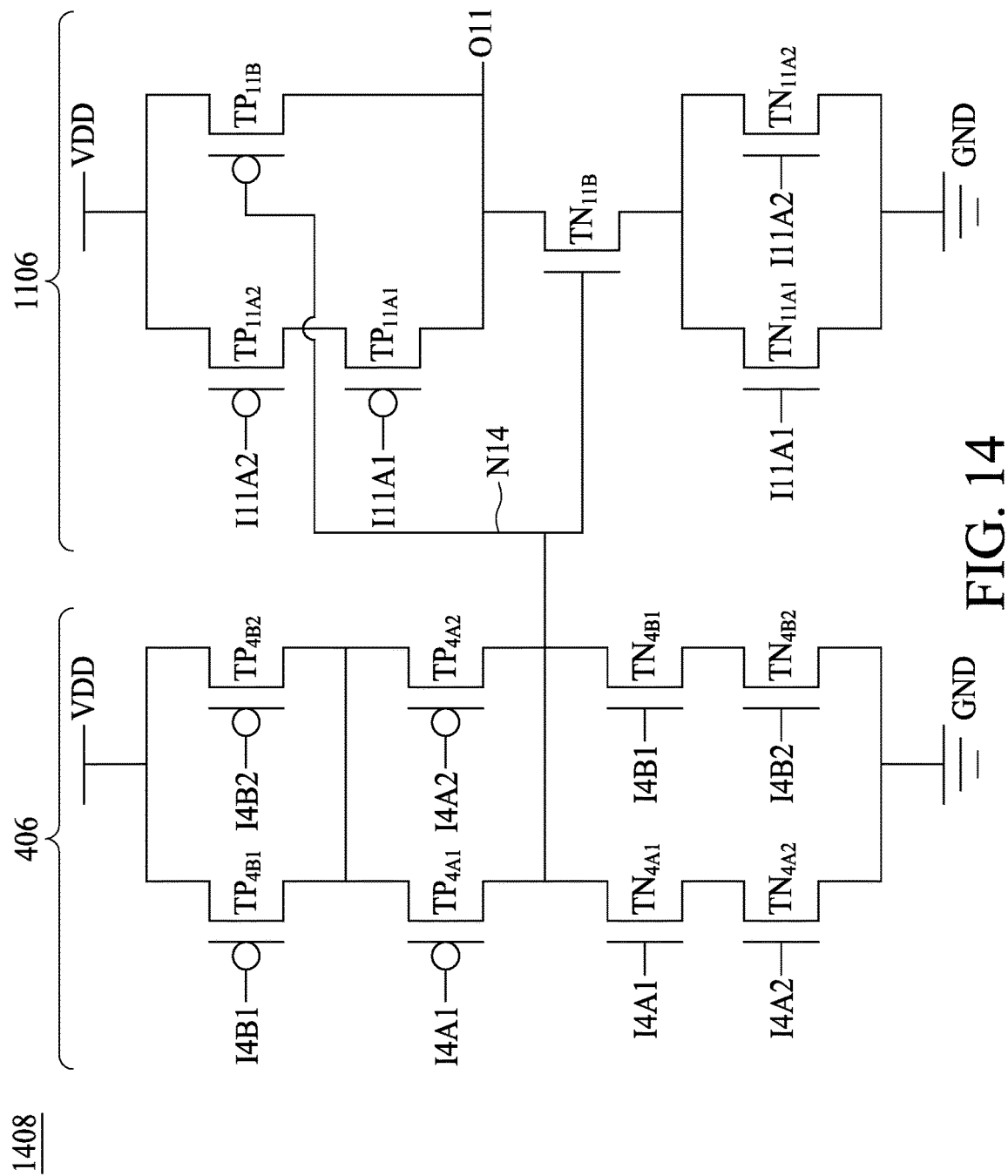
FIG. 14 is a schematic circuit diagram of combined AOI22D1 gate and OAI21D1 gate, in accordance with some embodiments.

FIG. 14 is a schematic circuit diagram of combined AOI22D1 gate and OAI21D1 gate 1408, in accordance with some embodiments. The combined AOI22D1 gate and OAI21D1 gate 1408 corresponds to the third cell layout in operation 208. The combined AOI22D1 gate and OAI21D1 gate 1408 includes the AOI22D1 gate 406 in FIG. 4 and the OAI21D1 gate 1106 in FIG. 11. In the combined AOI22D1 gate and OAI21D1 gate 1408, the output pin O4 in FIG. 4 is non-selectively electrically coupled to the gates of the PFET TP$_{11B}$ and NFET TN$_{11B}$ in FIG. 11 to form a node N14.

In operation 208, the first cell layout including the layout portion 606 in FIG. 6 and the second cell layout including the layout portion 1206 in FIG. 12 are combined into a third cell layout including a layout portion 1908 to be described with reference to FIG. 19.

In operation 310 in FIG. 3, a first source or drain region 6TPL$_{4A2}$ of at least one first up transistor 516 in the first cell layout and a second source or drain region 12TPL$_{11B}$ of at least one second up transistor 1216 in the second cell layout are combined through re-arranging and joining to form the third cell layout. In addition, in operation 310 in FIG. 3, a third source or drain region 6TNL$_{4A2}$ of the at least one first down transistor 518 in the first cell layout and a fourth source or drain region 12TNL$_{11B}$ of the at least one second down transistor 1218 in the second cell layout are combined through re-arranging, and joining to form the third cell layout. Re-arranging is to be described with reference to FIGS. 15 and 16. Joining is to be described with reference to FIGS. 17 and 18.

Figure 15:
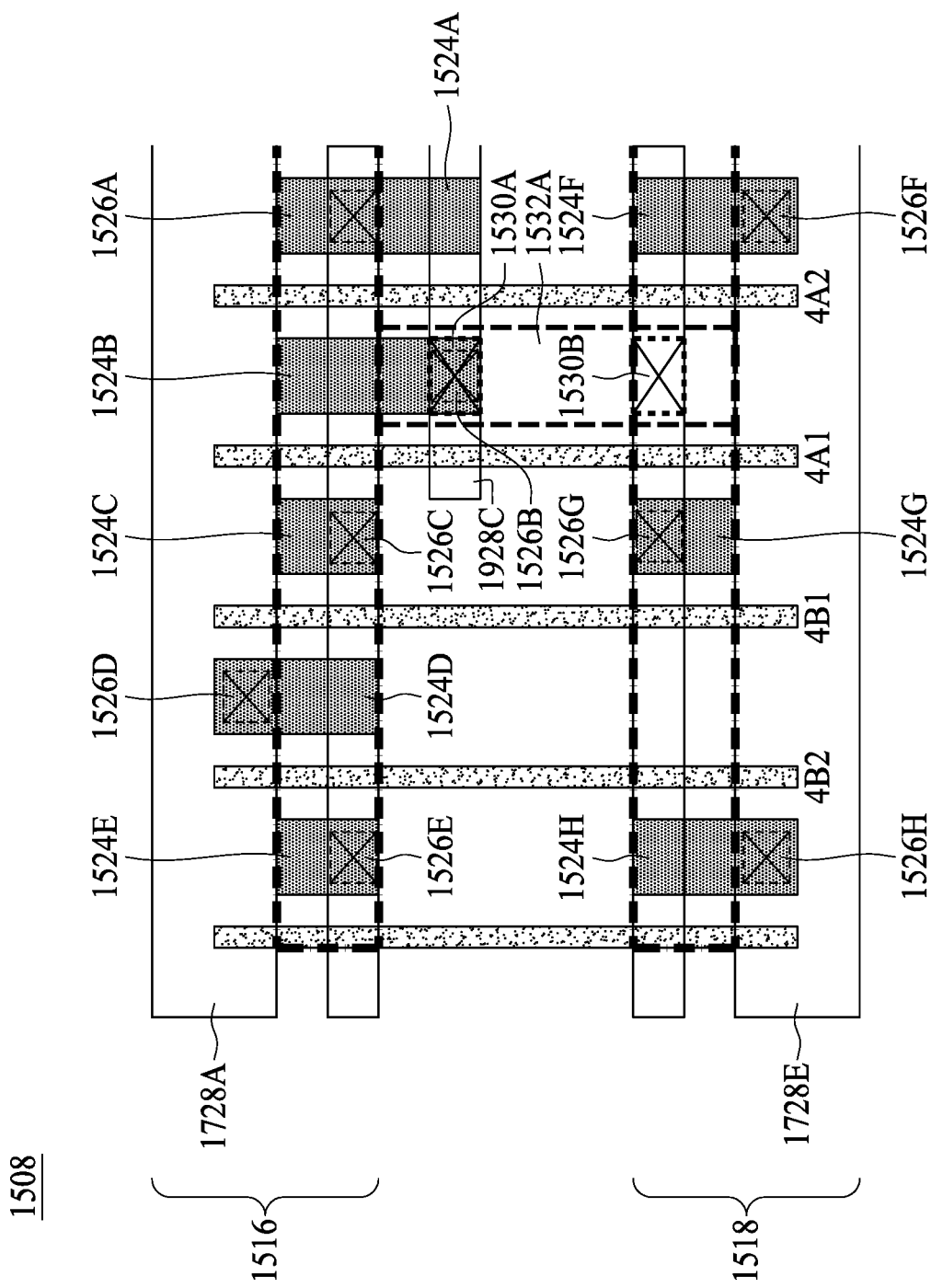
FIG. 15 is a diagram of a layout portion corresponding to the AOI22D1 gate in the combined AOI22D1 gate and OAI21D1 gate in FIG. 14, in accordance with some embodiments.

FIG. 15 is a diagram of a layout portion 1508 corresponding to the AOI22D1 gate 406 in the combined AOI22D1 gate and OAI21D1 gate 1408 in FIG. 14, in accordance with some embodiments. The layout portion 1508 is substantially a flipped layout of the layout portion 606 in FIG. 6. Corresponding elements in the layout portions 606 and 1508 are labeled by like reference numerals. By re-arranging the layout portion 606 such that the layout portion 1508 is flipped with respect to the layout portion 606, a conductive line 1928C in the M0 layer for the output pin O11 in FIG. 11 is ready to be extended rightward into another cell to be joined leftward without being intervened.

Figure 16:
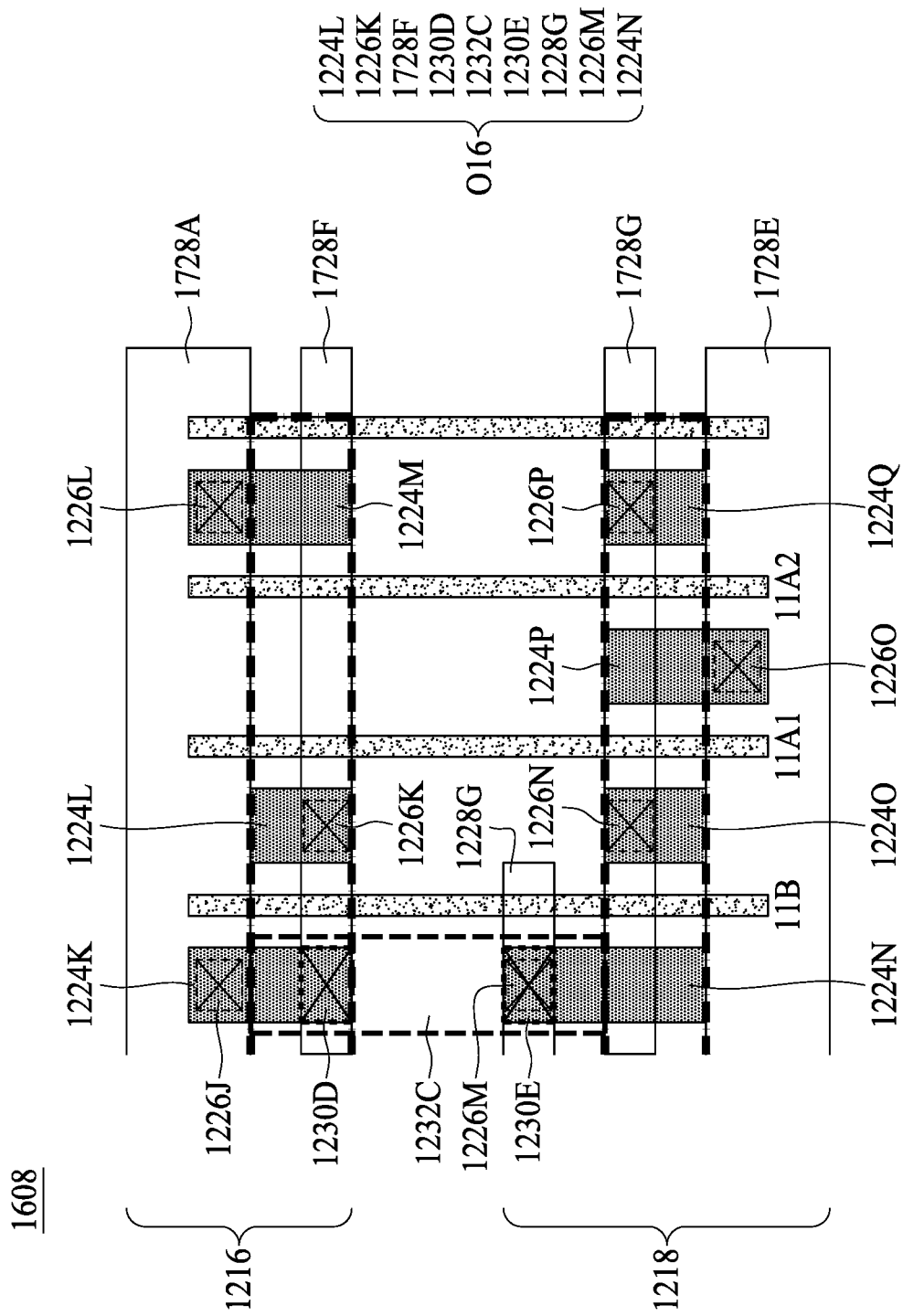
FIG. 16 is a diagram of a layout portion corresponding to the OAI21D1 gate in the combined AOI22D1 gate and OAI21D1 gate in FIG. 14, in accordance with some embodiments.

FIG. 16 is a diagram of a layout portion 1608 corresponding to the OAI21D1 gate 1106 in the combined AOI22D1 gate and OAI21D1 gate 1408 in FIG. 14, in accordance with some embodiments. The layout portion 1608 is substantially the same layout of the layout portion 1208. By using the layout portion 1608 substantially the same as the layout portion 1208, the gate line 16TG$_{11B}$ is located leftmost and is ready to be connected to the conductive line 1528C without being intervened.

Figure 17:
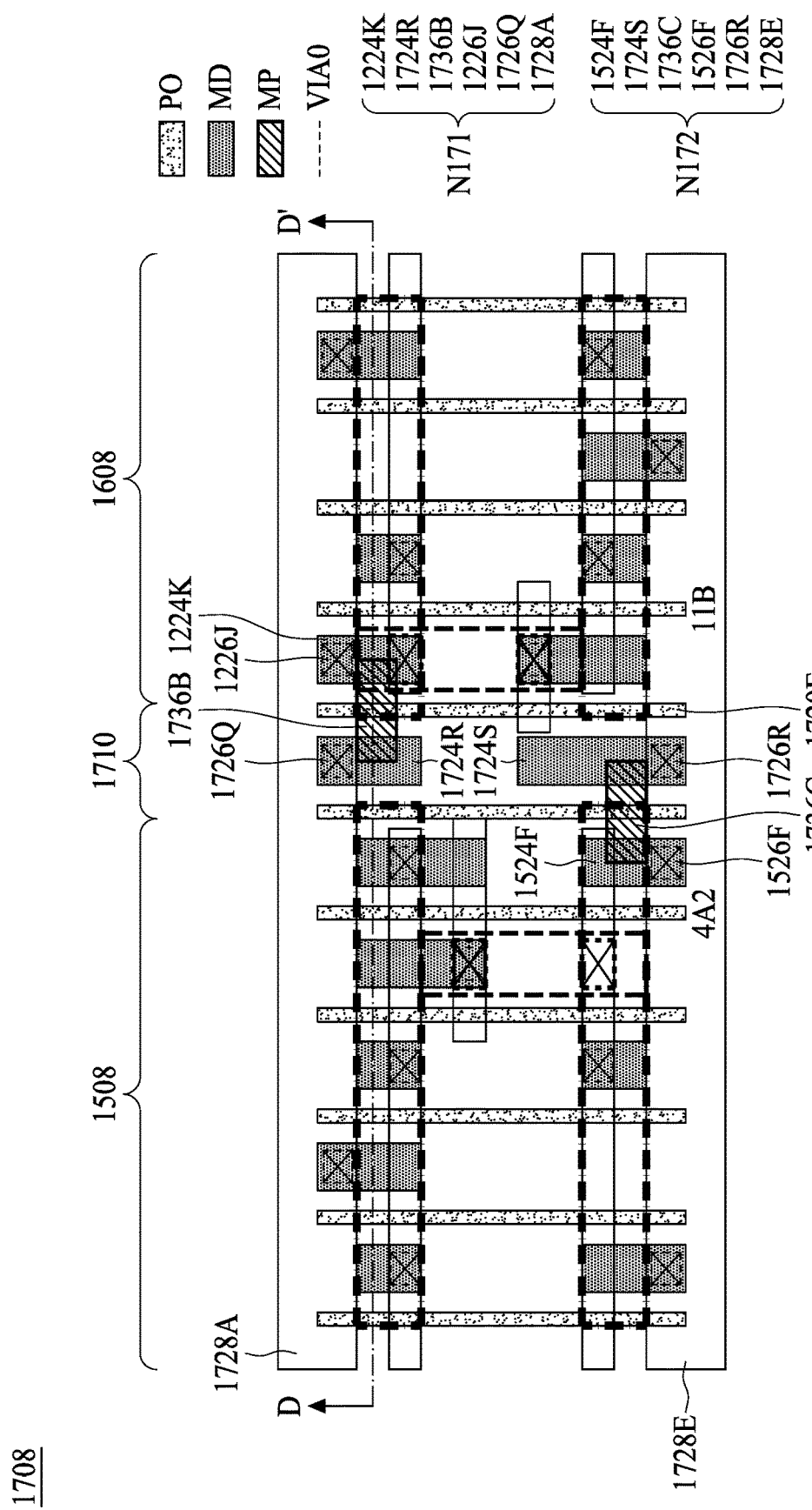
FIG. 17 is a diagram of a layout portion with a joint portion for joining the AOI22D1 gate and the OAI21D1 gate in the combined AOI22D1 gate and OAI21D1 gate in FIG. 14, in accordance with some embodiments.

FIG. 17 is a diagram of a layout portion 1708 with a joint portion 1710 for joining the AOI22D1 gate 406 and the OAI21D1 gate 1106 in the combined AOI22D11 gate and OAI21D1 gate 1408 in FIG. 14, in accordance with some embodiments. The third cell layout in operation 208 includes the layout portion 1708 which includes the layout portion 1508 in FIG. 15, the layout portion 1608 in FIG. 16 and the joint portion 1710. In the layout portion 1708, horizontal relationships of the PO layer, the effective MD layer, the MP layer and the VIA 0 layer are shown. In the layout portion 1708, a node N171 including parallel coupled conductive lines 1224K and 1724R and renders the source or drain region 16TPL$_{11B}$ non-selectively electrically coupled to a higher power line 1728A is formed. A node N172 including parallel coupled conductive lines 1524F and 1724S and renders the source or drain region 15TPR$_{4A2}$ non-selectively electrically coupled to a lower power line 1728E is formed.

The re-arranged first source or drain region 15TPR$_{4A2}$ in the layout portion 1508 and the second source or drain region 12TPL$_{11B}$ in the layout portion 1608 are joined to a corresponding left side and right side of a joint portion 1710. The re-arranged third source or drain region 15TNR$_{4A2}$ in the layout portion 1508 and the fourth source or drain region 12TNL$_{11B}$ in the layout portion 1608 are joined to the corresponding left side and right side of the joint portion 1710. The joint portion 1710 includes components in the PO layer and the effective MD layer to the left of the source or drain region 9TPL$_{4A2}$ in FIG. 9 and components in the PO layer and the MD layer to the left of the source or drain region 13TPL$_{11B}$ in FIG. 13. The components to the left of the source or drain region 9TPL$_4$, in FIG. 9 are flipped in FIG. 17. The components to the left of the source or drain region 13TPL$_{11B}$ in FIG. 13 are overlapped with the flipped components in FIG. 17.

The first higher power line 628A in FIG. 6 and the second higher power line 1228A in FIG. 12 are combined to form a higher power line 1728A across the joint portion 1710. The first lower power line 628E in FIG. 6 and the second lower power line 1228E in FIG. 12 are combined to form a lower power line 1728E across the joint portion 1710.

Figure 18:
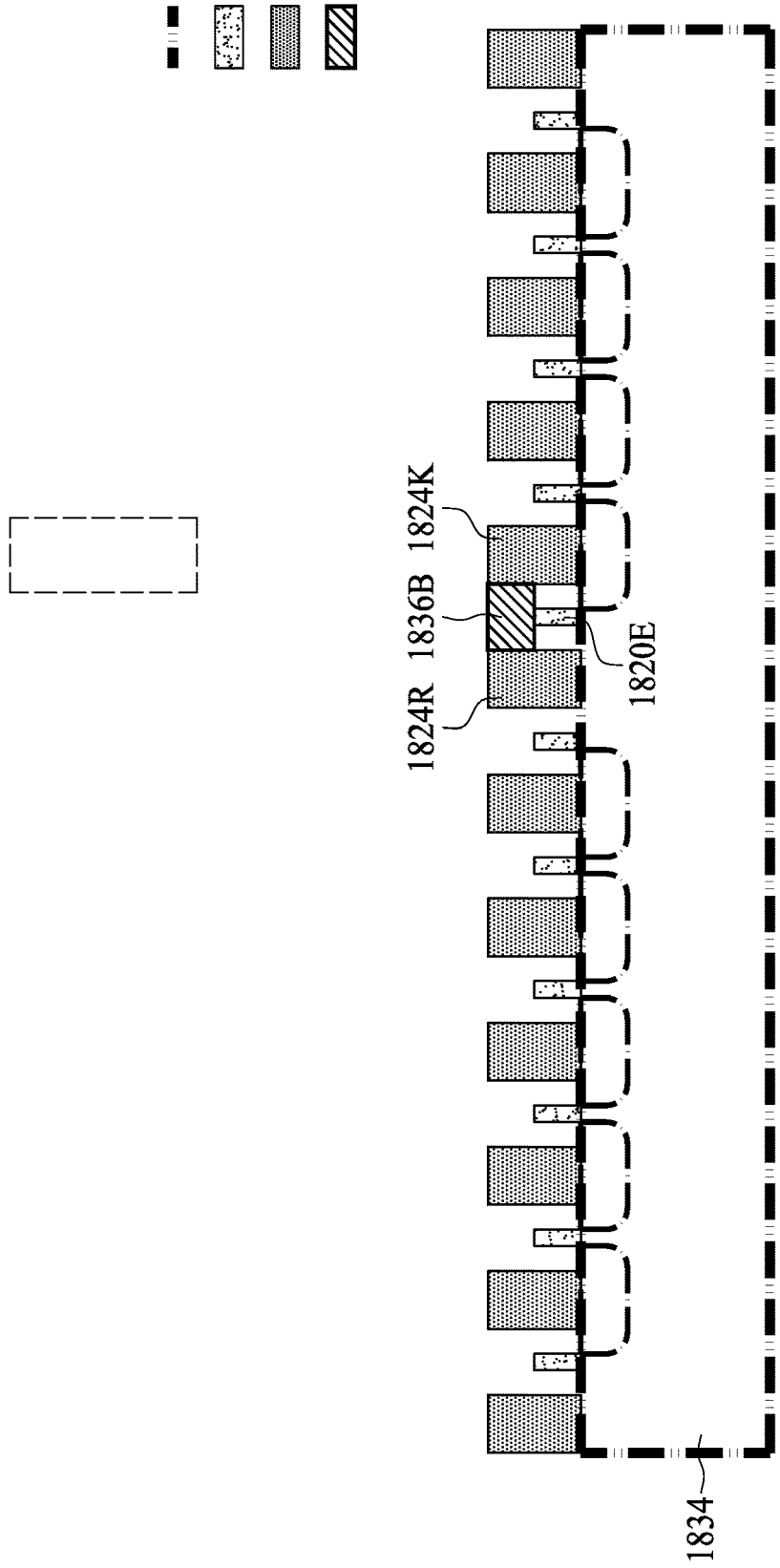
FIG. 18 is a diagram of a cross-section of the combined AOI22D1 gate and OAI21D1 gate taken along a line corresponding to line DD' in FIG. 17, in accordance with some embodiments.

The layout portion 1708 includes a node N171 and a node N172. The node N171 includes conductive lines 1224K and 1724R in the effective MD layer, a conductive line 1736B in the MP layer, conductive vias 1226J and 1726Q in the VIA0 layer, and the higher power line 1728A in the M0 layer. The conductive line 1224K overlaps with the source or drain region 16TPL$_{11B}$. The conductive line 1724R resides in the joint portion 1710. The conductive line 1736B in the MP layer is over a gate line 1720E and directly connects with the conductive lines 1224K and 1724R. FIGS. 17 and 18 show corresponding horizontal relationships and vertical relationships of the conductive line 1736B with the gate line 1720E and conductive lines 1224K and 1724R. The higher power line 1728A overlaps with the conductive lines 1224K and 1724R. The conductive vias 1226J and 1726Q are located at where the higher power line 1728A overlaps with the corresponding conductive lines 1224K and 1724R. The node N172 includes conductive lines 1524F and 1724S in the effective MD layer, a conductive line 1736C in the MP layer, conductive vias 1526F and 1726R in the VIA0 layer, and the lower power line 1728E in the M0 layer. The conductive line 1524F overlaps with the source or drain region 15TPR$_{4A2}$. The conductive line 1724S resides in the joint portion 1710. The conductive line 1736C directly connects with the conductive lines 1524F and 1724S. The lower power line 1728E overlaps with the conductive lines 1524F and 1724S. The conductive vias 1526F and 1726R are located at where the lower power line 1728E overlaps with the corresponding conductive lines 1524F and 1724S. In this way, the conductive lines 1224K and 1724R are coupled in parallel. The node N171 renders the source or drain region 16TPL$_{11B}$ non-selectively electrically coupled to the higher power line 1728A. The conductive lines 1524F and 1724S are coupled in parallel. The node N172 renders the source or drain region 15TPR$_{4A2}$ non-selectively electrically coupled to the lower power line 1728E.

The node N171 draws current from the higher power line 1728A with the parallel coupled conductive lines 1224K and 1724R and the node N172 discharges current to the lower power line 1728E with the parallel coupled conductive lines 1524F and 1724S. Therefore, performance of the combined AOI122D1 gate and OAI21 D1 gate 1408 is enhanced because of the larger current supplied by the higher power line 1728A and the lower power line 1728E through the corresponding nodes N171 and N172.

FIG. 18 is a diagram of a cross-section 1808 of the combined AOI22D1 gate and OAI21D1 gate 1408 taken along a line corresponding to line DD' in FIG. 17, in accordance with some embodiments. Shapes in the layout portion 1708 in FIG. 17 and correspondingly manufactured structures in FIG. 18 are labeled by like reference numerals. In the cross-section 1808, vertical relationships of the substrate layer SUB, the PO layer, the effective MD layer and the MP layer are shown.

The cross-section 1808 includes a substrate 1834 associated with the substrate layer SUB, a gate line 1820E associated with the PO layer, conductive lines 1824R and 1824K associated with the effective MD layer, and a conductive line 1836B associated with the MP layer.

The gate line 1820E is formed on the substrate 1834. The substrate 1834 is also referred to as a wafer described with reference to FIG. 1. The conductive lines 1824R and 1824K are formed on opposite sides of the gate line 1820E and exceeding the gate line 1820E in height. The conductive line 1836B is formed over the gate line 1820E and is directly connected to portions of the conductive lines 1824R and 1824K beyond the gate line 1820E in height.

Figure 19:
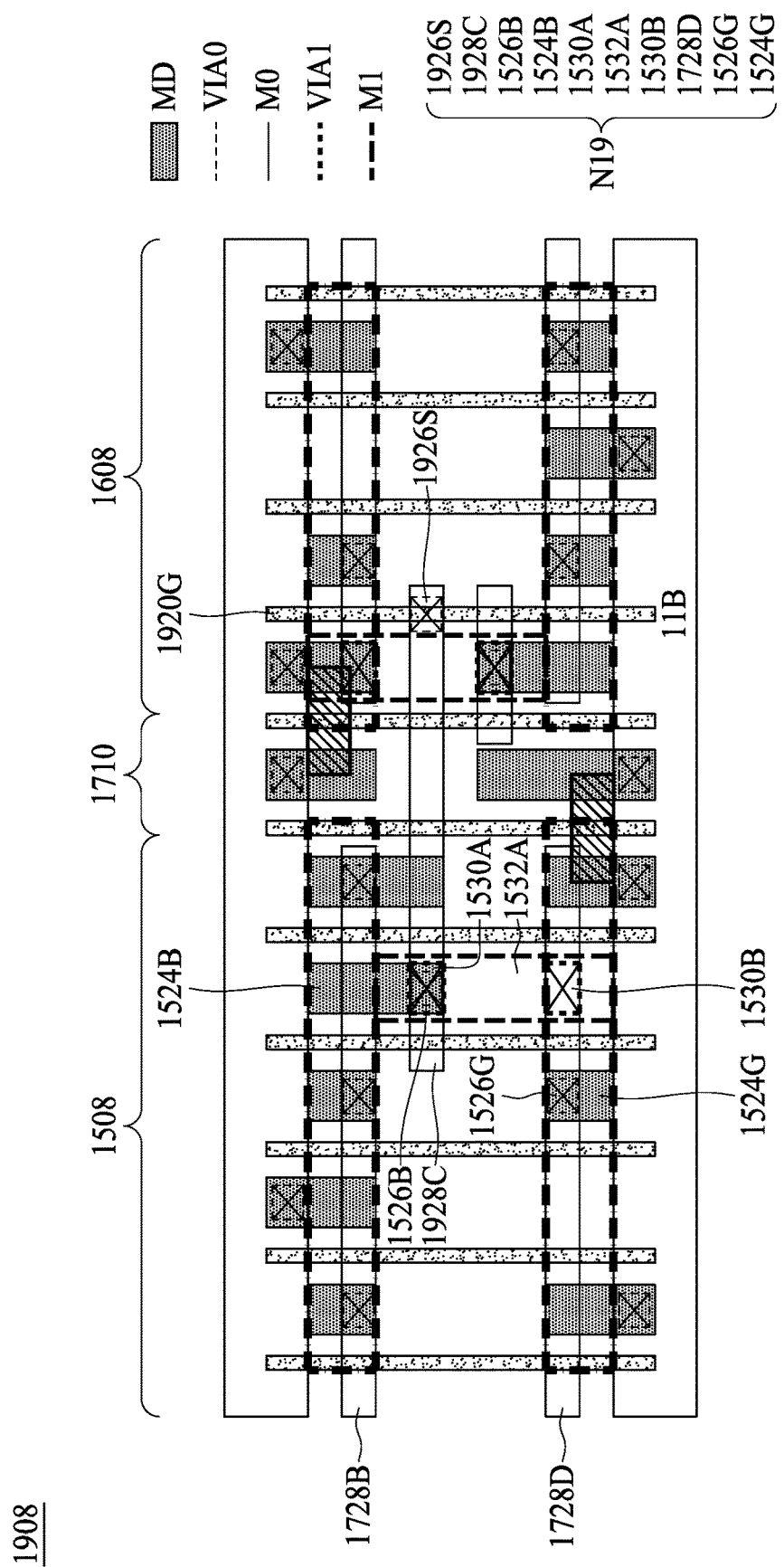
FIG. 19 is a diagram of a layout portion with a node corresponding to the combined AOI22D1 gate and OAI21D11 gate with a node in FIG. 14, in accordance with some embodiments.

FIG. 19 is a diagram of a layout portion 1908 with a node N19 corresponding to the combined AOI22D1 gate and OAI21D1 gate 1406 with the node N14 in FIG. 14, in accordance with some embodiments. The third cell layout in operation 208 includes the layout portion 1908. In the layout portion 1908, the node N19 is formed by non-selectively electrically coupling an output pin in the layout portion 1508 corresponding to the output pin O4 in FIG. 4 directly to the gate line $16TG_{11B}$ and not to an input pin corresponding to the input pin I11B in FIG. 11 through a conductive line 1928C in the M0 layer.

In the layout portion 1908, the node N19 includes a conductive via 1926S in the VIA0 layer, a conductive line 1928C in the effective M0 layer, the conductive via 1526B in the VIA0 layer, the conductive line 1524B in the MD layer, the conductive via 1530A in the VIA1 layer, the conductive line 1532A in the M1 layer, the conductive via 1530B in the VIA1 layer, the conductive line 1728D in the M0 layer, the conductive via 1526G in the VIA0 layer and a conductive line 1524G in the effective MD layer. The conductive line 1928C extended from the layout portion 1508 into the layout portion 1608 overlaps with the gate line $16TG_{11B}$. The conductive via 1926S is located at where the conductive line 1928C overlaps with the gate line $16TG_{11B}$. In this way, the node N19 corresponds to the node N14 in FIG. 14.

The conductive line 1928C in the effective M0 layer directly non-selectively electrically couples the output pin in the layout portion 1508 corresponding to the output pin O4 in FIG. 4 to the gate line $16TG_{11B}$. Therefore, the use of a conductive via in the VIA1 layer and a conductive line in the M1 layer for an input pin in the layout portion 1608 corresponding to the input pin I11B in FIG. 11 is eliminated.

Figure 20:
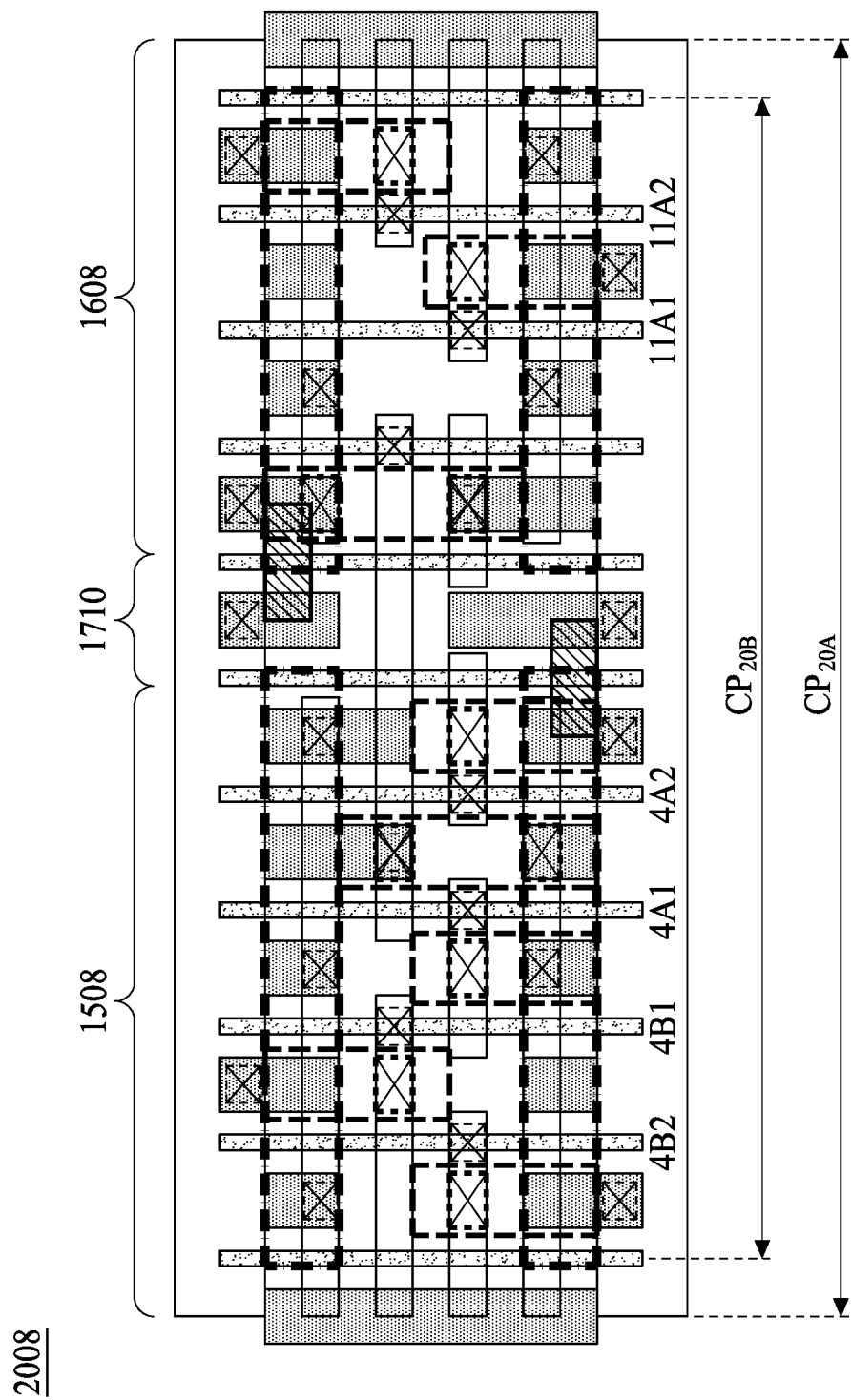
FIG. 20 is a diagram of a layout of the combined AOI22D1 gate and OAI21D1 gate, in accordance with some embodiments.

FIG. 20 is a diagram of a layout 2008 of the combined AOI22D1 gate and OAI21D1 gate 1408, in accordance with some embodiments. The third cell layout in operation 208 further includes shapes in the layout 2008 for input pins I4B2, I4B1, I4A1, I4A2, I11A1 and I11A2 in FIG. 14 similar to the input pin I13B in layout 1306 in FIG. 13 for the input pin I11B in FIG. 11. Furthermore, a cell pitch $CP_{20A}$ of the layout 2008 of the combined AOI22D1 gate and OAI21D1 gate 1408 spans the layout portion 1508, the joint portion 1710 and the layout portion 1608.

In the layout 2008, a dummy conductive line-bordered cell pitch $CP_{20A}$ spans the layout portion 1508, the joint portion 1710 and the layout portion 1608. A dummy conductive line-bordered pitch of the layout portion 1508 and the joint portion 1710 is equal to the cell pitch $C_{9A}$ in FIG. 9 which is 6 MDPs. A dummy conductive line-bordered pitch of the layout portion 1608 and the joint portion 1710 is equal to the cell pitch $C_{13A}$ in FIG. 13 which is 5 MDPs. Therefore, the cell pitch $CP_{20A}$ is equal to a sum of the pitch of the layout portion 1508 and the joint portion 1710, and the pitch of the layout portion 1608 and the joint portion 1710 which is 11 MDPs. In other embodiments, a layout (not shown) does not include the dummy conductive lines of the layout 2008 which forms borders of the cell pitch $CP_{20A}$ and has a dummy gate line-bordered cell pitch $CP_{20B}$ equal to a sum of the dummy gate line-bordered cell pitch $CP_{9B}$ in FIG. 9 which is 5 MDPs, the dummy gate line-bordered cell pitch $CP_{13B}$ in FIG. 13 which is 4 MDPs and a dummy gate line-bordered pitch of the joint portion 1710 which is 1 MDP. Therefore, the cell pitch $CP_{20B}$ is equal to 10 MDPs.

Horizontal and vertical relationships of the PO layer, the OD layer, the effective MD layer, the MP layer, the VIA0 layer, the effective M0 layer, the VIA1 layer and the M1 layer have been described above. In the following, the horizontal and vertical relationships of PO layer, the OD layer, the effective MD layer, the MP layer, the VIA0 layer, the effective M0 layer, the VIA1 layer and the M1 layer apply to non-selectively electrically coupled elements and are omitted to be described in detail for brevity.

Figure 21:
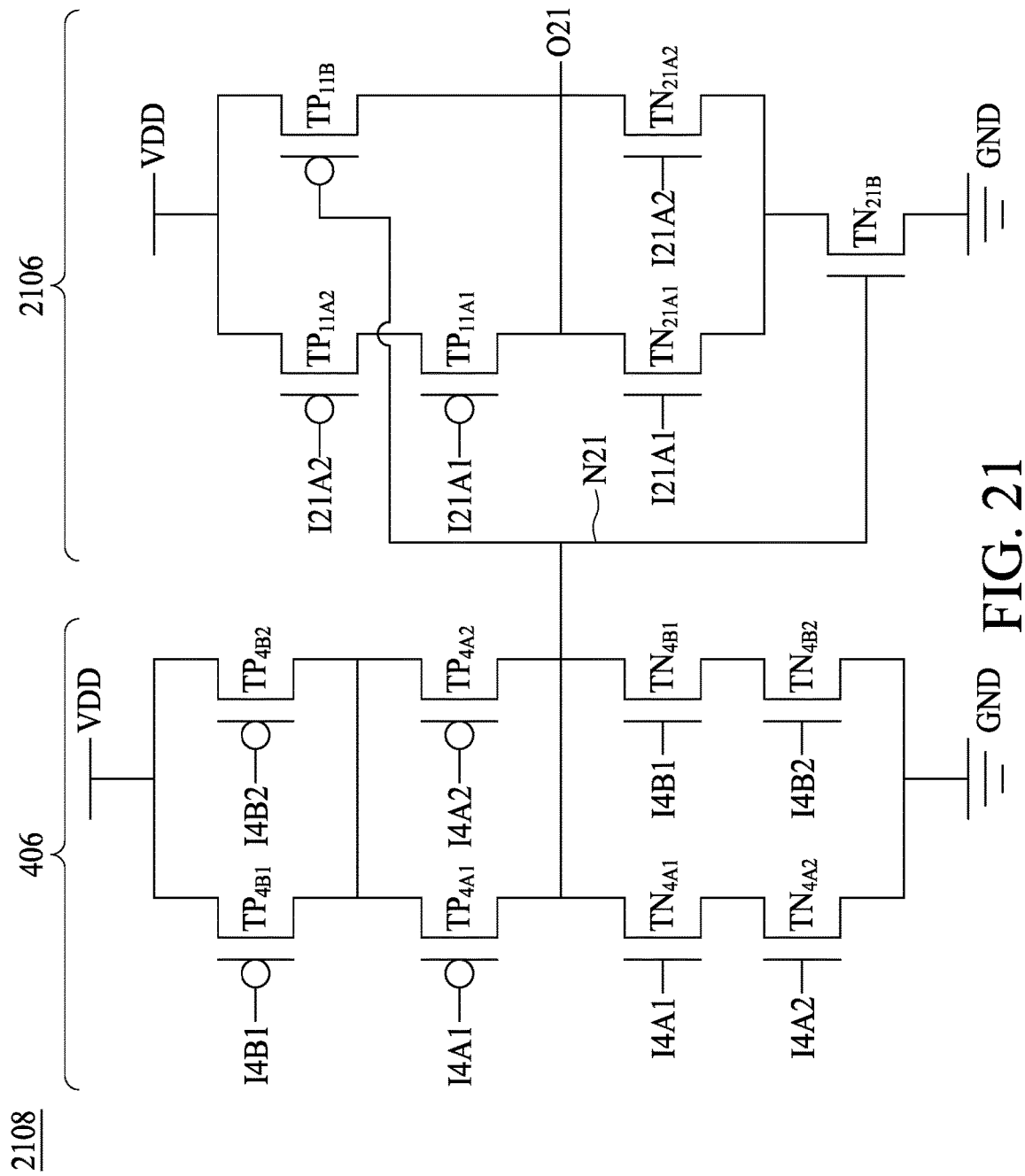
FIG. 21 is a schematic circuit diagram of combined AOI22D1 gate and OAI21D1 gate, in accordance with some embodiments.

Combined Cell Layouts Through Adding Gate Finger Line, Re-Ordering Transistors in Series and Joining to Gate Line and Circuit Manufactured Based on the Same FIG. 21 is a schematic circuit diagram of combined AOI22D1 gate and OAI21D1 gate 2108, in accordance with some embodiments. The combined AOI22D1 gate and OAI21D1 gate 2108 corresponds to the third cell layout in operation 208. Compared to the combined AOI22D1 gate and OAI21D1 gate 1408 in FIG. 14, the combined AOI22D1 gate and OAI21D1 gate 2108 includes an OAI21D1 gate 2106 having NEFTs $TN_{21A1}$, $TN_{21A2}$ and $TN_{21B}$ reordered from the NFETs $TN_{11A1}$, $TN_{11A2}$ and $TN_{11B}$ in the at least one down transistor 1118 in FIG. 11. Compared to the NFETs $TN_{11A1}$, $TN_{11A2}$ and $TN_{11B}$, the source of the $NFET_{21B}$ is non-selectively electrically coupled to the lower power node VDD). The drain of the $NFET_{21B}$ is non-selectively electrically coupled to the sources of the parallel coupled NFETs $TN_{21A1}$ and $TN_{21A2}$. The drains of the parallel coupled NFETs $TN_{21A1}$ and $TN_{21A2}$ are non-selectively electrically coupled to an output node O21. Elements which are corresponding but are associated with the different orders in the OAI21D1 gate 1106 in FIG. 14 and the OAI21D1 gate 2106 in FIG. 21 are labeled by like reference numerals.

In operation 208, the first cell layout including the layout portion 606 in FIG. 6 and the second cell layout including the layout portion 1206 in FIG. 12 are combined into a third cell layout including a layout portion 2508 to be described with reference to FIG. 25.

In operation 310 in FIG. 3, a first source or drain region $6TPL_{4B2}$ of the at least one first up transistor 516 in the first cell layout and a second source or drain region $12TPL_{11B}$ of at least one second up transistor 1216 in the second cell layout are combined through adding a gate finger line, re-arranging and joining to form the third cell layout. In addition, in operation 310 in FIG. 3, a third source or drain region $6TNL_{4B2}$ of the at least one first down transistor 518 in the first cell layout and a fourth source or drain region $12TNL_{11B}$ of the at least one second down transistor 1218 in the second cell layout are combined through adding the gate finger line, re-arranging, and joining to form the third cell layout. Adding the gate finger line and re-arranging are to be described with reference to FIGS. 22 and 23. Joining is to be described with reference to FIG. 24.

Figure 22:
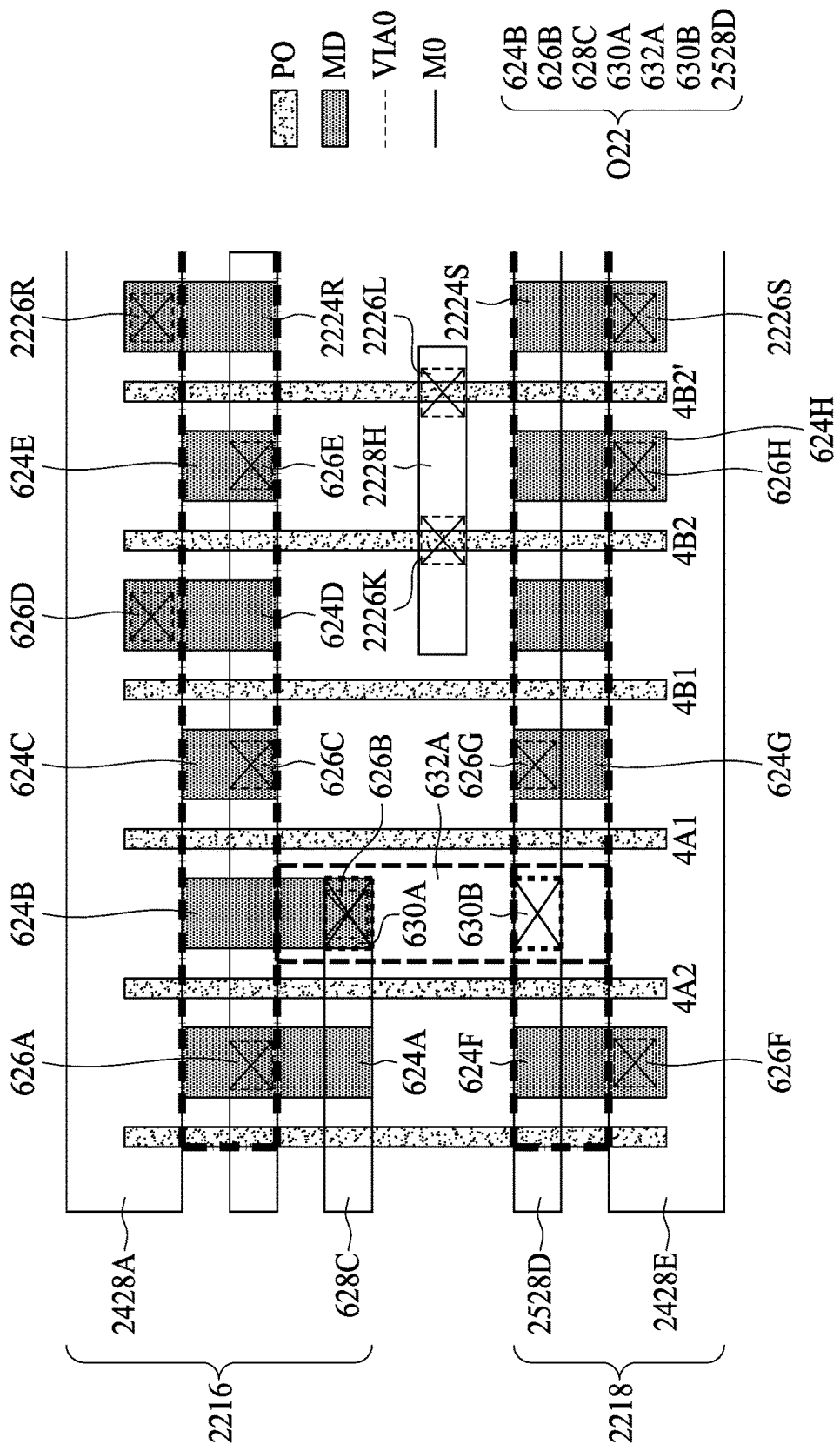
FIG. 22 is a diagram of a layout portion corresponding to the AOI22D1 gate in the combined AOI22D1 gate and OAI21D1 gate in FIG. 21, in accordance with some embodiments.

FIG. 22 is a diagram of a layout portion 2208 corresponding to the AOI22D1 gate 406 in the combined AOI22D1 gate and OAI21D1 gate 2108 in FIG. 21, in accordance with some embodiments. Compared to the gate lines $6TG_{4A2}$, $6TG_{4A1}$, $6TG_{4B1}$ and $6TG_{4B2}$ in the layout portion 606, the gate lines in the layout portion 2208 further includes a gate finger line $22TG_{4B2}$, non-selectively electrically coupled to a gate finger line $6TG_{4B2}$.

The layout portion 2208 includes shapes of the layout portion 606 which are labeled in FIG. 22 the same as those of the layout portion 606 and further includes a gate finger line 22TG$_{4B2'}$ in the PO layer, conductive lines 2224R and 2224S in the effective MD layer, conductive vias 2226K, 2226L, 2226R and 2226S in the VIA0 layer and a conductive line 2228H in the M0 layer. Elements which are corresponding in the layout portion 606 and the layout portion 2208 but are different due to the added gate finger line 22TG$_{4B2'}$ are labeled by like reference numerals.

A gate line 6TG$_{4B2}$ and the gate finger line 22TG$_{4B2'}$ are non-selectively electrically coupled through corresponding conductive vias 2226K and 2226L and a conductive line 2228H. By adding the gate finger line 22TG$_{4B2'}$, a PFET 22TP$_{4B2'}$ in parallel with a PEFT 6TP$_{4B2}$ is added. The gate finger line 22TG$_{4B2'}$ is the right most gate line of the layout portion 2208. Corresponding to the source of the PFET TP$_{4B2}$ in FIG. 21 which is non-selectively electrically coupled to the higher power node VDD, the source or drain region 6TPL$_{4B2}$ of the PFET 6TP$_{4B2}$ and the source or drain region 22TPR$_{4B2'}$ of the PFET 22TP$_{4B2'}$ are non-selectively electrically coupled to a higher power line 2428A. The source or drain region 22TPR$_{4B2'}$ is non-selectively electrically coupled to the higher power line 2428A through the conductive line 2224R and the conductive via 2226R. The source or drain region 22TNR$_{4B2'}$ is non-selectively electrically coupled to a lower power line 2228E through the conductive line 2224S and the conductive via 2226S.

Figure 23:
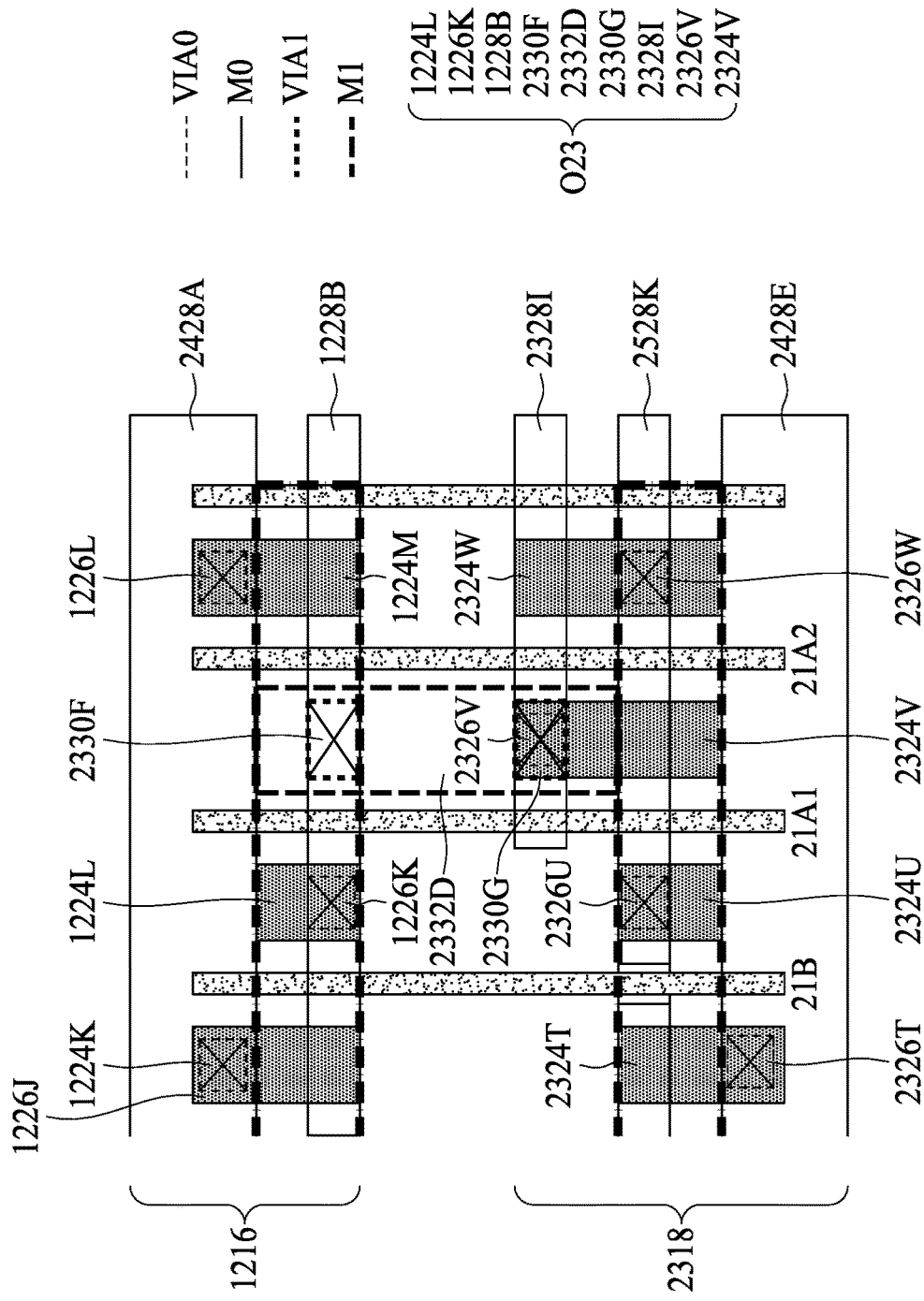
FIG. 23 is a diagram of a layout portion corresponding to the OAI21D1 gate in the combined AOI22D1 gate and OAI21D1 gate in FIG. 21, in accordance with some embodiments.

FIG. 23 is a diagram of a layout portion 2308 corresponding to the OAI21D1 gate 2106 in the combined AOI22D1 gate and OAI21D1 gate 2108 in FIG. 21, in accordance with some embodiments. Compared to the at least one first down transistor 1218 in the layout portion 1206 in FIG. 12, at least one first down transistor 2318 in the layout portion 2308 in FIG. 23 has a plurality NFETs 23TN$_{21B}$, 23TN$_{21A1}$, 23TN$_{21A2}$ which correspond to the re-ordered NFETs TN$_{21B}$, TN$_{21A1}$ and TN$_{21A2}$ in FIG. 21.

The layout portion 2308 includes shapes of the layout portion 1206 which are labeled in FIG. 23 the same as those of the layout portion 1206 and further includes at least one first down transistor 2318, conductive lines 2324T to 2324W in the effective MD layer, conductive vias 2326T to 2326W in the VIA0 layer, a conductive line 2328I in the M0 layer, conductive vias 2330F and 2330G in the VIA1 layer, and a conductive line 2332D in the M1 layer.

A source or drain region 23TNL$_{21B}$ is non-selectively electrically coupled to the second lower power line 2428E through the conductive line 2324T and the conductive via 2326T. The source or drain region 23TNL$_{21B}$ corresponds to the source of the NFET TN$_{21B}$ non-selectively electrically coupled to the lower power node GND.

Source or drain regions 23TNR$_{21A1}$ and 23TNL$_{21A2}$ are shared and correspond to the corresponding drains of the NFETs TN$_{21A1}$ and TN$_{21A2}$ which are non-selectively electrically coupled together.

Source or drain regions 23TNL$_{21A1}$ and 23TNR$_{21A2}$ are non-selectively electrically coupled together through the corresponding conductive lines 2324U and 2324W, the corresponding conductive vias 2326U and 2326W, and the conductive line 2528K. The source or drain regions 23TNL$_{21A1}$ and 23TNR$_1$ correspond to the corresponding sources of the NFETs TN$_{21A1}$ and TN$_{21A2}$ which are non-selectively electrically coupled together. In this way, the NFETs TN$_{21A1}$ and TN$_{21A2}$ are coupled in parallel.

Source or drain regions 23TNR$_{21B}$ and 23TNL$_{21A1}$ are shared and correspond to the corresponding drain of the NFET TN$_{21B}$ and source of the NFET TN$_{21A1}$ which are non-selectively electrically coupled together. In this way, parallel coupled the NFETs TN$_{21A1}$ and TN$_{21A2}$ is coupled in series with the NFET TN$_{21B}$.

The shared source or drain regions 23TNR$_{21A1}$ and 23TNL$_{21A2}$ are non-selectively electrically coupled to an output pin O23. The output pin O23 corresponds to the output pin O21 in FIG. 21. The output pin O23 includes the conductive line 1224L, conductive via 1226K, the conductive line 1228B, the conductive via 2330F, the conductive line 2332D, the conductive via 2330G, the conductive line 2328I, the conductive via 2326V and the conductive line 2324V. In this way, drains of the PFETs TP$_{11A1}$ and TP$_{11B}$ and drains of the NFETs TN$_{21A1}$ and TN$_{21A2}$ are non-selectively electrically coupled to the output pin O21.

Figure 24:
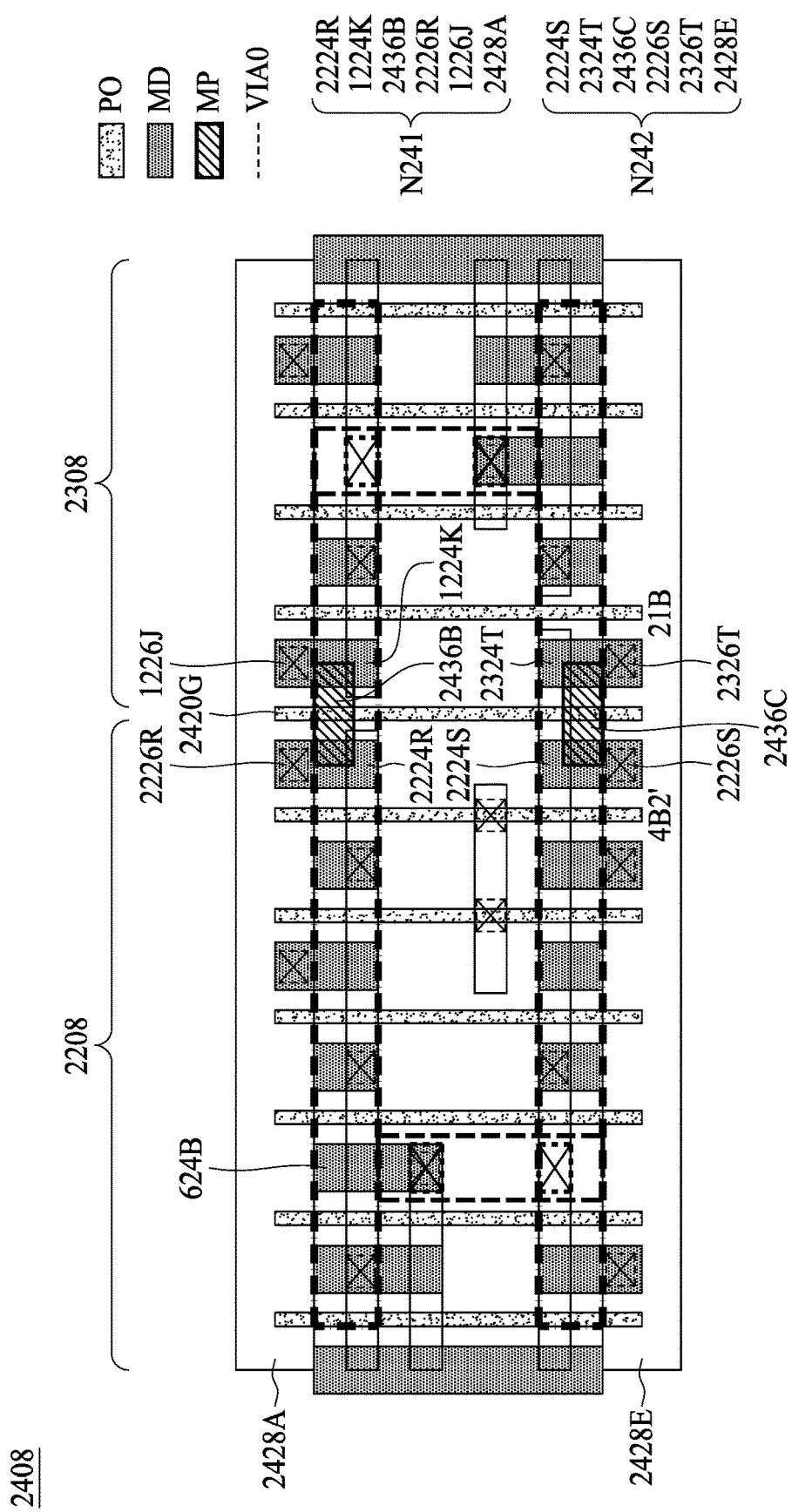
FIG. 24 is a diagram of a layout portion with a gate line for joining the AOI22D1 gate and the OAI21D1 gate in the combined AOI22D1 gate and OAI21D1 gate in FIG. 21, in accordance with some embodiments.

FIG. 24 is a diagram of a layout portion 2408 with a gate line 2420G for joining the AOI22D1 gate 406 and the OAI21D11 gate 2106 in the combined AOI22D1 gate and OAI21D1 gate 2108 in FIG. 21, in accordance with some embodiments. The third cell layout in operation 208 includes the layout portion 2408 which includes the layout portion 2208 in FIG. 22, the layout portion 2308 in FIG. 23 and the gate line 2420G. In the layout portion 2408, a node N241 includes parallel coupled conductive lines 2224R and 1224K and renders the source or drain regions 22TPR$_{4B2}$, and 23TPL$_{21B}$ non-selectively electrically coupled to a higher power line 2428A. A node N242 includes parallel coupled conductive lines 2224S and 2324T and renders the source or drain regions 22TNR$_{4B2'}$ and 23TNL$_{21B}$ non-selectively electrically coupled to a lower power line 2428E.

The first source or drain region 22TPR$_{4B2'}$ of the added gate finger line 22TG$_{4B'}$ in the layout portion 2208 and the second source or drain region 23TPL$_{21B}$ in the layout portion 2308 are joined to a corresponding left side and right side of a gate line 24200. The third source or drain region 22TNR$_{4B2'}$ of the added gate finger line 22TG$_{4B2'}$ in the layout portion 2208 and the re-arranged third source or drain region 23TNL$_{21B}$ in the layout portion 2308 are joined to the corresponding left side and right side of the gate line 2420G.

The first higher power line 628A in FIG. 6 and the second higher power line 1228A in FIG. 12 are combined to form a higher power line 2428A in FIG. 24 are combined to form a higher power line 2428A across the gate line 2420G. The first lower power line 628E in FIG. 6 and the second lower power line 2428E in FIG. 12 are combined to form a lower power line 1728E across the gate line 2420G.

The layout portion 2408 includes a node N241 and a node N242. The node N241 includes conductive lines 2224R and 1224K in the MD layer, a conductive line 2436B in the MP layer, conductive vias 2226R and 1226J in the VIA0 layer, and the higher power line 2428A in the M0 layer. The conductive lines 2224R and 2224K are coupled in parallel through the conductive line 2436B, the conductive vias 2226R and 1226J and the higher power line 2428A. The node N241 renders the source or drain regions 22TPR$_{4B2}$, and 23TPL$_{21B}$ non-selectively electrically coupled to the higher power line 2428A. The node N242 includes conductive lines 2224S and 2324T in the MD layer, a conductive line 2436C in the MP layer, conductive vias 2226S and 2326T in the VIA0 layer, and the lower power line 2428E in the M0 layer. The conductive lines 2224S and 2324T are coupled in parallel through the conductive line 2436C, the conductive vias 2226S and 2326T and the lower power line 2428E. The node N242 renders the source or drain regions 22TNR$_{4B2'}$ and 23TNL$_{21B}$ non-selectively electrically coupled to the lower power line 2428A.

The node N241 draw current from the higher power line 2428A with the parallel coupled conductive lines 2224R and 1224K and the node N242 discharges current to the lower power line 2428E with the parallel coupled conductive lines 2224S and 2324T. Therefore, performance of the combined AOI22D1 gate and OAI21D11 gate 1408 is enhanced because of the larger current supplied by the higher power line 2428A and the lower power line 2428E through the corresponding nodes N241 and N242.

Figure 25:
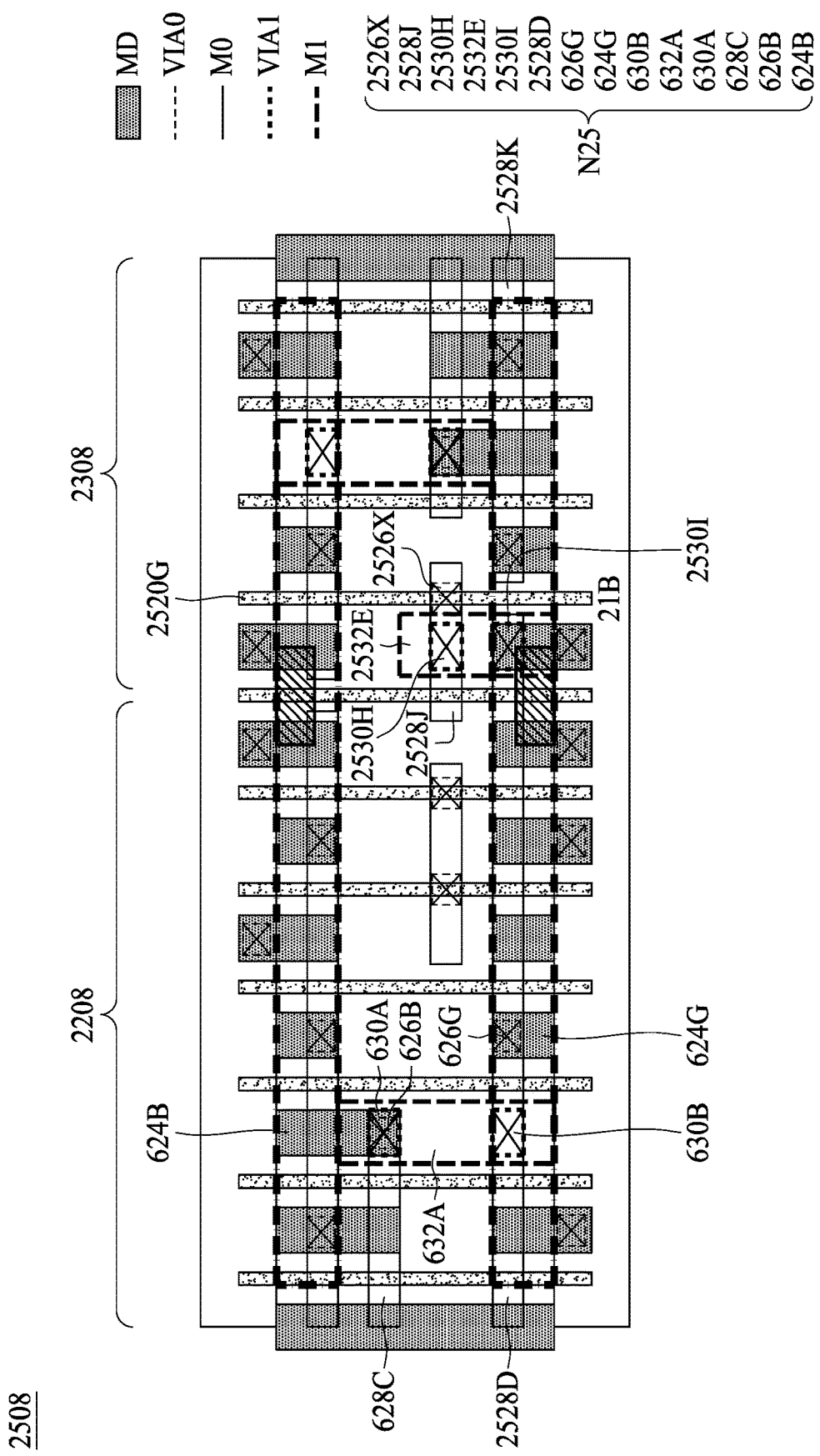
FIG. 25 is a diagram of a layout portion with a node corresponding to the combined AOI22D1 gate and OAI21D1 gate with a node in FIG. 14, in accordance with some embodiments.

FIG. 25 is a diagram of a layout portion 2508 with a node N25 corresponding to the combined AOI22D1 gate and OAI21D1 gate 2106 with the node N21 in FIG. 14, in accordance with some embodiments. The third cell layout in operation 208 includes the layout portion 2508. In the layout portion 2508, the node N25 is formed by non-selectively electrically coupling an output pin in the layout portion 2208 corresponding to the output pin O4 in FIG. 4 to an input pin in the layout portion 2308 corresponding to the input pin I11B in FIG. 11 through a conductive line 2528D in the M0 layer.

In the layout portion 2508, the node N25 includes a conductive via 2526X in the VIA0 layer, a conductive line 2528J in the effective M0 layer, a conductive via 2530H in the VIA1 layer, a conductive line 2532E in the M1 layer, a conductive via 2530I in the VIA1 layer, a conductive line 2528D in the effective M0 layer, a conductive via 626G in the VIA0 layer, a conductive line 6240 in the effective MD layer, a conductive via 630B in the VIA1 layer, a conductive via 630A in the VIA1 layer, a conductive line 628C in the effective M0 layer, a conductive via 626C in the VIA0 layer and a conductive line 624B in the effective MD layer. The conductive line 2528D extended from the layout portion 2208 into the layout portion 2308 overlaps with the conductive line 2532E which is a portion of an input pin in the layout portion 2308 corresponding to the input pin I11B in FIG. 11. The conductive via 2530I is located at where the conductive line 2428D overlaps with the conductive line 2532E. In this way, the node N25 corresponds to the node N21 in FIG. 21.

Figure 26:
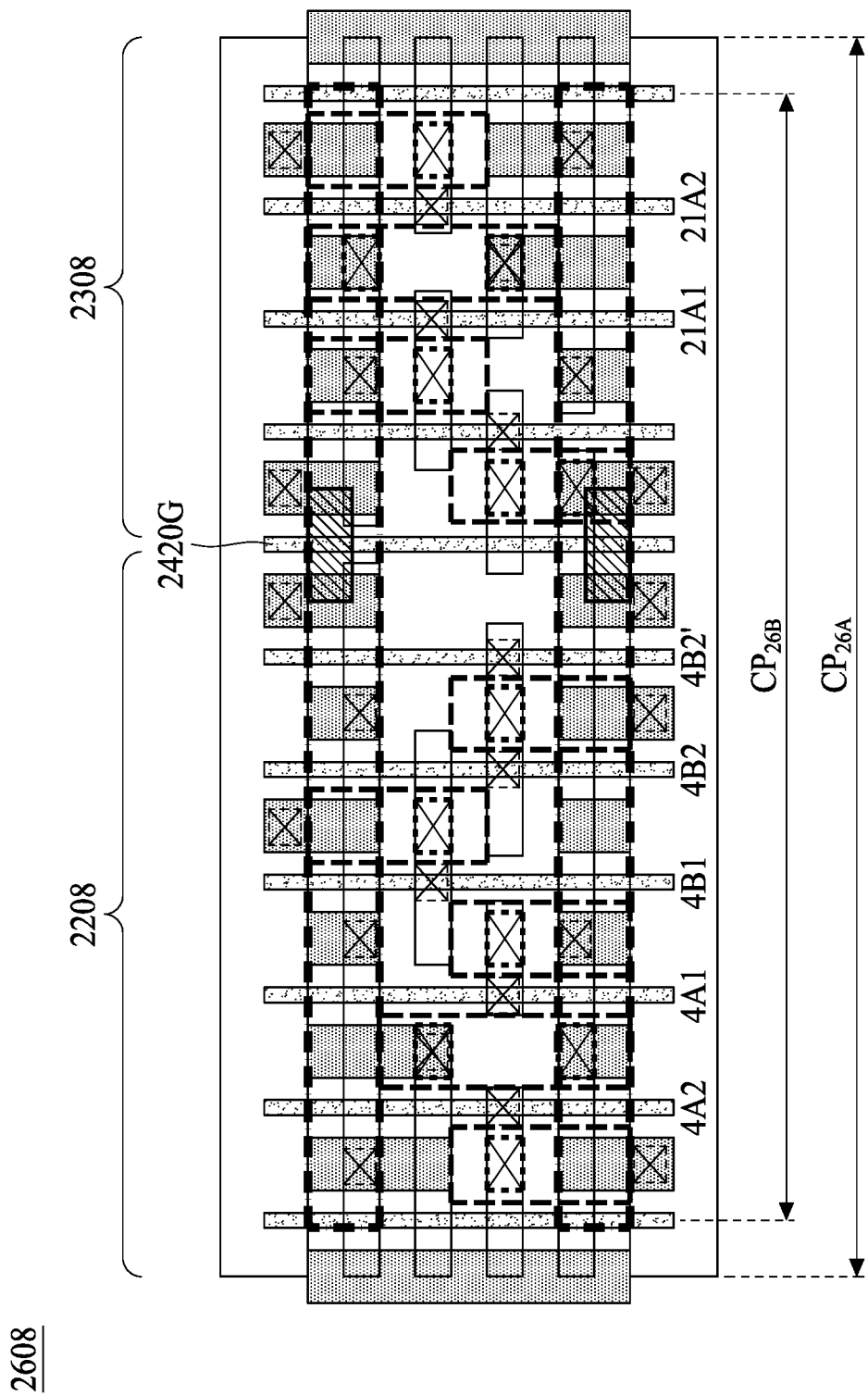
FIG. 26 is a diagram of a layout of the combined AOI22D1 gate and OAI21D1 gate, in accordance with some embodiments.

FIG. 26 is a diagram of a layout 2608 of the combined AOI22D1 gate and OAI21D1 gate 2108, in accordance with some embodiments. The third cell layout in operation 208 further includes shapes in the layout 2608 for input pins I4A2, I4A1, I4B1, I4B2, I21A1 and I21A2 similar to the input pin I13B described with reference to FIG. 13. Furthermore, a cell pitch $CP_{26A}$ of the layout 2608 of the combined AOI22D1 gate and OAI21D1 gate 2108 spans the layout portion 2208, the gate line 2420G and the layout portion 2308.

In the layout 2608, a dummy conductive line-bordered cell pitch $CP_{26A}$ spans the layout portion 2208, the gate line 2420G and the layout portion 2308. The layout portion 2208 has the added gate finger line $22TG_{4B2'}$ and is not appended with a conductive line between the layout portion 2208 and the layout portion 2308. A dummy conductive line-bordered pitch of the layout portion 2208 is equal to the cell pitch $C_{9A}$ in FIG. 9 which is 6 MDPs. The layout portion 2308 is not appended with a conductive line between the layout portion 2208 and the layout portion 2308. The dummy conductive line-bordered pitch of the layout portion 2308 is equal to the cell pitch $C_{13A}$ in FIG. 13 which is 5 MDPs subtracted by 1 MDP. The cell pitch $CP_{26A}$ is equal to a sum of the pitch of the layout portion 2208 and the pitch of the layout portion 2308 added by 1 MDP for double subtraction of the conductive line between the layout portion 2208 and the layout 2308, which is equal to 11 MDPs. In other embodiments, a layout (not shown) does not include the dummy conductive lines of the layout 2608 which forms borders of the cell pitch $CP_{26A}$ and has a dummy gate line-bordered cell pitch $CP_{26B}$ equal to a sum of the dummy gate line-bordered cell pitch $CP_{9B}$ in FIG. 9 which is 5 MDPs added by 1 MDP for the added gate finger line $22TG_{4B2'}$, a dummy gate line-bordered cell pitch $CP_{13B}$ in FIG. 13 which is 4 MDPs. Therefore, the cell pitch $CP_{26B}$ is equal to 10 MDPs.

Figure 27:
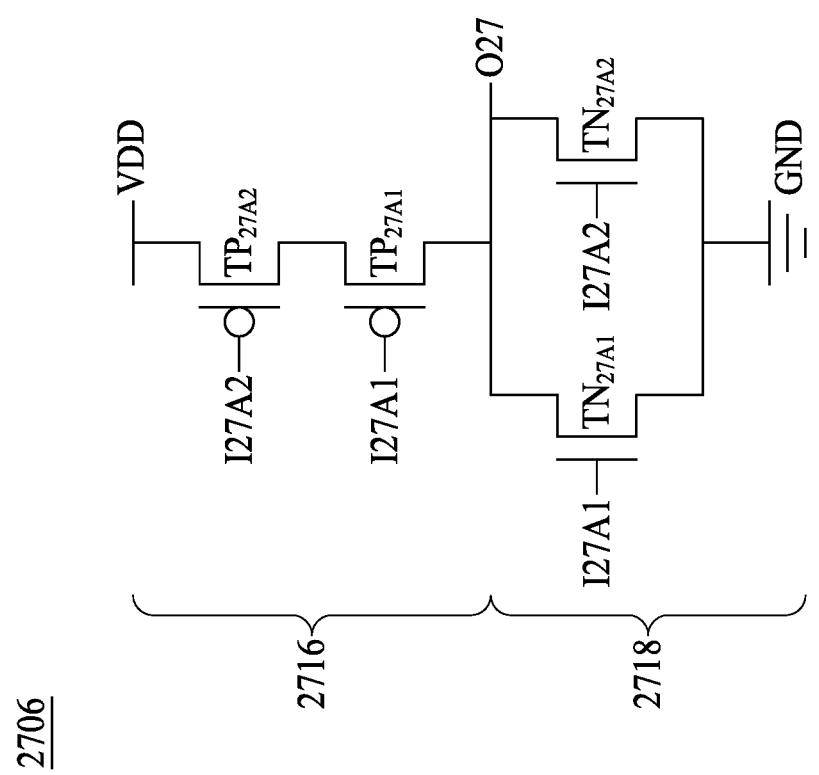
FIG. 27 is a schematic circuit diagram of an NR2D1 gate, in accordance with some embodiments.

Combined Cell Layouts Through Sharing and Circuit Manufactured Based on the Same FIG. 27 is a schematic circuit diagram of an NR2D1 gate 2706, in accordance with some embodiments. The NR2D1 gate 2706 corresponds to the first cell layout in operation 206. In the NR2D1 gate 2706, an output pin O27 is electrically coupled to a higher power node VDD through at least one first up transistor 2716 and to a lower power node GND through the at least one first down transistor 2718.

The NR2D1 gate 2706 includes at least one first up transistor 2716 and at least one first down transistor 2718. The at least one first up transistor 2716 includes PFETs $TP_{27A1}$ and $TP_{27}A2$. The at least one first down transistor 2718 includes NFETs $TN_{27A1}$ and $TN_{27A2}$.

A source of the PFET $TP_{27A2}$ is non-selectively electrically coupled to a higher power node VDD. The PFETs $TP_{27A2}$ and $TP_{27A1}$ are coupled in series such that a drain of the PFET $TP_{27A2}$ is non-selectively electrically coupled to a source of the PFET $TP_{27A1}$.

Sources of the NFETs $TN_{27A1}$ and $TN_{27A2}$ are non-selectively electrically coupled to a lower power node GND. The NFETs $TN_{27A1}$ and $TN_{27A2}$ are coupled in parallel.

A drain of the PFET $TP_{27A}$ and drains of the parallel coupled NFETs $TN_{27A1}$ and $TN_{27A2}$ are non-selectively electrically coupled to an output pin O27. In this way, the output pin O27 is electrically coupled to the higher power node VDD through the at least one first up transistor 2716 and electrically coupled to the lower power node GND) through the at least one first down transistor 2718. Gates of the PFETs $TP_{27A1}$ and $TP_{27A2}$, and NFETs $TN_{27A1}$ and $TN_{27A2}$ are non-selectively electrically coupled to corresponding input pins I27A1 and I27A2.

Figure 28:
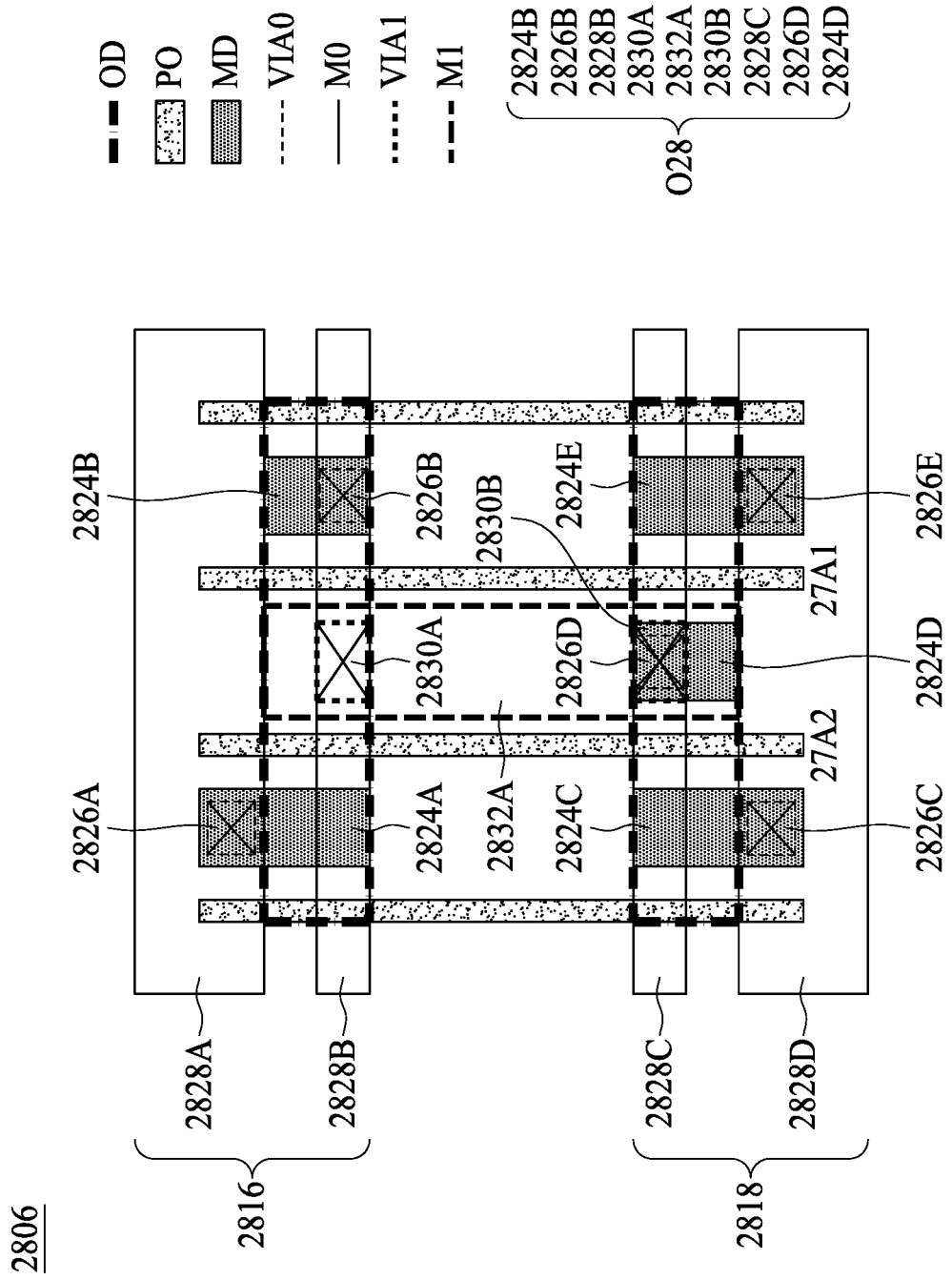
FIG. 28 is a diagram of a layout portion of the NR2D1 gate in FIG. 27, in accordance with some embodiments.

FIG. 28 is a diagram of a layout portion 2806 of the NR2D1 gate 2706 in FIG. 27, in accordance with some embodiments. The first cell layout in operation 206 includes the layout portion 2806. In the layout portion 2806, at least one first up transistor 2816 corresponds to the at least one first up transistor 2716 in FIG. 27. At least one first down transistor 2818 corresponds to the at least one first down transistor 2718 in FIG. 27. An output pin O28 corresponds to the output pin O27 in FIG. 27. A first higher power line 2828A corresponds to the higher power node VDD in FIG. 27. A first lower power line 2828D corresponds to the lower power node GND) in FIG. 27. The output pin O28 is electrically coupled to the first higher power line 2828A through the at least one first up transistor 2816 and to the first lower power line 2828D through the at least one first down transistor 2818.

The layout portion 2806 has shapes in the OD layer, the PO layer, the effective MD layer, the VIA0 layer, the effective M0 layer, the VIA1 layer and the M1 layer. Shapes in the PO layer include a plurality of gate lines $28TG_{27A2}$ and $28TG_{27}A1$. Shapes in the OD layer includes a plurality of source or drain regions $28TPL_{27A2}$, $28TPR_{27A2}$, $28TPL_{27A1}$, $28TPR_{27A1}$, $28TNL_{27A2}$, $28TNR_{27A2}$, $28TNL_{27A1}$ and $28TNR_{27A1}$. Shapes in the effective MD layer include a plurality of conductive lines 2824A to 2824E. Shapes in the VIA0 layer include a plurality of conductive vias 2826A to 2826E. Shapes in the effective M0 layer include a first higher power line 2828A, a first lower power line 2828D and a plurality of conductive lines 2828B and 2828C. Shapes in the VIA1 layer include plurality of conductive vias 2830A and 2830B. Shapes in the M1 layer of include a conductive line 2832A.

The source or drain region $28TPL_{27A2}$ is non-selectively electrically coupled to the first higher power line 2828A through the conductive line 2824A and the conductive via 2826A. The source or drain region $28TPL_{27A2}$ corresponds to the source of the PFET $TP_{27A2}$ which is non-selectively electrically coupled to the higher power node VDD.

The source or drain region $28TPR_{27A2}$ and the source or drain region $28TPL_{27A1}$ are shared and correspond to the corresponding drain of the PFET $TP_{27A2}$ and the source of the PFET $TP_{27A}$ which are non-selectively electrically coupled together. In this way, the PFETs $TP_{27A2}$ and $TP_{27A1}$ are coupled in series.

The source or drain region $28TNL_{27A2}$ and the source or drain region $28TNR_{27A1}$ are non-selectively electrically coupled to the first lower power line 2828D through the corresponding conductive lines 2824C and 2824E, and the corresponding conductive vias 2826C and 2826E. The source or drain region $28TNL_{27A2}$ and the source or drain region $28TNR_{27A1}$ correspond to the corresponding sources of the NFETs $TP_{27A2}$ and $TP_{27A1}$ which are non-selectively electrically coupled to the lower power node GND.

The source or drain region $28TNR_{27A2}$ and $28TNL_{27A1}$ are shared and correspond to the corresponding drains of the NFETs $TN_{27A2}$ and $TN_{27A1}$ which are non-selectively electrically coupled together. In this way, the NFETs $TN_{27A2}$ and $TN_{274A1}$ are coupled in parallel.

The source or drain region $28TPR_{27A1}$ and the shared source or drain regions $28TNR_{27A2}$ and $28TNL_{27A1}$ are non-selectively electrically coupled to an output pin O28. The output pin O28 corresponds to the output pin O27 in FIG. 27. The output pin O28 includes the conductive line 2824B, the conductive via 2826B, the conductive line 2828B, the conductive via 2830A, the conductive line 2832A, the conductive via 2830B, the conductive line 2828C, the conductive via 2826D and the conductive line 2824D. In this way, the drain of the PFET $TP_{27A1}$ and the drains of the NFETs $TN_{27A2}$ and $TN_{27A1}$ are non-selectively electrically coupled to the output pin O27.

Figure 29:
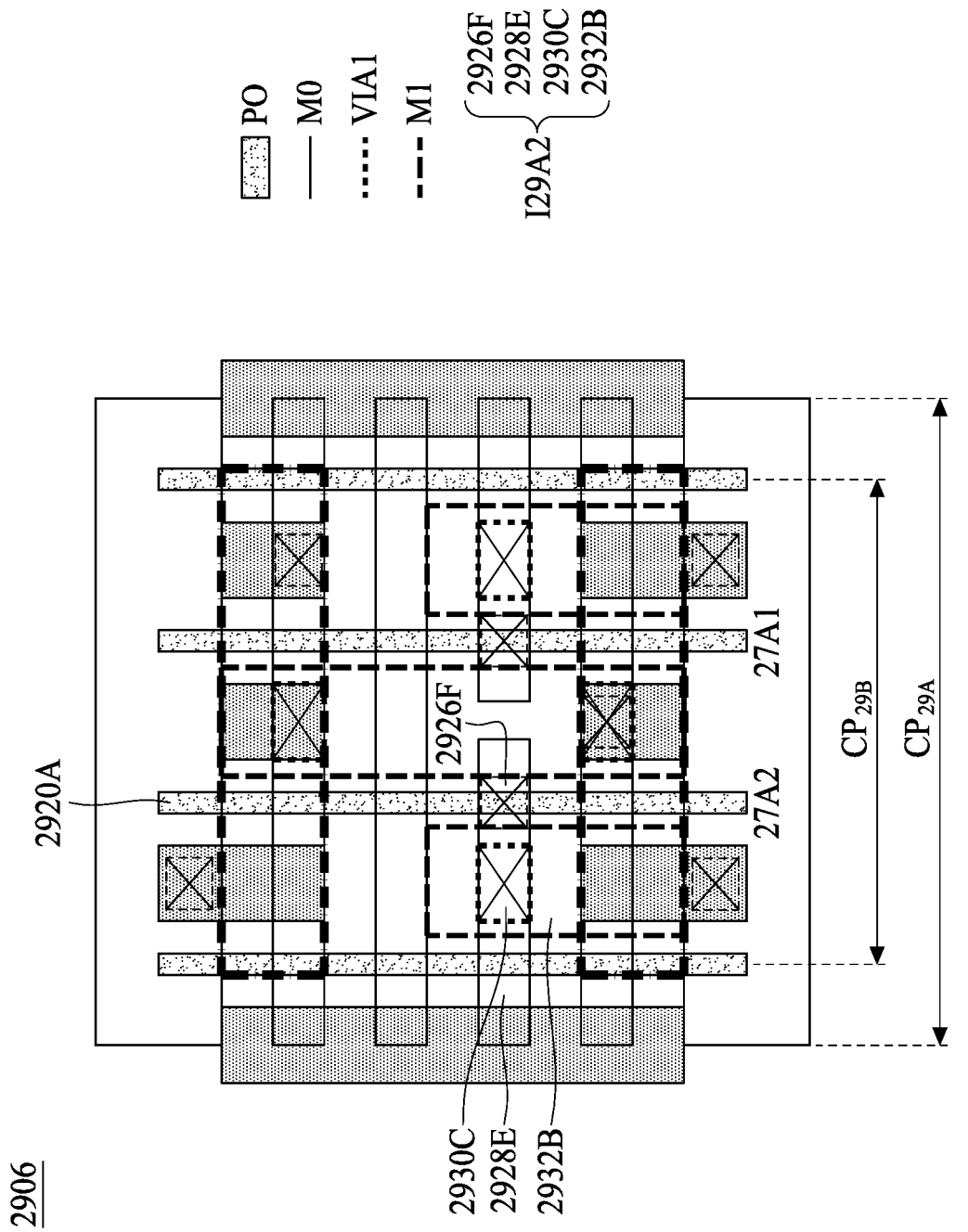
FIG. 29 is a diagram of a layout of the NR2D1 gate in FIG. 27, in accordance with some embodiments.

FIG. 29 is a diagram of a layout 2906 of the NR2D1 gate 2706 in FIG. 27, in accordance with some embodiments. The first cell layout in operation 206 further includes shapes in the layout 2906 for input pins (e.g. I29A2). The input pins (e.g. I29A2) correspond to the corresponding input pins (e.g. I27A2) in FIG. 27. Furthermore, a cell pitch $CP_{29A}$ of the layout 2906 of the NR2D1 gate 2706 is 4 MDPs.

For the input pins I27A1 and I27A2, the VIA0 layer, the effective M0 layer, the VIA1 layer and the M1 layer in the layout portion 2906 further includes shapes in addition to those in the layout portion 2806. For example, for the input pin I27A2, the VIA0 layer further includes a conductive via 2926F, the effective M0 layer further includes a conductive line 2928E, the VIA1 layer further includes a conductive via 2930C, and the M1 layer further includes a conductive line 2932B. The conductive via 2926F, the conductive line 2928E, the conductive via 2930C and the conductive line 2932B form the input pin I29A2 in FIG. 29 corresponding to the input pin I27A2 in FIG. 27. In this way, the input pins I27A1 and I27A2 can be non-selectively electrically coupled to other nodes in the design layout during, for example, the physical implementation stage 178 described with reference to FIG. 1.

In some embodiments, the layout 2906 has a dummy conductive line-bordered cell pitch $CP_{29A}$ of 4 MDPs. In other embodiments, the layout (not shown) does not include the dummy conductive lines of the layout 2906 which form borders of the cell pitch $CP_{29A}$ and has a dummy gate line-bordered cell pitch $CP_{29B}$ of 3 MDPs.

Figure 30:
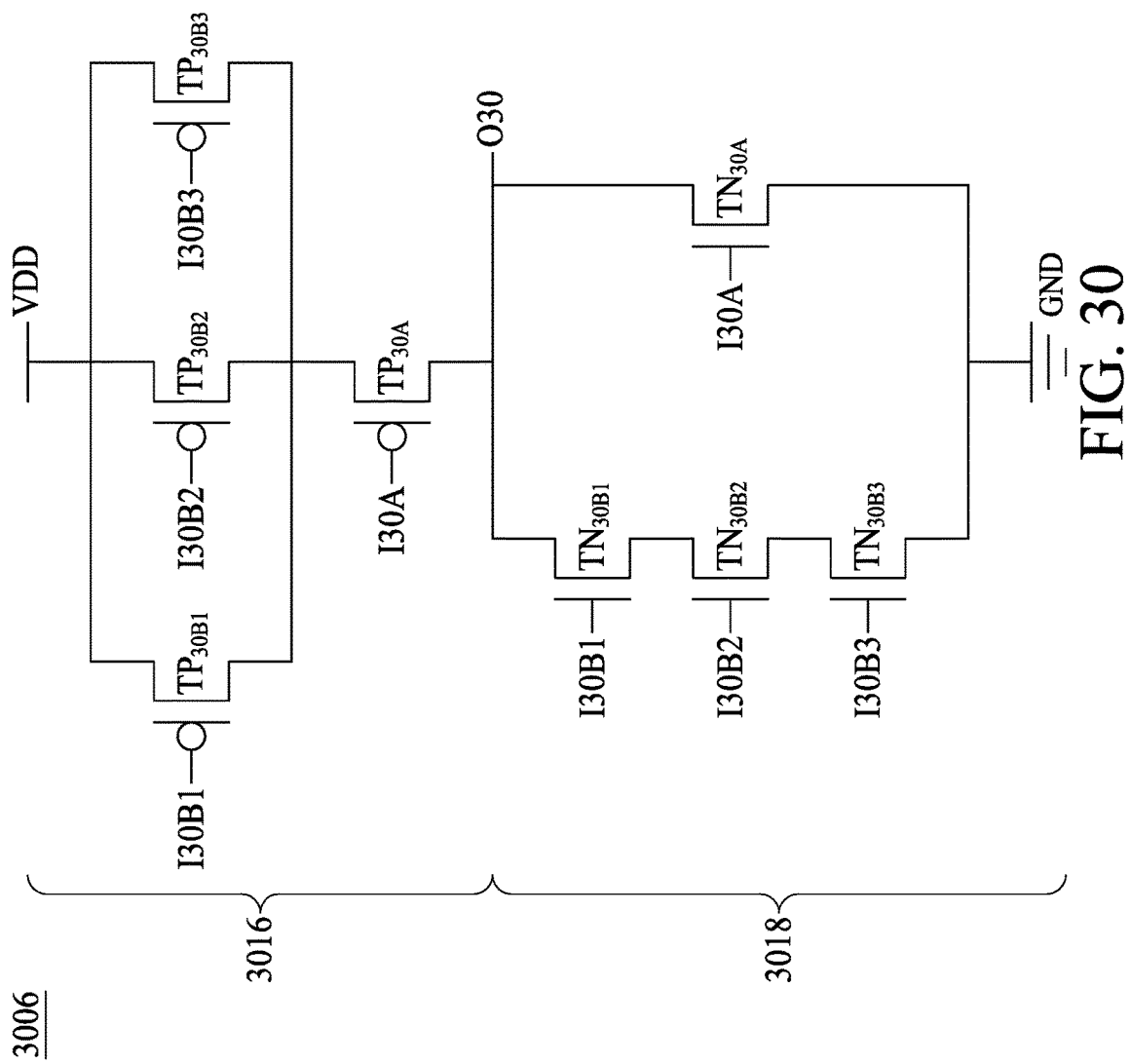
FIG. 30 is a schematic circuit diagram of an AOI31D1 gate, in accordance with some embodiments.

FIG. 30 is a schematic circuit diagram of an AOI31D1 gate 3006, in accordance with some embodiments. The AOI31D1 gate 3006 corresponds to the second cell layout in operation 206. In the AOI31D1 gate 3006, an output pin O30 is electrically coupled to the high power node VDD through at least one second up transistor 3016 and to the lower power node GND through the at least one second down transistor 3018.

The AOI31D1 gate 3006 includes at least one second up transistor 3016 and at least one second down transistor 3018. The at least one second up transistor 3016 includes PFETs $TP_{30B1}$, $TP_{30B2}$, $TP_{30B3}$ and $TP_{30A}$. The at least one second down transistor 3018 includes NFETs $TN_{30B1}$, $TN_{30B2}$, $TN_{30B3}$ and $TN_{30A}$.

Sources of the PFETs $TP_{30B1}$, $TP_{30B2}$ and $TP_{30B3}$ are non-selectively electrically coupled to the higher power node VDD. The PFETs $TP_{30B1}$, $TP_{30B2}$ and $TP_{30B3}$ are coupled in parallel. The parallel coupled PFETs $TP_{30B1}$, $TP_{30B2}$ and $TP_{30B3}$ and the PFET $TP_{30A}$ are coupled in series such that drains of the PFETs $TP_{30B1}$, $TP_{30B2}$ and $TP_{30B3}$ are non-selectively electrically coupled to a source of the PFET $TP_{30A}$.

Sources of the NFETs $TN_{30A3}$ and $TN_{30A}$ are non-selectively electrically coupled to the lower power node GND. The NFETs $TN_{30B3}$, $TN_{30B2}$ and $TN_{30B1}$ are coupled in series such that a drain of the NFET $TN_{30B3}$ is non-selectively electrically coupled to a source of the NFET $TN_{30B2}$ and the source of the NFET $TN_{30B2}$ is non-selectively electrically coupled to a source of the NFET $TN_{30B1}$. The serially coupled NFETs $TN_{30B3}$, $TN_{30B2}$ and $TN_{30B1}$ and the NFET $TN_{30A}$ are coupled in parallel.

Drains of the PFET $TP_{30A}$ and the drains of the NFETs $TN_{30B1}$ and $TN_{30A}$ are non-selectively electrically coupled to the output pin O30. In this way, the output pin O30 is electrically coupled to the higher power node VDD through the at least one second up transistor 3016 and electrically coupled to the lower power node GND through the at least one second down transistor 3018. Gates of the PFETs $TP_{30B1}$, $TP_{30B2}$, $TP_{30B3}$ and $TP_{30A}$, and NFETs $TN_{30B1}$, $TN_{30B2}$, $TN_{30B3}$ and $TN_{30A}$ are non-selectively electrically coupled to corresponding input pins I30B1, I20B2, I30B3 and I30A.

Figure 31:
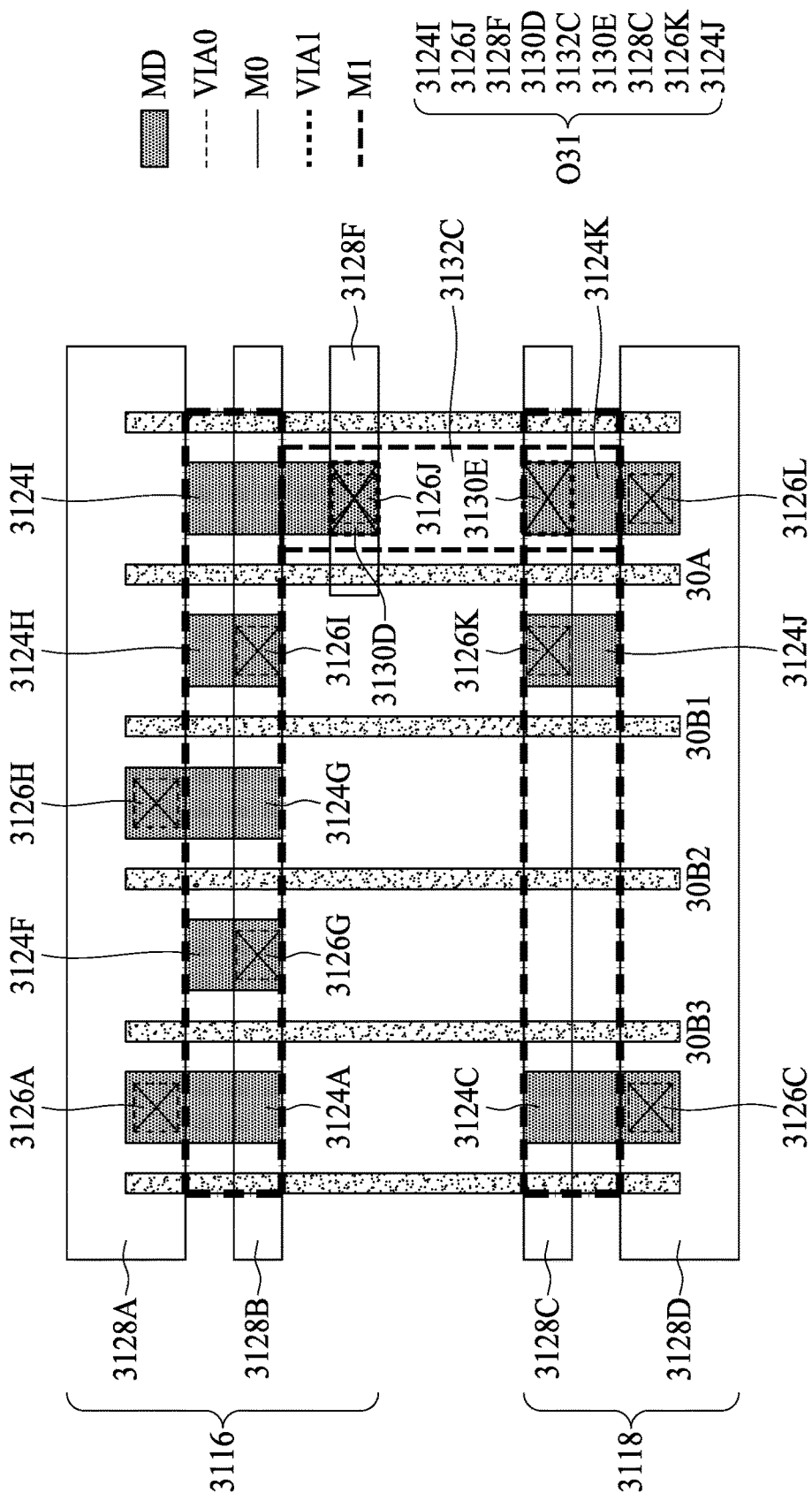
FIG. 31 is a diagram of a layout portion of the AOI31D1 gate in FIG. 30, in accordance with some embodiments.

FIG. 31 is a diagram of a layout portion 3106 of the AOI31D1 gate 3006 in FIG. 30, in accordance with some embodiments. The second cell layout in operation 206 includes the layout portion 3106. In the layout portion 3106, at least one second up transistor 3116 corresponds to the at least one second up transistor 3016 in FIG. 30. At least one second down transistor 3118 corresponds to the at least one second down transistor 3018 in FIG. 30. An output pin O31 corresponds to the output pin O30 in FIG. 30. A second higher power line 3128A corresponds to the higher power node VDD in FIG. 30. A second lower power line 3128D corresponds to the lower power node GND in FIG. 30. The output pin O31 is electrically coupled to the second higher power line 3128A through the at least one second up transistor 3116 and to the second lower power line 3128D through the at least one second down transistor 3118.

The layout portion 3106 has shapes in the OD layer, the PO layer, the effective MD layer, the VIA0 layer, the effective M0 layer, the VIA1 layer and the M1 layer. Shapes in the PO layer include a plurality of gate lines $31TG_{30B3}$, $31TG_{30B2}$, $31TG_{30B1}$ and $31TG_{30A}$. Shapes in the OD layer includes a plurality of source or drain regions $31TPL_{30B3}$, $31TPR_{30B3}$, $31TPL_{30B2}$, $31TPR_{30B2}$, $31TPL_{30B1}$, $31TPR_{30B1}$, $31TPL_{30A}$, $31TPR_{30A}$, $31TNL_{30B3}$, $31TNR_{30B3}$, $31TNL_{30B2}$, $31TNR_{30B2}$, $31TNL_{30B1}$, $31TNR_{30B1}$, $31TNL_{30A}$ and $31TNR_{30A}$. Shapes in the effective MD layer include a plurality of conductive lines 3124A, 3124C and 3124F to 3124K. Shapes in the VIA0 layer include a plurality of conductive vias 3126A, 3126C and 3126O to 3126L. Shapes in the effective M0 layer include a second higher power line 3128A, a second lower power line 3128D and a plurality of conductive lines 3128B to 3128C and 3128F. Shapes in the VIA1 layer include plurality of conductive vias 3130D to 3130E. Shapes in the M1 layer of include a conductive line 3132C.

The source or drain region $31TPL_{30B3}$ and the shared source or drain regions $31TPR_{30B2}$ and $31TPL_{30B1}$ are non-selectively electrically coupled to the second higher power line 3128A through the corresponding conductive line 3124A and conductive via 3126A. The source or drain regions $31TPL_{30B3}$, $31TPR_{30B2}$ and $31TPL_{30B1}$ correspond to the corresponding sources of the PFETs $TP_{30B3}$, $TP_{30B2}$, $TP_{30B1}$ which are non-selectively electrically coupled to the higher power node VDD).

The shared source or drain regions $31TPR_{30B3}$ and $31TPL_{30B2}$ and the shared source or drain regions $31TPR_{30B1}$ and $31TPL_{30A}$ are non-selectively electrically coupled together through the corresponding conductive lines 3124F and 3124H, the corresponding conductive vias 3126G and 3126I and the conductive line 3128B. The source or drain regions $31TPR_{30B3}$, $31TPL_{30B2}$ and $31TPR_{30B1}$ correspond to the corresponding drains of the PFETs $TP_{30B3}$, $TP_{30B2}$ and $TP_{30B1}$. The source or drain region $31TPL_{30A}$ corresponds to the source of the PFET $TP_{30A}$. In this way, the PFETs $TP_{30B1}$, $TP_{30B2}$ and $TP_{30B3}$ are coupled in parallel. The parallel coupled PFETs $TP_{30B1}$, $TP_{30B2}$ and $TP_{30B3}$ and the PFET $TP_{30A}$ are coupled in series.

The source or drain regions $31TNL_{30}$, and $31TNR_{30A}$ are non-selectively electrically coupled to the second lower power line 3128D through the corresponding conductive lines 3124C and 3124K and the corresponding conductive vias 3126C and 3126L. The source or drain regions $31TNL_{30B3}$ and $31TNR_{30A}$ correspond to the corresponding sources of the NFETs $TN_{30B3}$ and $TN_{30A}$ which are non-selectively electrically coupled to the lower power node GND.

The source or drain region $31TNR_{30B3}$ and the source or drain region $31TNL_{30B2}$ are shared. The source or drain region $31TNR_{30B2}$ and the source or drain region $31TNL_{30B1}$ are shared. The source or drain regions $31TNR_{30B3}$, $31TNL_{30B2}$, $31TNR_{30B2}$ and $31TNL_{30B1}$ correspond to the corresponding drain of the NFET $TN_{30B3}$, source of the NFET $TN_{30B2}$, drain of the NFET $TN_{30B2}$ and source of the NFET $TN_{30B1}$. In this way, the NFETs $TN_{30B3}$, $TN_{30B2}$ and $TN_{30B1}$ are coupled in series.

The source or drain regions $31TNR_{30B1}$ and $31TNL_{30A}$ are shared and. The source or drain regions $31TNR_{30B1}$ and $31TNL_{30A}$ correspond to the corresponding drain of the NFET $TN_{30B1}$ and drain of the NFET $TN_{30A}$. In this way, the serially coupled NFETs $TN_{30B3}$, $TN_{30B2}$, $TN_{30B1}$ and the NFET $TN_{30A}$ are coupled in parallel.

The shared source or drain regions $31TNR_{30B1}$ and $31TNL_{30A}$ are non-selectively electrically coupled to an output pin O31. The output pin O31 corresponds to the output pin O30 in FIG. 30. The output pin O31 includes the conductive line 3124I, the conductive via 3126J, the conductive line 3128F, the conductive via 3130D, the conductive line 3132C, the conductive via 3130E, the conductive line 3128C, the conductive via 3126K and the conductive line 3124J. In this way, the drain of the PFET $TP_{30A}$ and the drains of the NFETs $TN_{30B1}$ and $TN_{30A}$ are non-selectively electrically coupled to the output pin O30.

Figure 32:
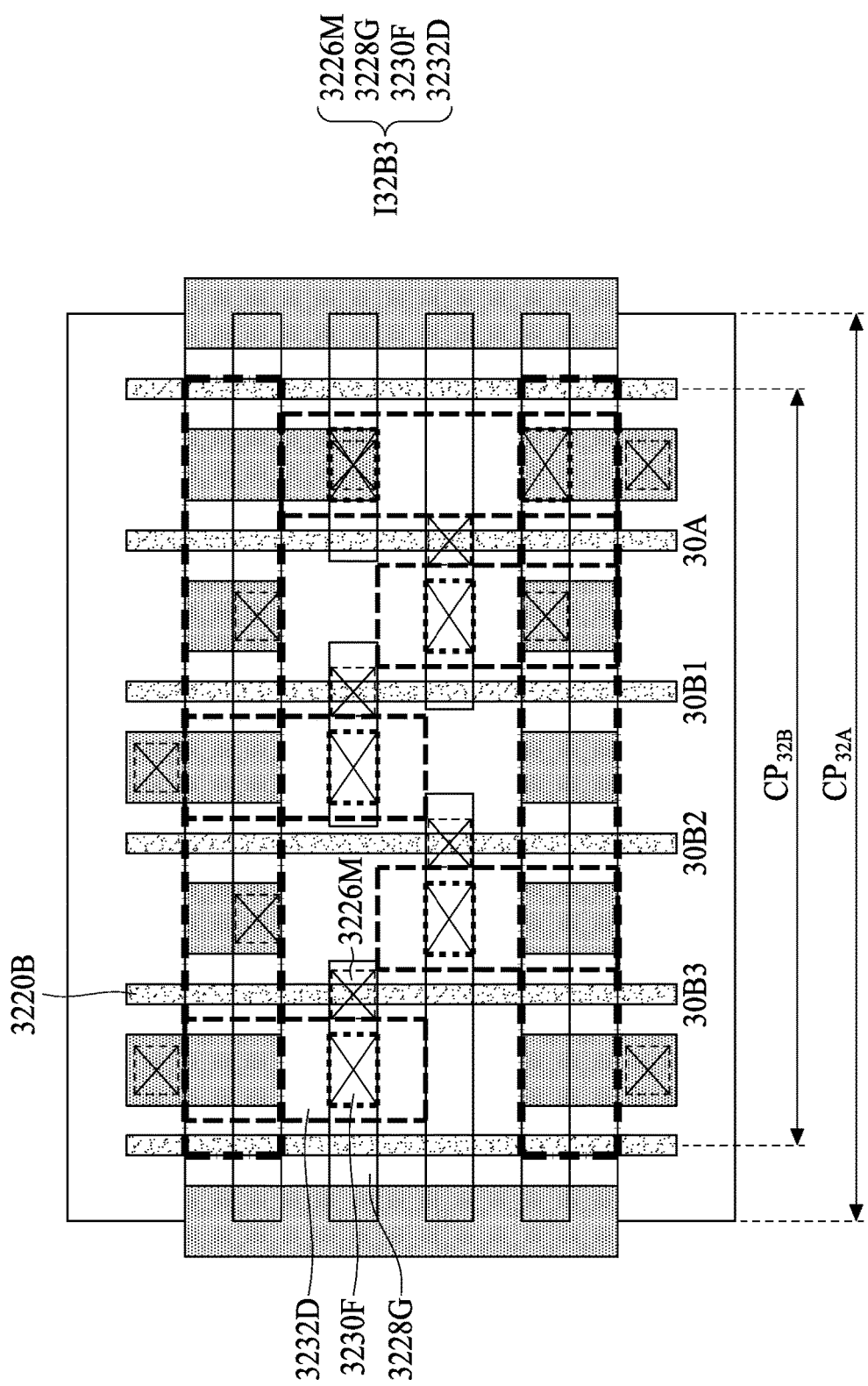
FIG. 32 is a diagram of a layout of the AOI31D1 gate in FIG. 30, in accordance with some embodiments.

FIG. 32 is a diagram of a layout 3206 of the AOI31D1 gate 3006 in FIG. 30, in accordance with some embodiments. The second cell layout in operation 206 further includes shapes in the layout 3206 for input pins (e.g. I32B3). The input pins (e.g. I32B3) correspond to the corresponding input pins (e.g. I30B3) in FIG. 30. Furthermore, a cell pitch $CP_{32A}$ of the layout 3206 of the AOI31D1 gate 3006 is 6 MDPs.

For the input pins I30B3, I30B2, I30B1 and I30A, the VIA0 layer, the effective M0 layer, the VIA1 layer and the M1 layer in the layout portion 3206 further includes shapes in addition to those in the layout portion 3106. For example, for the input pin I30B3, the VIA0 layer further includes a conductive via 3226M, the effective M0 layer further includes a conductive line 3228G, the VIA1 layer further includes a conductive via 3230F, and the M1 layer further includes a conductive line 3232D. The conductive via 3226M, the conductive line 3228G, the conductive via 3230F and the conductive line 3232D form the input pin I32B3 in FIG. 32. In this way, the input pins I30B3, I30B2, I30B1 and I30A can be non-selectively electrically coupled to other nodes in the design layout during, for example, the physical implementation stage 178 described with reference to FIG. 1.

In some embodiments, the layout 3206 has a dummy conductive line-bordered cell pitch $CP_{32A}$ of 6 MDPs. In other embodiments, the layout (not shown) does not include the dummy conductive lines of the layout 3206 which form borders of the cell pitch $CP_{32A}$ and has a dummy gate line-bordered cell pitch $CP_{32B}$ of 5 MDPs.

Figure 33:
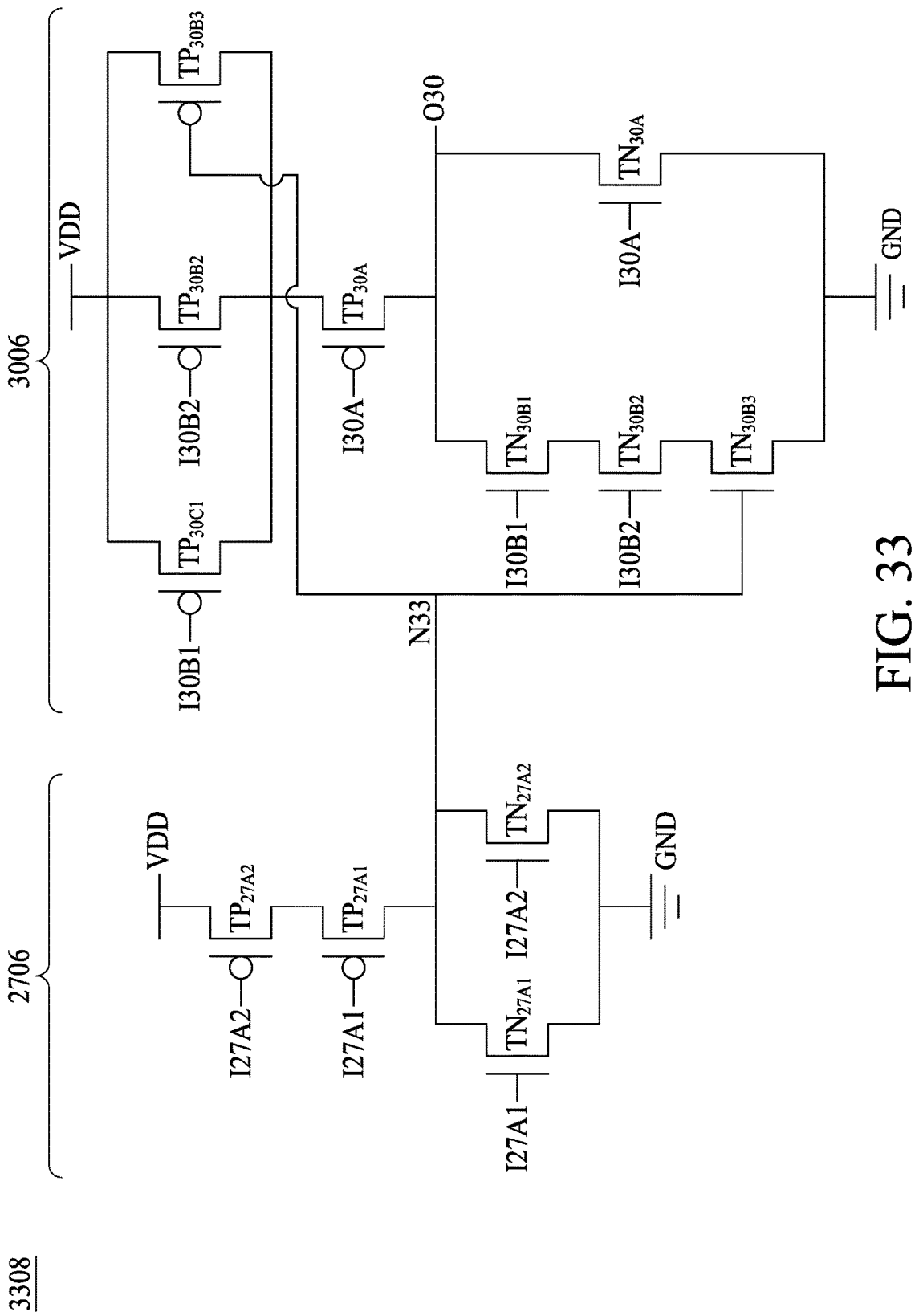
FIG. 33 is a schematic circuit diagram of combined NR2D1 gate and AOI31D1 gate, in accordance with some embodiments.

FIG. 33 is a schematic circuit diagram of combined NR2D1 gate and AOI31D1 gate 3308, in accordance with some embodiments. The combined NR2D1 gate and AOI31D1 gate 3308 corresponds to the third cell layout in operation 208. The combined NR2D1 gate and AOI31D1 gate 3308 includes the NR2D1 gate 2706 in FIG. 27 and the AOI31D1 gate 3006 in FIG. 30. In the combined NR2D1 gate and AOI31D1 gate 3308, the output pin O27 in FIG. 27 is non-selectively electrically coupled to the gates of the PFET $TP_{30B3}$ and the NFET $TN_{30B3}$ to form a node N33.

In operation 208, the first cell layout including the layout portion 2806 in FIG. 28 and the second cell layout including the layout portion 3106 in FIG. 31 are combined into a third cell layout including a layout portion 3608 to be described with reference to FIG. 36.

In operation 310 in FIG. 3, a first source or drain region $28TPL_{27A2}$ of at least one first up transistor 2816 in the first cell layout and a second source or drain region $31TPL_{30B3}$ of at least one second up transistor 3116 in the second cell layout are combined through re-arranging and sharing. In addition, in operation 310 in FIG. 3, a third source or drain region $28TNL_{27A2}$ of the at least one first down transistor 2818 in the first cell layout and a fourth source or drain region $31TNL_{30B3}$ of the at least one second down transistor 3118 in the second cell layout are combined through re-arranging and sharing to form the third cell layout. Re-arranging is to be described with reference to FIG. 34. Sharing is to be described with reference to FIG. 35.

Figure 34:
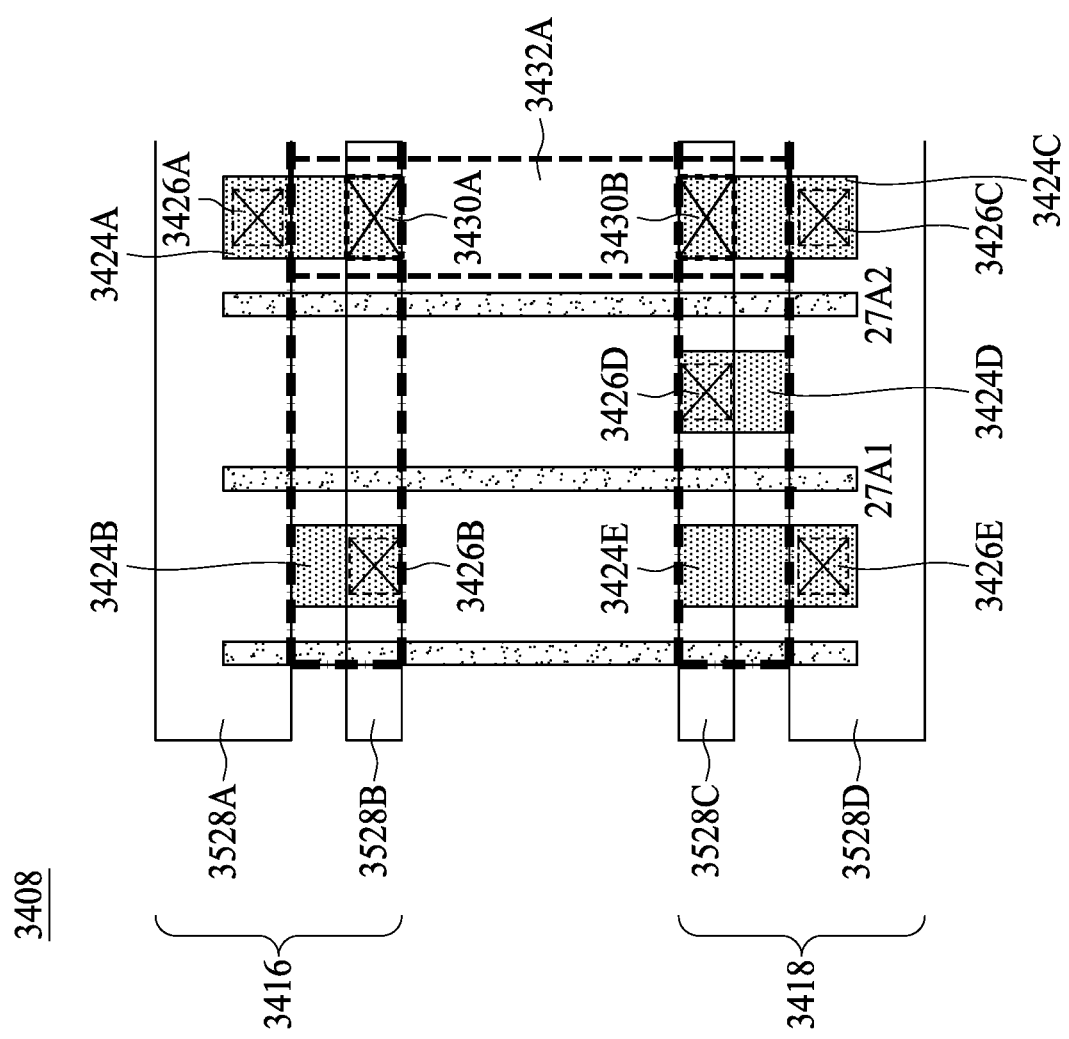
FIG. 34 is a diagram of a layout portion corresponding to the NR2D1 gate in the combined NR2D1 gate and AOI31D1 gate in FIG. 33, in accordance with some embodiments.

FIG. 34 is a diagram of a layout portion 3408 corresponding to the NR2D1 gate 2706 in the combined NR2D1 gate and AOI31D1 gate 3006 in FIG. 33, in accordance with some embodiments. The layout portion 3408 is substantially a flipped layout of the layout portion 2806 in FIG. 28.

Corresponding elements in the layout portions 2806 and 3408 are labeled by like reference numerals. In the layout portion 3408, the conductive lines 3424A and the 3424C non-selectively electrically coupling the corresponding source or drain regions 34TPR$_{27A2}$ and 34TNR$_{27A2}$ associated with the right most gate line 34TG$_{27A}$ to the corresponding first higher power line 2828A and first lower power line 2828D. The conductive line 2832A and conductive vias 2830A and 2830B of the output pin O28 in FIG. 28 are re-arranged into corresponding conductive line 3432A and conductive vias 3430A and 3230B to facilitate connection with the gate line 31TG$_{30B3}$ in FIG. 31.

Figure 35:
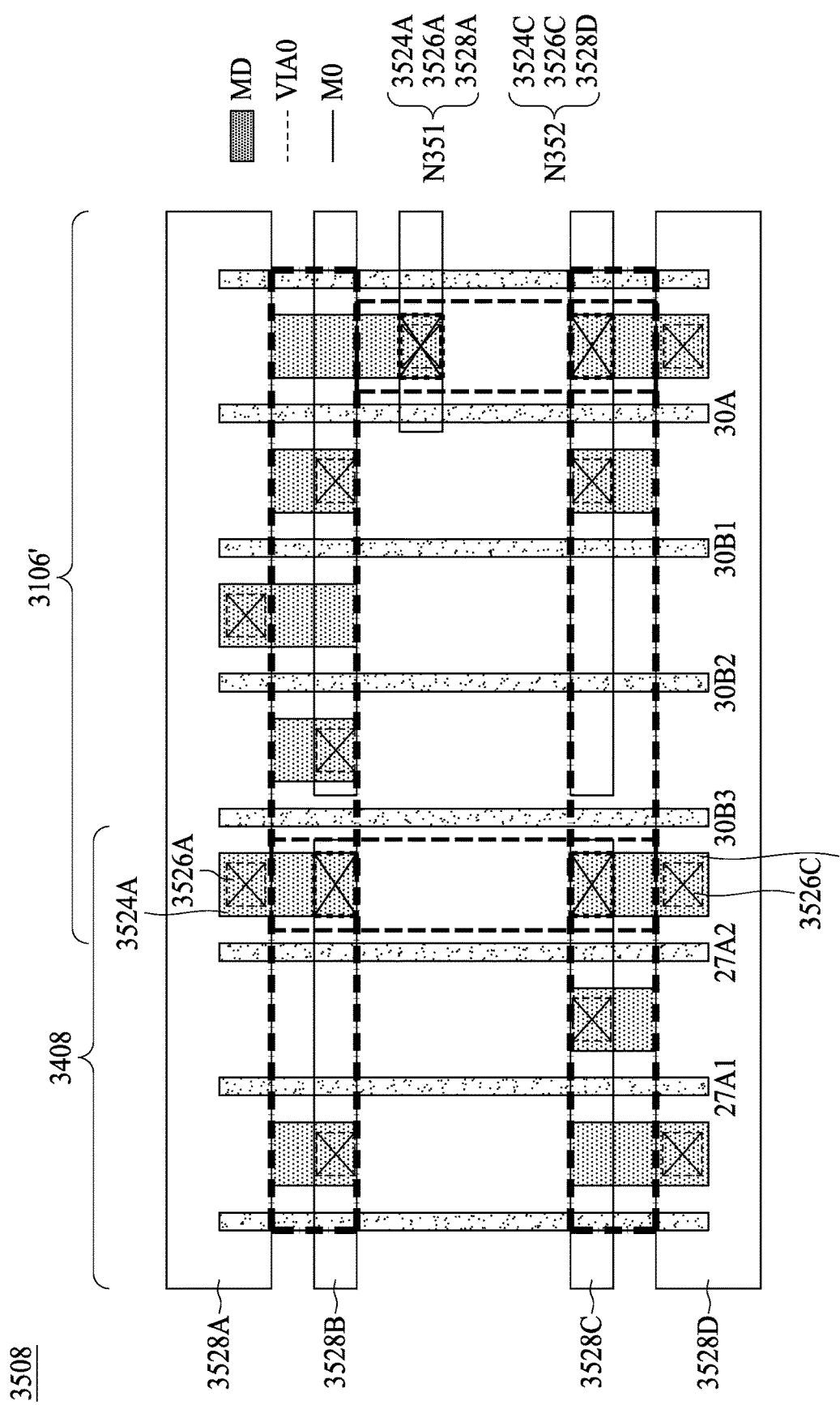
FIG. 35 is a diagram of a layout portion with shared source or drain regions of the corresponding NR2D1 gate and AOI31D1 gate in FIG. 33 and shared source or drain regions of the corresponding NR2D1 gate and AOI31D1 gate in FIG. 33, in accordance with some embodiments.

FIG. 35 is a diagram of a layout portion 3508 with shared source or drain regions 34TPR$_{27A2}$ and 31TPL$_{30B3}$ of the corresponding NR2D1 gate 2706 and AOI31D1 gate 3006 in FIG. 33 and shared source or drain regions 34TNR$_{27A2}$ and 31TNL$_{30B3}$ of the corresponding NR2D1 gate 2706 and AOI31D1 gate 3006 in FIG. 33, in accordance with some embodiments. The third cell layout in operation 208 includes the layout portion 3508 which includes overlapped layout portion 3408 in FIG. 34 and layout portion 3106' which is substantially the same layout as the layout portion 3106 in FIG. 31. In the layout portion 3508, a node N351 renders the shared source or drain regions 34TPR$_{27}$?A and 31TPL$_{30B3}$ non-selectively electrically coupled to a higher power line 3528A. A node N352 renders the shared source or drain regions 34TNR$_{27A2}$ and 31TNL$_{30B3}$ non-selectively electrically coupled to a lower power line 3528D.

The re-arranged first source or drain region 34TPR$_{27A2}$ in the layout portion 3408 and the second source or drain region 31TPL$_{30B3}$ in the layout portion 3106' are shared. The re-arranged third source or drain region 34TNR$_{27A2}$ in the layout portion 3408 and the fourth source or drain region 31TNL$_{30B3}$ in the layout portion 3106' are shared.

The first higher power line 2828A in FIG. 28 and the second higher power line 3128A in FIG. 31 are combined form a higher power line 3528A. The first lower power line 2828D in FIG. 28 and the second lower power line 3128D in FIG. 31 are combined form a lower power line 3528D.

The layout portion 3508 includes a node N351 and a node N352. The node N351 includes a conductive line 3524A in the effective MD layer, a conductive via 3526A in the VIA0 layer, and the higher power line 3528A in the M0 layer. The node N351 renders the shared source or drain regions 34TPR$_{27A2}$ and 31TPL$_{30B3}$ non-selectively electrically coupled to the higher power line 3528A. The node N352 includes a conductive line 3524C in the effective MD layer, a conductive via 3526C in the VIA0 layer, and the lower power line 3528D in the M0 layer. The node N352 renders the shared source or drain regions 34TNR$_{21A2}$ and 31TNL$_{30R3}$ non-selectively electrically coupled to the lower power line 3528D.

Figure 36:
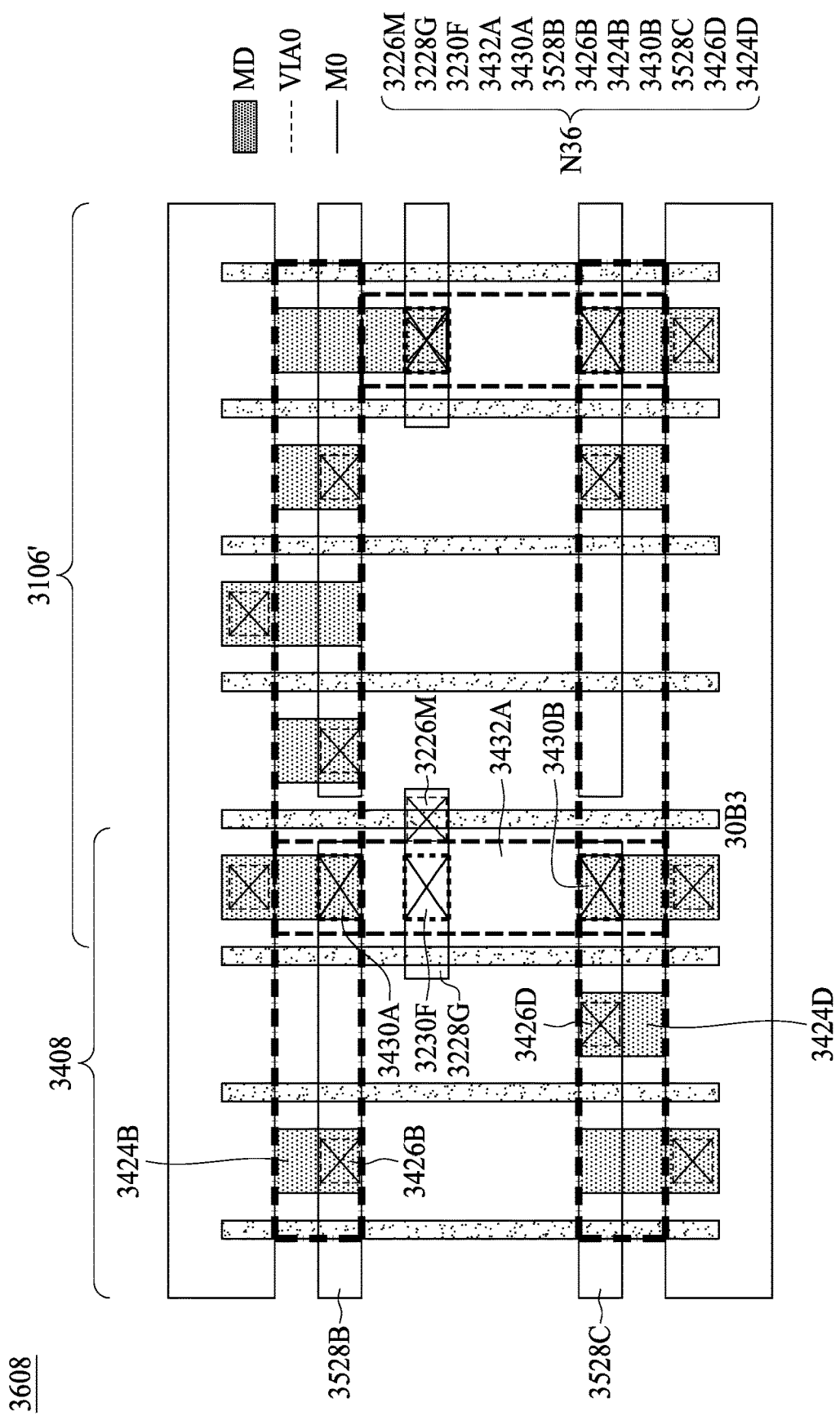
FIG. 36 is a diagram of a layout portion with a node corresponding to the combined NR2D1 gate and AOI31D1 gate with a node in FIG. 33, in accordance with some embodiments.

FIG. 36 is a diagram of a layout portion 3608 with a node N36 corresponding to the combined NR2D1 gate and AOI31D1 gate 2106 with the node N33 in FIG. 33, in accordance with some embodiments. The third cell layout in operation 208 includes the layout portion 3608. In the layout portion 3608, the node N36 is formed by non-selectively electrically coupling an output pin in the layout portion 3608 corresponding to the output pin O27 in FIG. 27 directly to the gate line 35TG$_{30B3}$ and not to an input pin corresponding to the input pin I30B3 in FIG. 30 through a conductive line 32280 in the M0 layer.

In the layout portion 3608, the node N36 includes a conductive via 3226M in the VIA0 layer, a conductive line 3228G in the M0 layer, a conductive via 3230F in the VIA1 layer, a conductive line 3432A in the M1 layer, a conductive via 3430A in the VIA1 layer, a conductive line 3528B in the M0 layer, a conductive via 3426B in the VIA0 layer, a conductive line 3424B in the MD layer, a conductive via 3430B in the VIA1 layer, a conductive line 3528C in the M0 layer, a conductive via 3426D in the VIA0 layer and a conductive line 3424D in the MD layer. The conductive lie 3228G extended from the layout portion 3408 into the layout portion 3106' overlaps with the gate line 31TG$_{30B3}$. The conductive via 3226M is located at where the conductive line 3228G overlaps with the gate line 31TG$_{30B3}$. In this way, the node N39 corresponds to the node N33 in FIG. 33.

Figure 37:
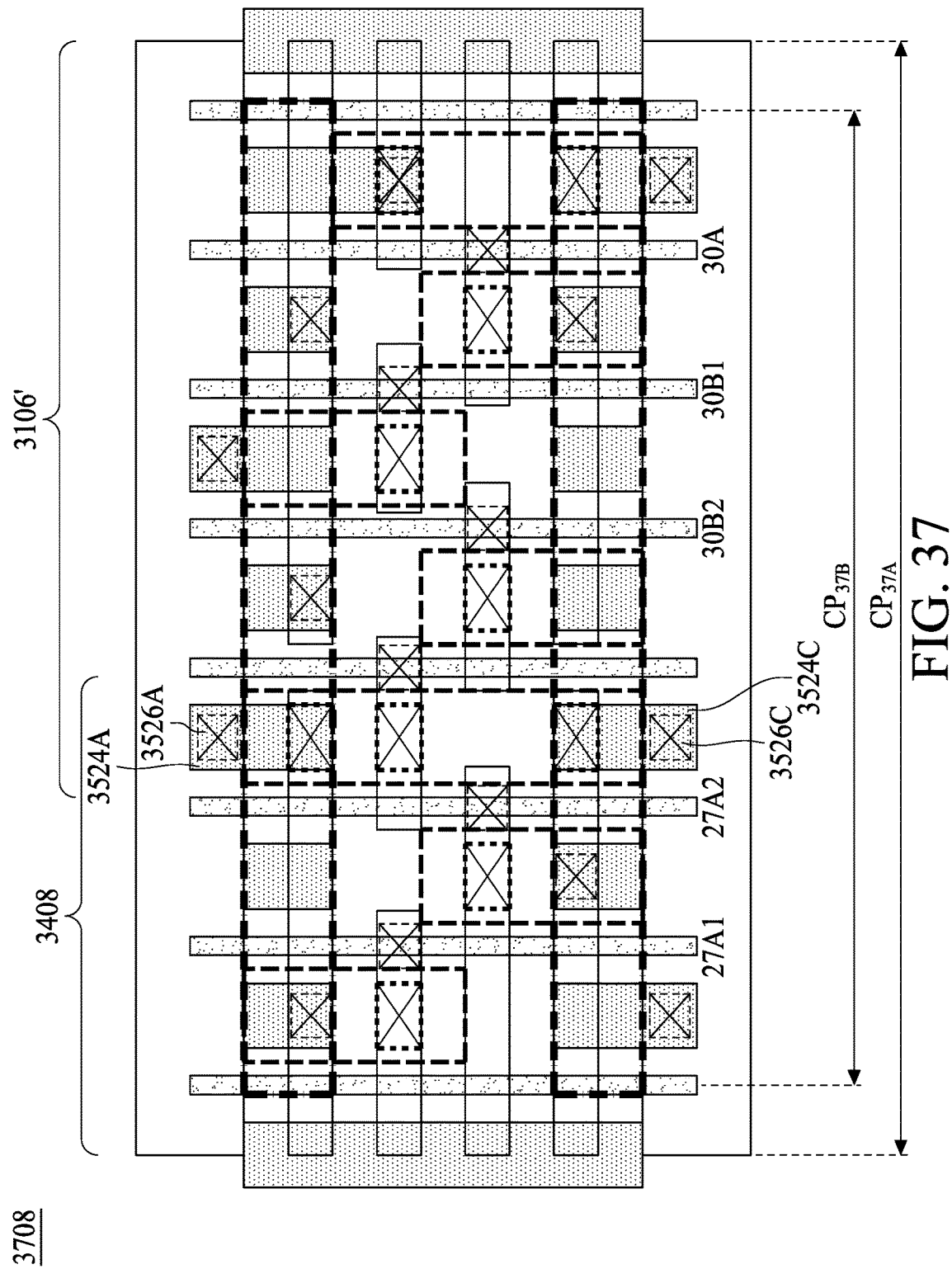
FIG. 37 is a diagram of a layout of the combined NR2D1 gate and AOI31 D1 gate, in accordance with some embodiments.

FIG. 37 is a diagram of a layout 3708 of the combined NR2D1 gate and AOI31D1 gate 3308, in accordance with some embodiments. The third cell layout in operation 208 further includes shapes in the layout 3708 for input pins I27A1, I27A2, I30B2, I30B1 and I30A in FIG. 33 similar to the input pin I29A2 in layout 2906 in FIG. 29 for the input pin I27A2 in FIG. 27. Furthermore, a cell pitch CP$_{37A}$ of the layout 3708 of the combined NR2D gate and the AOI31D1 gate 3308 spans the overlapped layout portion 3408 and 3106'.

In the layout 3708, a dummy conductive line-bordered cell pitch CP$_{37A}$ spans the overlapped layout portion 3408 and 3106'. The layout portion 3408 is not appended with a conductive line between the layout portion 3408 and the layout portion 3106'. A dummy conductive line-bordered pitch of the layout portion 3408 is equal to the cell pitch C$_{29A}$ in FIG. 29 subtracted by 1 MDP, which is equal to 3 MDPs. The layout portion 3106' is not appended with a conductive line between the layout portion 3408 and the layout portion 3106'. A dummy conductive line-bordered pitch of the layout portion 3106' is equal to the cell pitch CP$_{32A}$ in FIG. 32 subtracted by 1 MDP, which is equal to 5 MDPs. The cell pitch CP$_{37A}$ is equal to a sum of the pitch of the layout portion 3408 and the pitch of the layout portion 3106' added by 1 MDP for double subtraction of the conductive line between the layout portion 3408 and the layout 3106' and subtracted by 1 MDP for the shared source or drain regions 34TPR$_{27A2}$ and 31TPL$_{30B3}$ and the shared source or drain regions 34TNR$_{27A2}$ and 31TNL$_{30B3}$, and is equal to 8 MDPs. In other embodiments, a layout (not shown) does not include the dummy conductive lines of the layout 3708 which forms borders of the cell pitch CP$_{37A}$ and has a dummy gate line-bordered cell pitch CP$_{37B}$ equal to a sum of the dummy gate line-bordered cell pitch CP$_{29B}$ in FIG. 29 which is 3 MDPs, a dummy gate line-bordered cell pitch CP$_{32B}$ in FIG. 32 which is 5 MDPs, subtracted by 1 MDP for the shared source or drain regions 34TPR$_{27A2}$ and 31TPL$_{30B3}$ and the shared source or drain regions 34TNR$_{27A2}$ and 31TNL$_{30B3}$. Therefore, the cell pitch CP$_{37B}$ is equal to 7 MDPs.

The shared source or drain regions 34TPR$_{27A2}$ and 31TPL$_{30B3}$ and the shared source or drain regions 34TNR$_{27A2}$ and 31TNL$_{30B3}$ saves 1 MDP in the cell pitch CP$_{32}$ of the combined NR2D1 gate and AOI31D1 gate 3308. Therefore, area of the combined NR2D1 gate and AOI31D1 gate 3308 is reduced.

Figure 38:
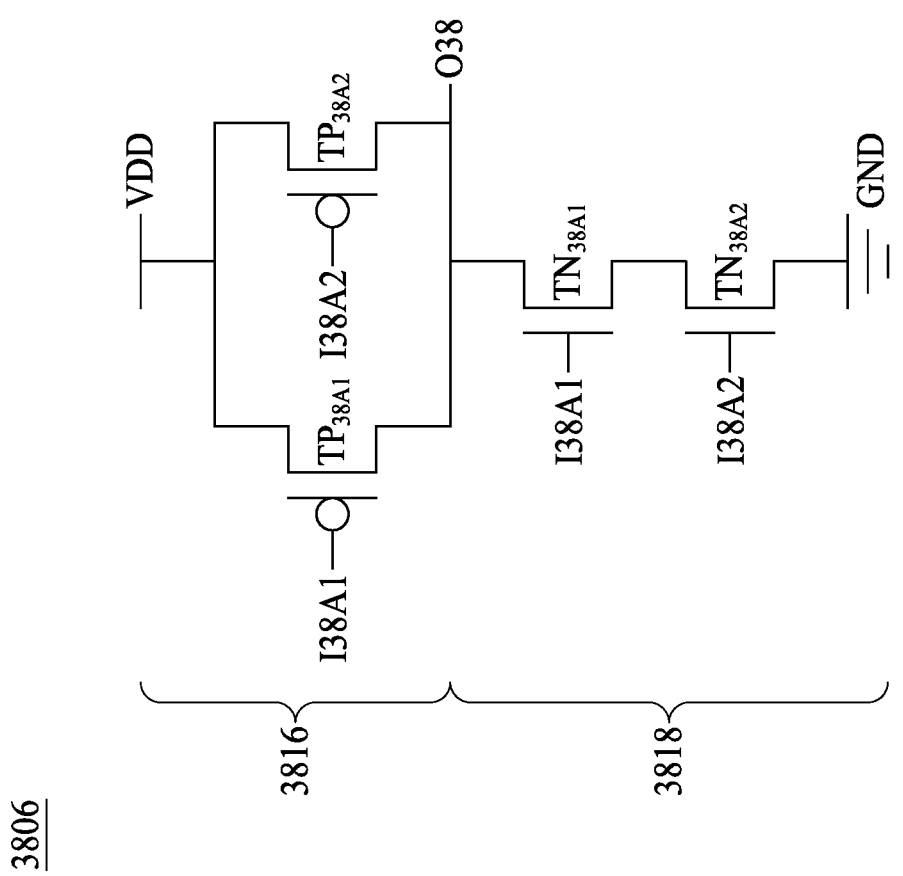
FIG. 38 is a schematic circuit diagram of an ND2D1 gate, in accordance with some embodiments.

Combined Cell Layouts Through Adding Gate Finger Line and Sharing and Circuit Manufactured Based on the Same FIG. 38 is a schematic circuit diagram of an ND2D1 gate 3806, in accordance with some embodiments. The ND2D1 gate 3806 corresponds to the second cell layout in operation 206. In the ND2D1 gate 3806, an output pin O38 is electrically coupled to a higher power node VDD through at least one second up transistor 3816 and to a lower power node GND through at least one second down transistor 3818.

The ND2D1 gate 3806 includes at least one second up transistor 3816 and at least one second down transistor 3818. The at least one second up transistor 3816 includes PFETs $TP_{38A1}$ and $TP_{38A2}$. The at least one second down transistor 3818 includes NFETs $TN_{38A1}$ and $TN_{38A2}$.

Sources of the PFETs $TP_{38A1}$ and $TP_{38A2}$ are non-selectively electrically coupled to a higher power node VDD. The PFETs $TP_{38A1}$ and $TP_{38A2}$ are coupled in parallel.

A source of the NFET $TN_{38A2}$ is non-selectively electrically coupled to a lower power node GND. The NFETs $TN_{38A2}$ and $TN_{38A1}$ are coupled in series such that a drain of the NFET $TN_{38A2}$ is non-selectively electrically coupled to a source of the NFET $TN_{38A1}$.

Drains of the parallel coupled PFETs $TP_{38A1}$ and $TP_{38A2}$ and a drain of the NFET $TN_{38A1}$, are non-selectively electrically coupled to an output pin O38. In this way, the output pin O38 is electrically coupled to the higher power node VDD through the at least one second up transistor 3816 and electrically coupled to the lower power node GND through the at least one second down transistor 3818. Gates of the PFETs $TP_{38A1}$ and $TP_{38A2}$, and NFETs $TN_{38A1}$ and $TN_{38A2}$ are non-selectively electrically coupled to corresponding input pins I38A1 and I38A2.

Figure 39:
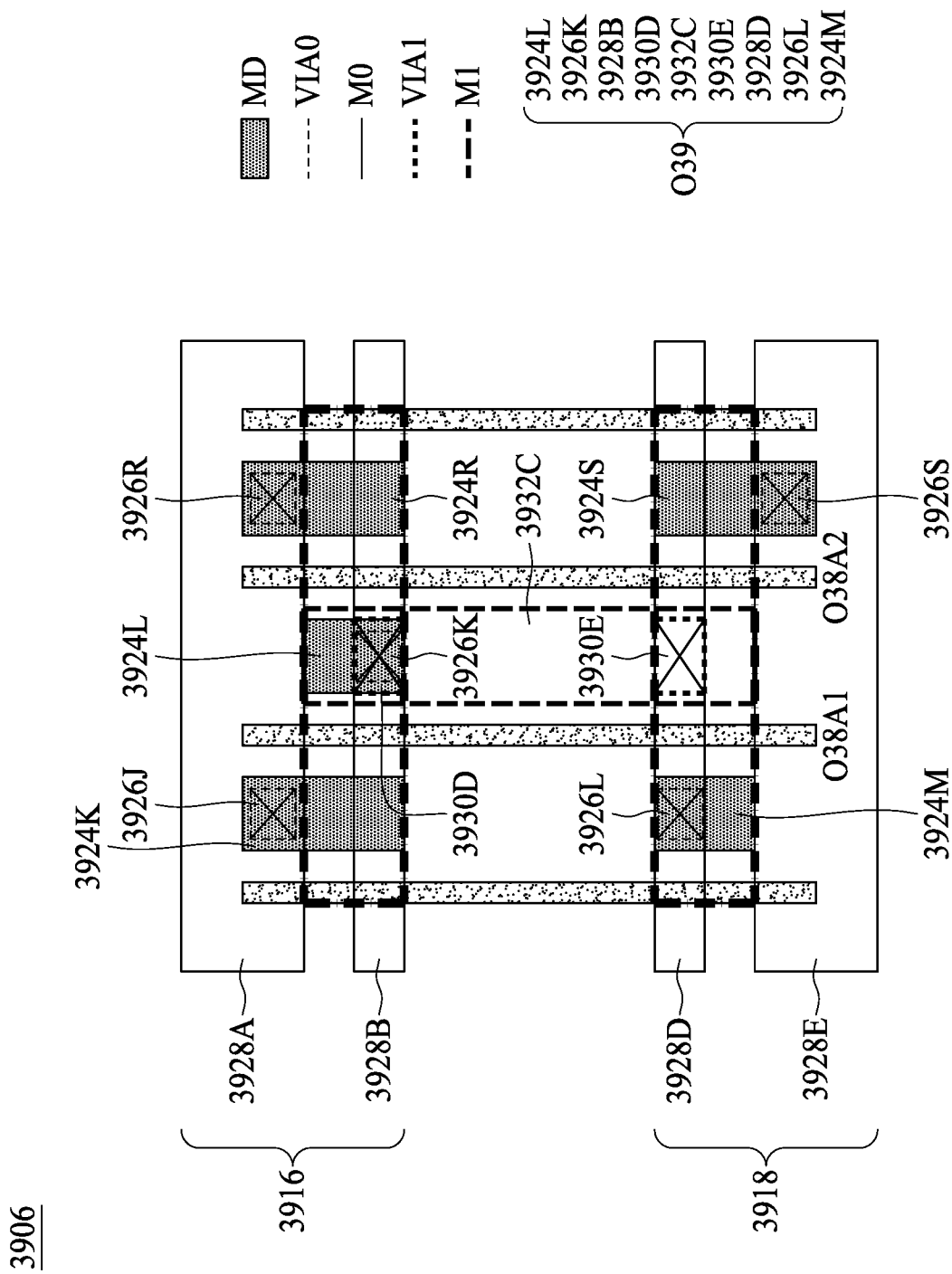
FIG. 39 is a diagram of a layout portion of the ND2D1 gate in FIG. 38, in accordance with some embodiments.

FIG. 39 is a diagram of a layout portion 3906 of the ND2D1 gate 3806 in FIG. 38, in accordance with some embodiments. The second cell layout in operation 206 includes the layout portion 3906. In the layout portion 3906, at least one second up transistor 3916 corresponds to the at least one second up transistor 3816 in FIG. 38. At least one second down transistor 3918 corresponds to the at least one second down transistor 3818 in FIG. 38. An output pin O39 corresponds to the output pin O38 in FIG. 38. A second higher power line 3928A corresponds to the higher power node VDD in FIG. 38. A second lower power line 3928E corresponds to the lower power node GND in FIG. 38. The output pin O39 is electrically coupled to the second higher power line 3928A through the at least one first up transistor 3916 and to the second lower power line 3928E through the at least one second down transistor 3918.

The layout portion 3906 has shapes in the OD layer, the PO layer, the effective MD layer, the VIA0 layer, the effective M0 layer, the VIA1 layer and the M1 layer. Shapes in the PO layer include a plurality of gate lines $39TG_{38A1}$ and $39TG_{38A2}$. Shapes in the OD layer includes a plurality of source or drain regions $39TPL_{38A1}$, $39TPR_{38A1}$, $39TPL_{38A2}$, $39TPR_{38A2}$, $39TNL_{38A1}$, $39TNR_{38A1}$, and $39TNL_{38A2}$, $39TNR_{38A2}$. Shapes in the effective MD layer include a plurality of conductive lines 3924K to 3924M, and 3924R to 3924S. Shapes in the VIA0 layer include a plurality of conductive vias 3926J to 3926L, and 3926R to 3926S. Shapes in the effective M0 layer include a second higher power line 3928A, a second lower power line 3928E and a plurality of conductive lines 3928B and 3928D. Shapes in the VIA1 layer include plurality of conductive vias 3930D to 3930E. Shapes in the M1 layer of include a conductive line 3932C.

The source or drain region $39TPL_{38A1}$ and the source or drain region $39TPR_{3A2}$ are non-selectively electrically coupled to the second higher power line 3928A through the corresponding conductive lines 3924K and 3924R and the corresponding conductive vias 3926J and 3926R. The source or drain regions $39TPL_{38A1}$ and $39TPR_{38A2}$ correspond to the corresponding sources of the PFETs $TP_{38A1}$ and $TP_{38A1}$ which are non-selectively electrically coupled to the higher power node VDD.

The source or drain regions $39TPR_{38A1}$ and $39TPL_{38A2}$ are shared. The shared source or drain regions $39TPR_{38A1}$ and $39TPL_{38A2}$ correspond to the drains of the PFETs $TP_{38A1}$ and $TP_{38A2}$ which are non-selectively electrically coupled together. In this way, the PFETs $TP_{38A1}$ and $TP_{38A2}$ are coupled in parallel.

The source or drain region $39TNR_{38A2}$ is non-selectively electrically coupled to the second lower power line 3928E through the conductive line 3924S and the conductive via 3926S. The source or drain region $39TNR_{38A2}$ corresponds the source of the NFET $TN_{38A2}$ which is non-selectively electrically coupled to the lower power node GND.

The source or drain regions $39TNL_{38A2}$, and $39TNR_{38A1}$ are shared. The shared source or drain regions $39TNL_{38A2}$ and $39TNR_{38A1}$ correspond to the corresponding drain of the NFET $TN_{38A2}$ and source of the NFET $TN_{38A1}$. In this way, the NFETs $TN_{38A2}$ and $TN_{38A1}$ are coupled in series.

The shared source or drain regions $39TPR_{38A1}$ and $39TPL_{38A2}$ and the source or drain region $39TNL_{38A1}$ are non-selectively electrically coupled to the output pin O39. The output pin O39 corresponds to the output pin O38 in FIG. 38. The output pin O39 includes the conductive line 3924L, the conductive via 3926K, the conductive line 3928B, the conductive via 3930D, the conductive line 3932C, the conductive via 3930E, the conductive line 3928D, the conductive via 3926L and the conductive line 3924M. In this way, the drains of the PFETs $TP_{38A1}$ and $TP_{38A2}$ and the drain of the NFET $TN_{38A1}$ are non-selectively electrically coupled to the output pin O38.

Figure 40:
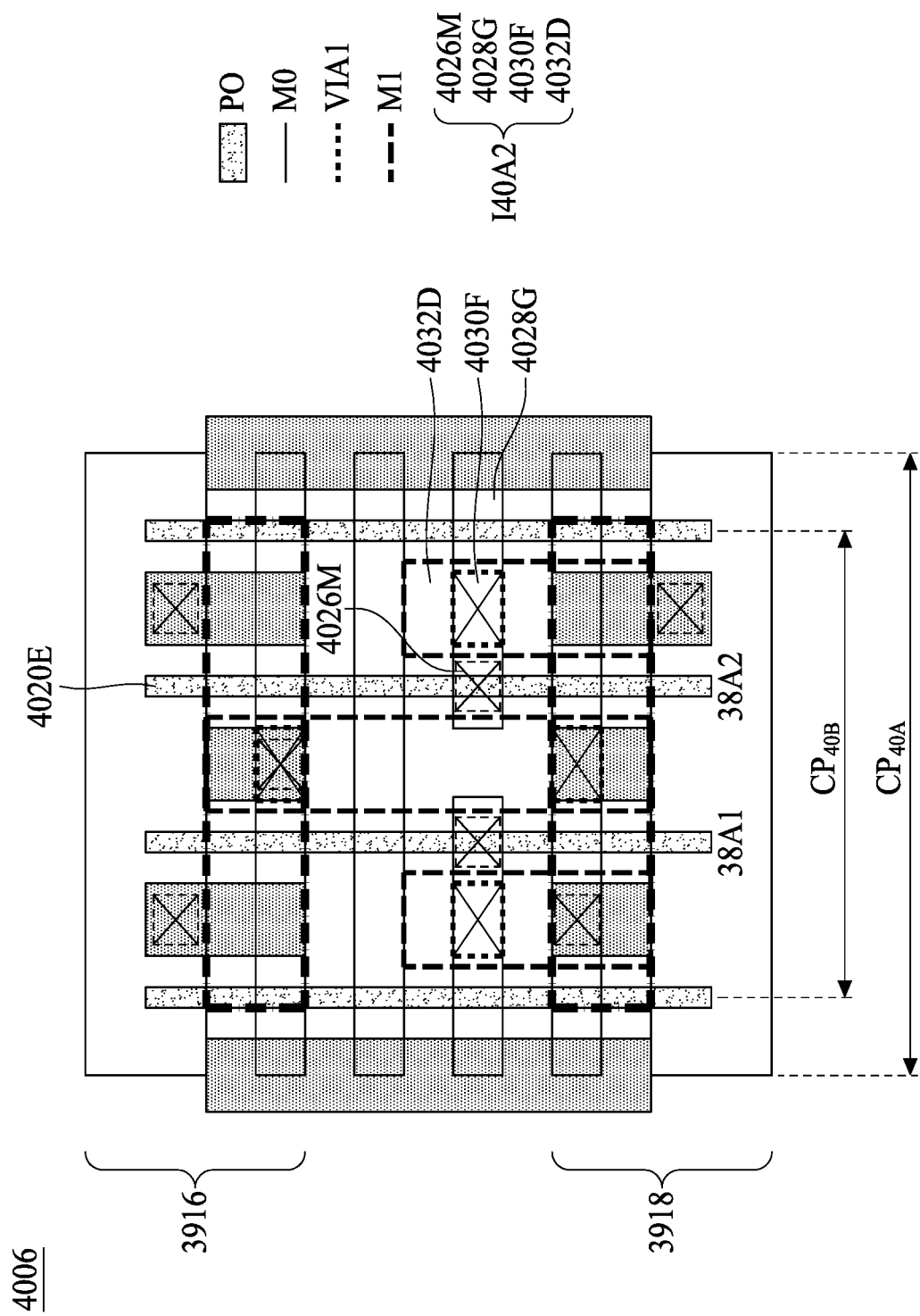
FIG. 40 is a diagram of a layout of ND2D1 gate in FIG. 38, in accordance with some embodiments.

FIG. 40 is a diagram of a layout 4006 of ND2D1 gate 3806 in FIG. 38, in accordance with some embodiments. The second cell layout in operation 206 further includes shapes in the layout 4006 for input pins (e.g. I40A2). The input pins (e.g. I40A2) correspond to the corresponding input pins (e.g. I38A2) in FIG. 38. Furthermore, a cell pitch $CP_{40A}$ of the layout 4006 of the ND2D gate 3806 is 4 MDPs.

For the input pins I38A1 and I38A2, the VIA0 layer, the effective M0 layer, the VIA1 layer and the M1 layer in the layout portion 4006 further includes shapes in addition to those in the layout portion 3906. For example, for the input pin I38A2, the VIA0 layer further includes a conductive via 4026M, the effective M0 layer further includes a conductive line 4028G, the VIA1 layer further includes a conductive via 4030F, and the M1 layer further includes a conductive line 4032D. The conductive via 4026M, the conductive line 4028G, the conductive via 4030F and the conductive line 4032D form the input pin I40A2 in FIG. 40. In this way, the input pins I38A1 and I38A2 can be non-selectively electrically coupled to other nodes in the design layout during, for example, the physical implementation stage 178 described with reference to FIG. 1.

In some embodiments, the layout 4006 has a dummy conductive line-bordered cell pitch $CP_{40A}$ of 4 MDPs. In other embodiments, the layout (not shown) does not include the dummy conductive lines of the layout 4006 which form borders of the cell pitch $CP_{40A}$ and has a dummy gate line-bordered cell pitch $CP_{40B}$ of 3 MDPs.

Figure 41:
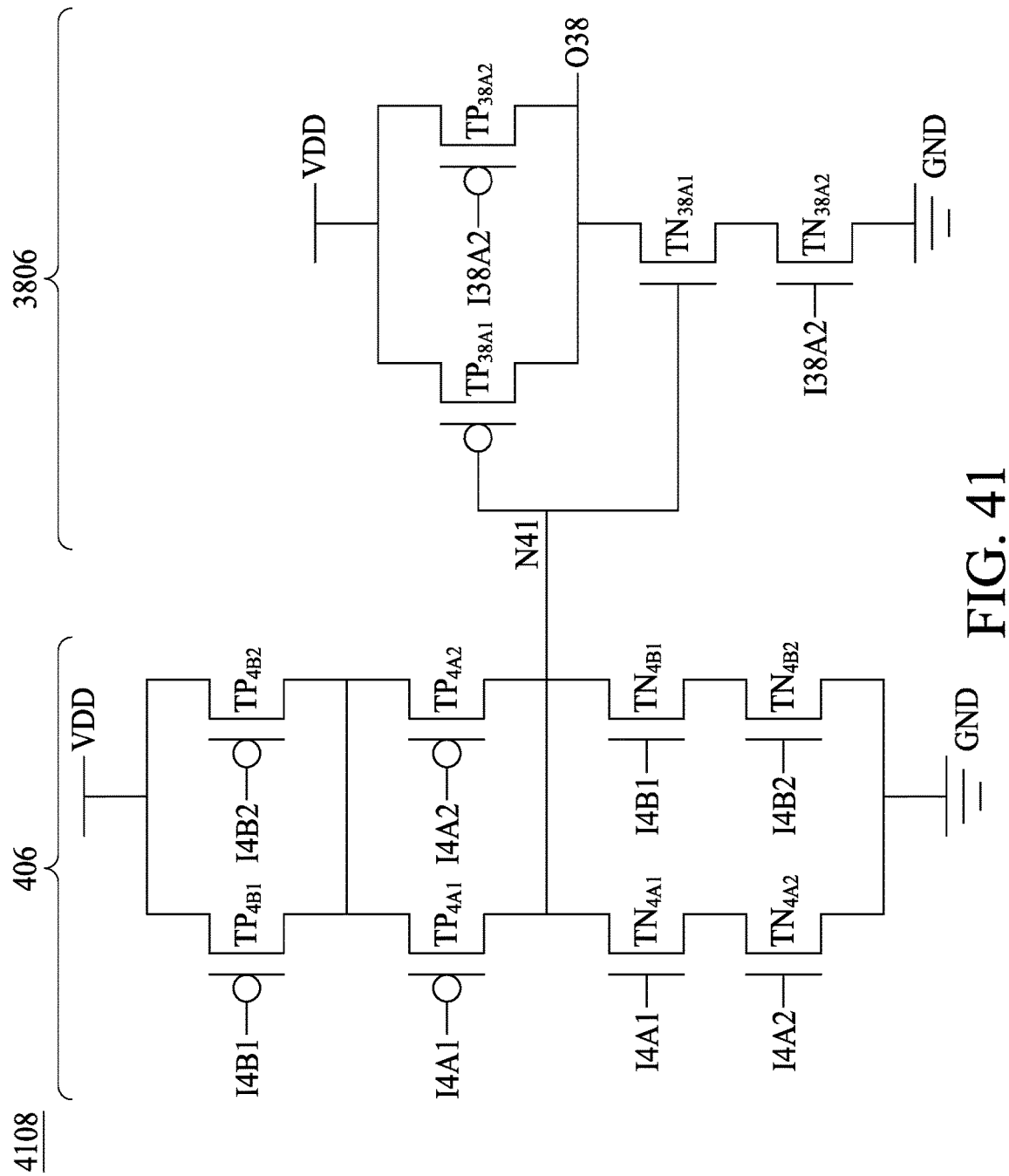
FIG. 41 is a schematic circuit diagram of combined AOI22D1 gate and ND2D1 gate, in accordance with some embodiments.

FIG. 41 is a schematic circuit diagram of combined AOI22D1 gate and ND2D1 gate 4108, in accordance with some embodiments. The combined AOI22D1 gate and ND2D1 gate 4108 corresponds to the third cell layout in operation 208. The combined AOI22D1 gate and ND2D1 gate 4108 includes the AOI22D1 gate 406 in FIG. 4 and the ND2D1 gate 3806 in FIG. 38. In the combined AOI22D1 gate and ND2D1 gate 4108, the output pin O4 in FIG. 4 is non-selectively electrically coupled to the gates of the PFET $TP_{38A1}$ and NFET $TN_{38A1}$ in FIG. 38 to form a node N41.

Figure 42:
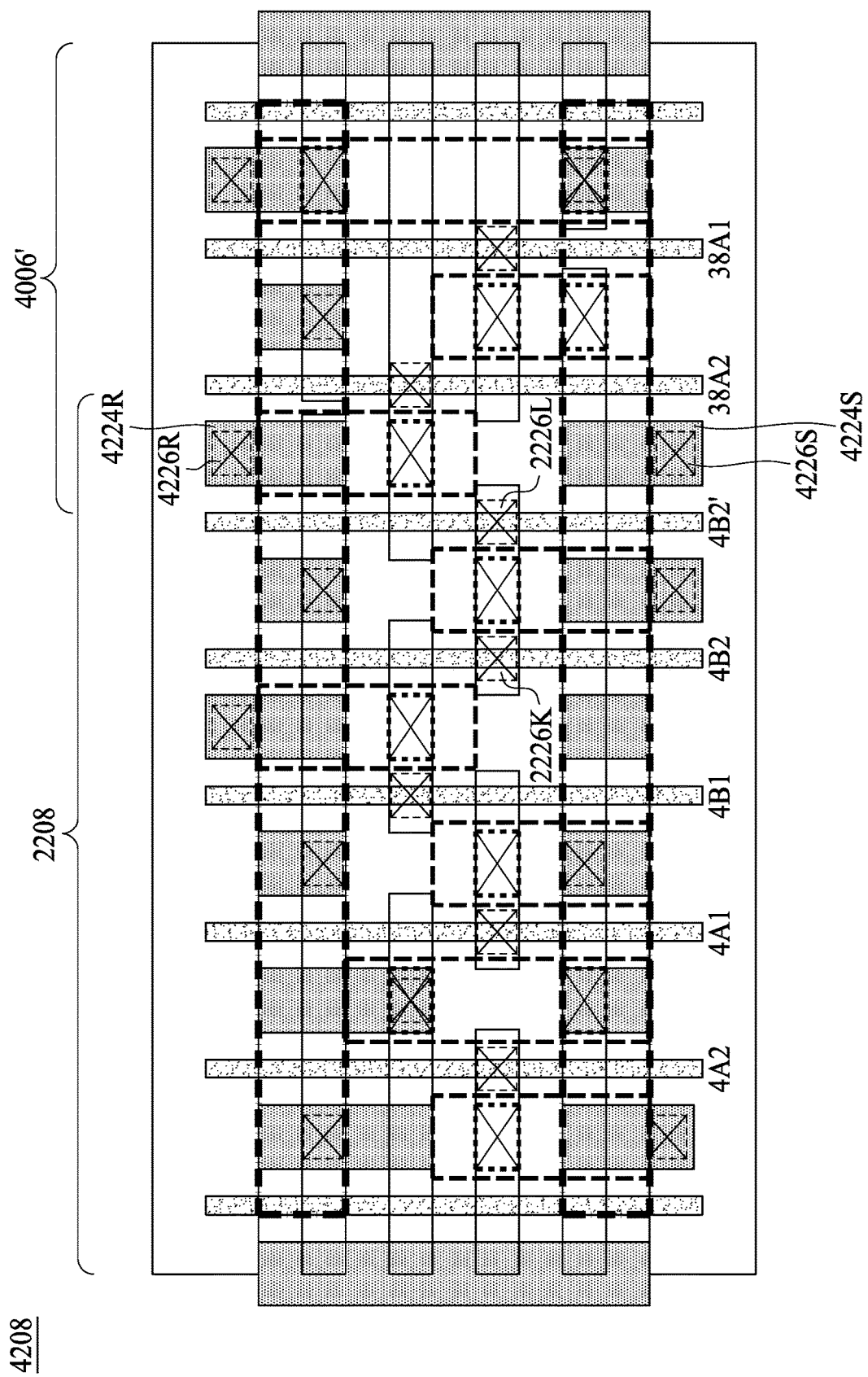
FIG. 42 is a diagram of a third cell layout with shared source or drain regions of the corresponding AOI22D1 gate and ND2D1 gate in FIG. 41 and shared source or drain regions of the corresponding AOI22D1 gate and ND2D1 gate in FIG. 41, in accordance with some embodiments.

In operation 208, the first cell layout 906 in FIG. 9 and the second cell layout 4006 in FIG. 40 are combined into a third cell layout 4208 in FIG. 42.

In operation 310 in FIG. 3, a first source or drain region 6TPL$_{4B2}$ (implicitly labeled in FIG. 6) of at least one first up transistor 516 in the first cell layout 906 and a second source or drain region 39TPR$_{38A2}$ (implicitly labeled in FIG. 39) of at least one second up transistor 3916 in the second cell layout 4006 are combined through adding a gate finger line, re-arranging and sharing to form the third cell layout 4208. In addition, in operation 310 in FIG. 3, a third source or drain region 6TNL$_{4B2}$ (implicitly labeled in FIG. 6) of the at least one first down transistor 518 in the first cell layout 906 and a fourth source or drain region 39TNR$_{38A2}$ (implicitly labeled in FIG. 39) of the at least one second down transistor 3916 in the second cell layout 4006 are combined through adding the gate finger line, re-arranging and sharing to form the third cell layout 4208. Adding the gate finger line for the first cell layout 906 has been described with reference to FIG. 22. Re-arranging for the second cell layout 4006 is to be described with reference to FIG. 42. Sharing is to be described with reference to FIG. 42.

FIG. 42 is a diagram of a third cell layout 4208 with shared source or drain regions 22TPR$_{4B2'}$ and 40TPL$_{38A2}$ of the corresponding AOI22D1 gate 406 and ND2D1 gate 3806 in FIG. 41 and shared source or drain regions 22TNR$_{4B2'}$ and 40TNL$_{38A2}$ of the corresponding AOI22D1 gate 406 and ND2D1 gate 3806 in FIG. 41, in accordance with some embodiments. The third cell layout 4208 in operation 208 includes overlapped layout portion 2208 and layout portion 4006'. The layout portion 4006' in the third cell layout 4208 is re-arranged into substantially a flipped layout of the layout 4006.

A source or drain region 22TPR$_{4B2'}$ non-selectively electrically coupled to the first source or drain region 6TPL$_{42}$ (implicitly labeled in FIG. 6) in the layout portion 2208 and the re-arranged second source or drain region 40TPL$_{38A2}$ in the layout portion 4006' are shared. A source or drain region 22TNR$_{4B2'}$ non-selectively electrically coupled to the third source or drain region 6TNL$_{4B2'}$ (implicitly labeled in FIG. 6) in the layout portion 2208 and the fourth source or drain region 40TNL$_{38A2}$ in the layout portion 4006' are shared.

In the layout 4208, a node corresponding to the node N41 in FIG. 41 and input pins corresponding to the input pins (e.g. I4B1) in FIG. 41 are shown but omitted to be described for being similar to, for example, the node N25 described with reference to FIG. 25, and the input pin I9B1 described with reference to FIG. 9.

Figure 43:
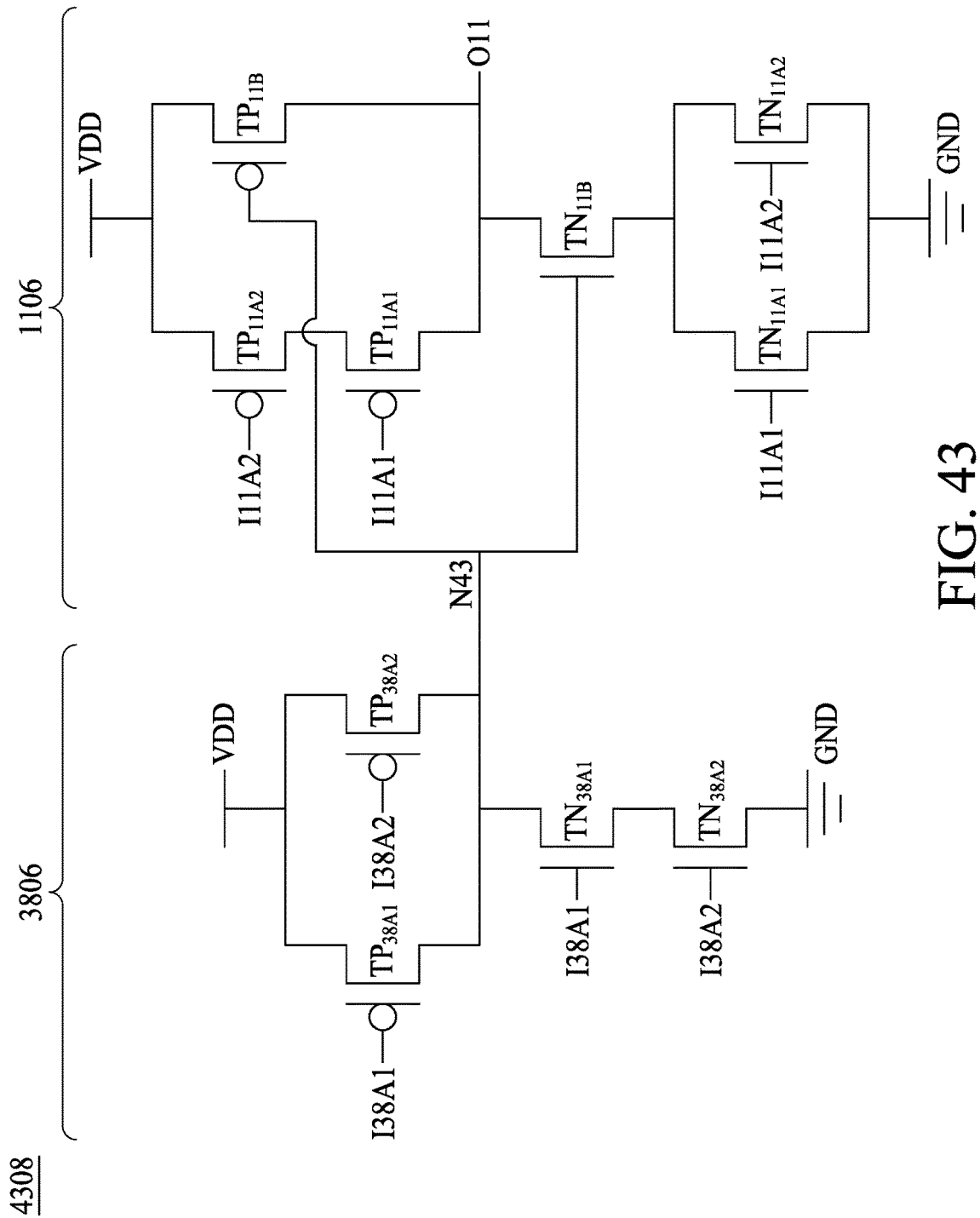
FIG. 43 is a schematic circuit diagram of combined ND2D1 gate and OAI21D1 gate, in accordance with some embodiments.

Another Combined Cell Layouts Through Joining to Joint Portion and Circuit Manufactured Based on the Same FIG. 43 is a schematic circuit diagram of combined ND2D1 gate and OAI21D1 gate 4308, in accordance with some embodiments. The combined ND2D1 gate and OAI21D1 gate 4308 corresponds to the third cell layout in operation 208. The combined ND2D1 gate and OAI21D1 gate 4308 includes the ND2D gate 3806 in FIG. 38 and the OAI21D1 gate in FIG. 11. In the combined ND2D1 gate and OAI21D1 gate 4308, the output pin O38 in FIG. 38 is non-selectively electrically coupled to the gates of the PFET TP$_{11B}$ and NFET TN$_{11B}$ in FIG. 11 to form a node N43.

Figure 44:
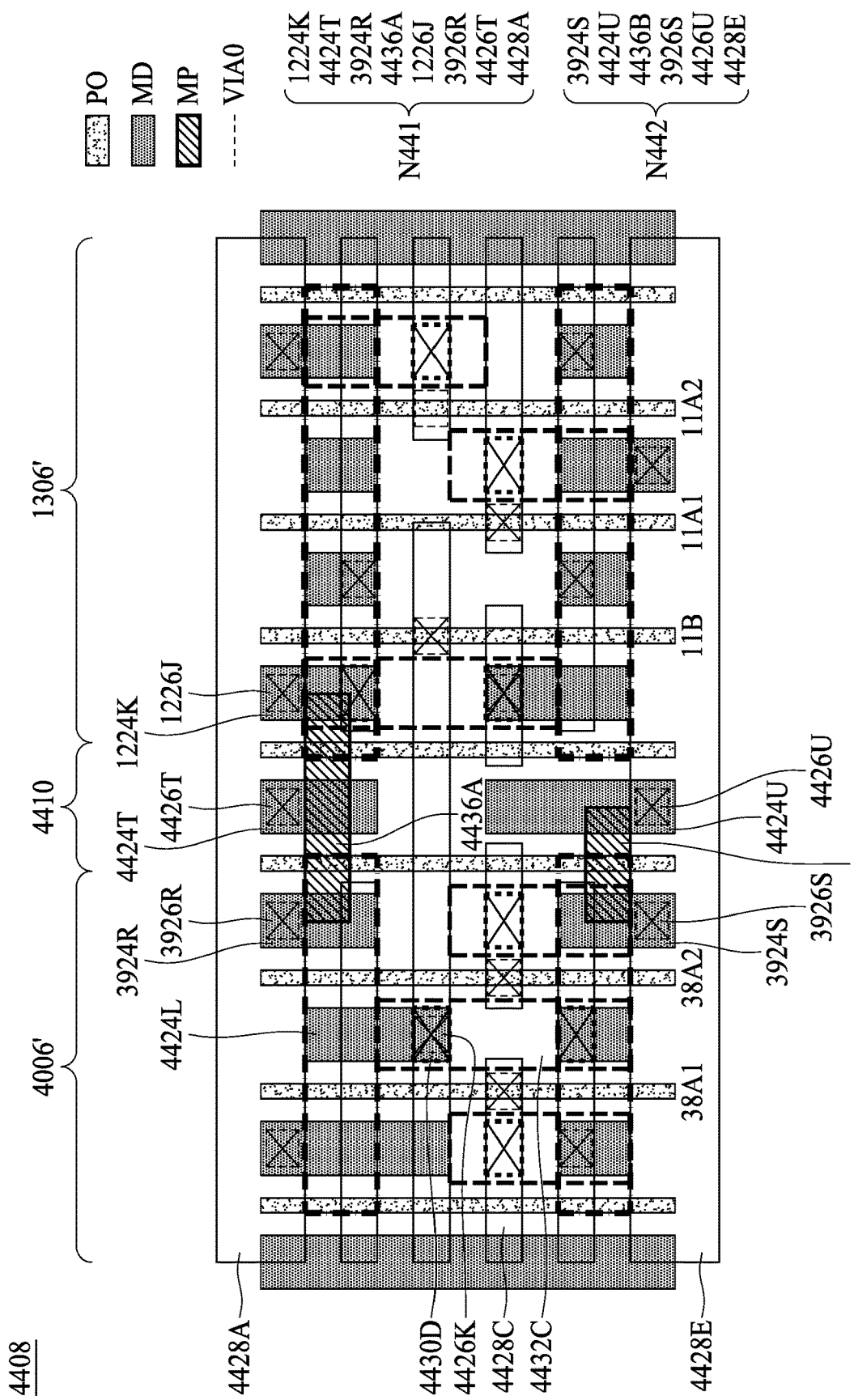
FIG. 44 is a diagram of a third cell layout with a joint portion for the ND2D1 gate and the OAI21D1 gate in the combined ND2D1 gate and OAI21D1 gate, in accordance with some embodiments.

In operation 208, the first cell layout 4006 in FIG. 40 and the second cell layout 1306 in FIG. 13 are combined into a third cell layout 4408 in FIG. 44.

In operation 310 in FIG. 3, a first source or drain region 40TPR$_{38A2}$ of at least one first up transistor 3916 in the first cell layout 4006 and a second source or drain region 12TPL$_{11B}$ (implicitly labeled in FIG. 12) of at least one second up transistor 1216 in the second cell layout 1306 are combined through re-arranging and joining to form the third cell layout 4408. In addition, in operation 310 in FIG. 3, a third source or drain region 40TNR$_{38A2}$ of the at least one first down transistor 3918 in the first cell layout 4006 and a fourth source or drain region 12TNL$_{11B}$ (implicitly labeled in FIG. 12) of the at least one second down transistor 1218 in the second cell layout 4006 are combined through re-arranging and joining to form the third cell layout 4408. Re-arranging and joining are to be described with reference to FIG. 44.

FIG. 44 is a diagram of a third cell layout 4408 with a joint portion 4410 for the ND2D1 gate 3806 and the OAI21D1 gate 1106 in the combined ND2D1 gate and OAI21D1 gate 4308, in accordance with some embodiments. The third cell layout 4408 in operation 208 includes the layout portion 4006', the layout portion 1306' and the joint portion 4410.

The layout 4006 in FIG. 40 based on the layout 3906 in FIG. 39 is re-arranged into the layout portion 4006' in FIG. 44. Compared to the output pin O39 in the layout portion 3906, a conductive line 4428C instead of the conductive line 3928B is used for directly non-selectively electrically coupled to a gate line 12TG$_{11B}$ (implicitly labeled in FIG. 12) and not to an input pin corresponding to the input pin I11B in FIG. 11. Associated with the conductive line 4428C, the conductive line 3924L, the conductive via 3926K, the conductive via 3930D and the conductive line 3932C in FIG. 39 are modified into a corresponding conductive line 4424L, conductive via 4426K, conductive via 4430D and conductive line 4432C in FIG. 44.

The layout portion 1306' is substantially the same layout as the layout 1306 in FIG. 13. The first source or drain region 39TPR$_{38A2}$ in the layout portion 4006' and the second source or drain region 12TPL$_{11B}$ in the layout portion 1306' are joined to a corresponding left side and right side of a joint portion 4410. The third source or drain region 39TNR$_{38A2}$ in the layout portion 4006' and the fourth source or drain region 12TNL$_{11B}$ in the layout portion 1306' are joined to the corresponding left side and right side of a joint portion 4410. The joint portion 4410 is substantially the same as the joint portion 1710 in FIG. 17 and are omitted to be described in detail here.

The third cell layout 4408 includes a node N441 and a node N442. Similar to the node N171 in FIG. 17, the node N441 includes conductive lines 1224K and 4424T and in the effective MD layer, a first segment of a conductive line 4436A in the MP layer, conductive vias 1226J and 4426T in the VIA0 layer and a higher power line 4428A in the M0 layer. The conductive line 1224K overlaps with the source or drain region 12TPL$_{11B}$. The conductive line 4424T resides in the joint portion 4410. Compared to the node N171 in FIG. 17, the node N441 further includes a conductive line 3924R in the effective MD layer, a second segment of a conductive line 4426A in the MP layer, and a conductive via 3926R in the VIA0 layer. The conductive line 3924R overlaps with the source or drain region 39TPR$_{38A2}$ and is non-selectively electrically coupled to the higher power line 4428A through the conductive via 3926R. The second segment of the conductive line 4426A directly connects the conductive lines 3924R and 4424T. Similar to the node N172 in FIG. 17, the node N442 includes conductive lines 3924S and 4424U in the effective MD layer, a conductive line 4436B in the MP layer, conductive vias 3926S and 4426U in the VIA0 layer and a lower power line 4428E in the effective M0 layer. The conductive line 3924S overlaps with the source or drain region 39TNR$_{38\_42}$. The conductive line 4424U resides in the joint portion 4410.

Figure 45:
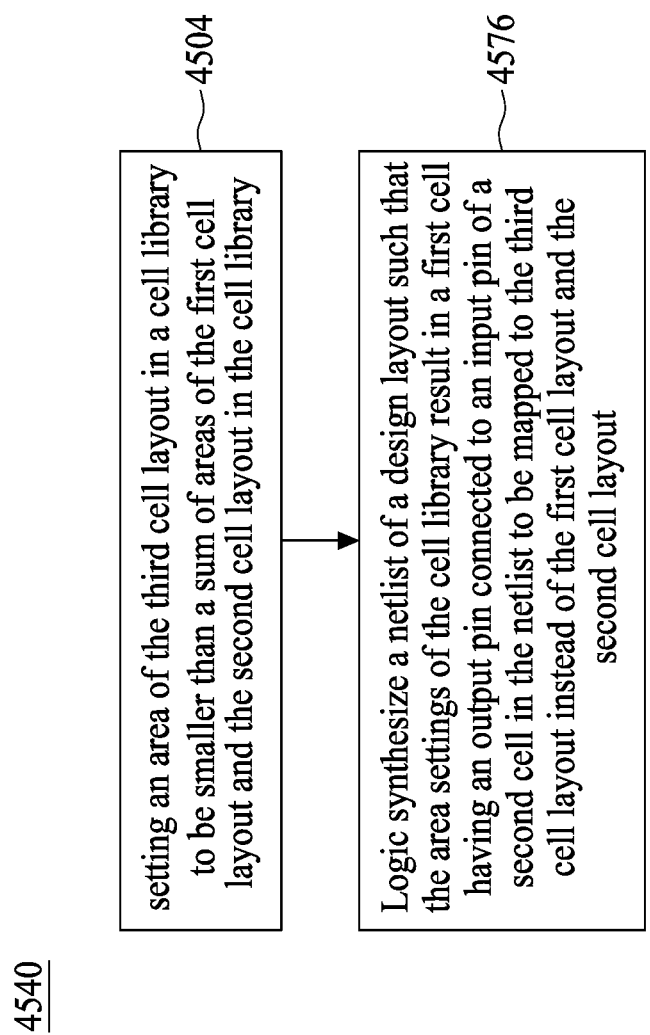
FIG. 45 is a flow chart of a method for using the third cell layout in operation 208 in FIG. 2 in the logic synthesis stage in FIG. 1, in accordance with some embodiments.

FIG. 45 is a flow chart of a method 4540 for using the third cell layout in operation 208 in FIG. 2 in the logic synthesis stage 176 in FIG. 1, in accordance with some embodiments. In operation 4504 performed during the cell characterizing stage 104 in FIG. 1, an area of the third cell layout in operation 208 in FIG. 2 in a cell library is set to be smaller than a sum of areas of the first cell layout and the second cell layout in operation 206 in FIG. 2 in the cell library. Examples of the first cell layout, second cell layout and third cell layout have been provided with respect to the corresponding FIG. 9, FIG. 13 and FIG. 20, the corresponding FIG. 9, FIG. 13 and FIG. 26, the corresponding FIG. 29, FIG. 32 and FIG. 37, the corresponding FIG. 9. FIG. 40 and FIG. 42, and the corresponding FIG. 40, FIG. 13 and FIG. 44. In operation 4576 performed during the logic synthesis stage 176 in FIG. 1, a netlist of a design layout is logic synthesized such that the area settings of the cell library result in a first cell having an output pin connected to an input pin of a second cell in the netlist to be mapped to the third cell layout instead of the first cell layout and the second cell layout. Examples of the first cell having an output pin connected to an input pin of a second cell are provided with respect to FIG. 14, FIG. 21, FIG. 33, FIG. 41 and FIG. 43.

By mapping the first cell and the second cell, of which corresponding output pin and input pin are connected by a node to the third cell layout which is prepared during the cell design stage 102 in FIG. 1, less pins are to be routed during the physical implementation stage 178 in FIG. 1. In this way, routing resources used for a node connecting the pins of the first cell and the second cell is saved. The wire length for the node and the via counts of the node may be reduced. Furthermore, when the first cell layout and the second cell layout are combined through sharing, such as that described with reference to FIGS. 27 to 37, the third cell layout has a smaller area compared to a sum of the areas of the first cell layout and the second cell layout. Therefore, an area of the design layout is reduced. In addition, the more instances of the first cell and the second cell of which corresponding output pin and input pin are connected by the node exist in the netlist, the more saving of the routing resource and reduction of the area of the design layout may be resulted from such mapping to the third cell layout.

Figure 46:
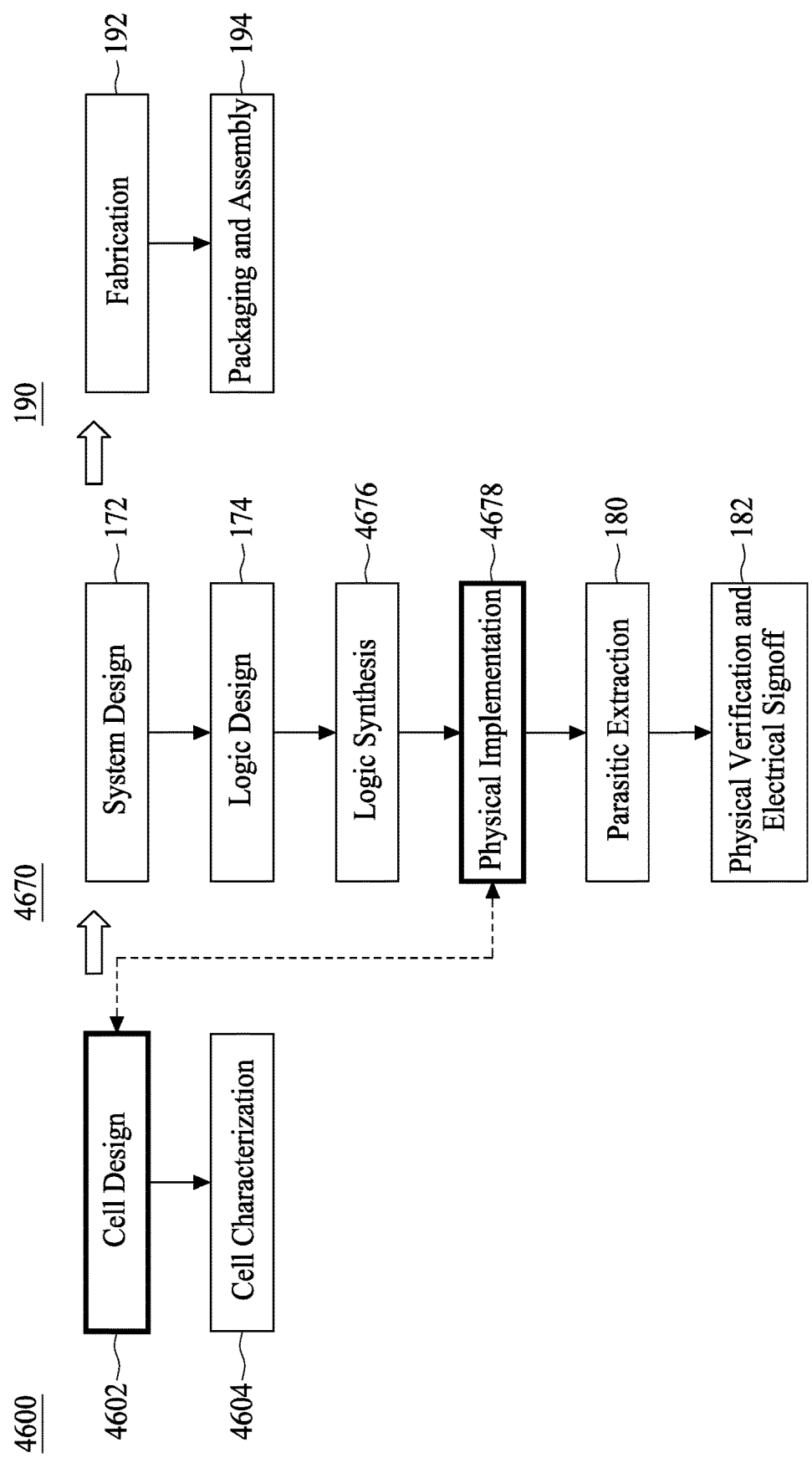
FIG. 46 is a flow chart of a cell design flow, a chip design flow and a chip manufacturing flow of an integrated circuit (IC) chip in accordance with some embodiments.

Comined Cells Layouts Generated and Used
During Physical Implementation Stage and Circuit
Manufactured Based on the Same FIG. 46 is a flow chart of a cell design flow 4600, a chip design flow 4670 and a chip manufacturing flow 190 of an integrated circuit (IC) chip in accordance with some embodiments. Compared to the cell design flow 100 in FIG. 1, the combined cell layouts are generated during a cell design stage 4602 which is re-visited after placement in the physical implementation stage 4678. Compared to the chip design flow 170 in FIG. 1, the combined cell layouts are used after placement in the physical implementation stage 4678 through swapping of placed non-combined cell layouts with the combined cell layouts. In this way, the combined cell layouts are used during the physical implementation stage 4678 without through the cell characterization stage 4504 and the logic synthesis stage 4676.

Figure 47:
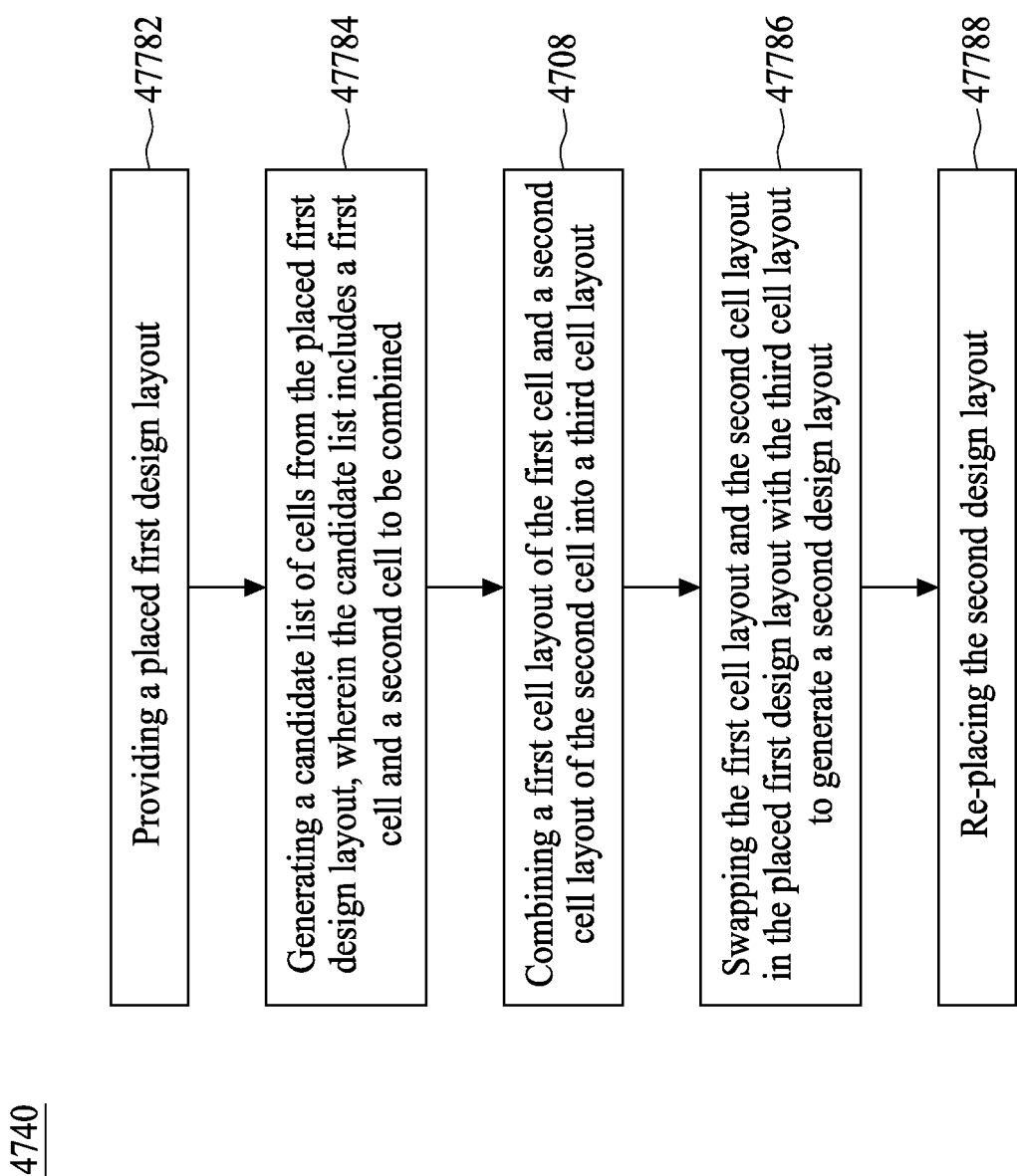
FIG. 47 is a flow chart of a method for using the third cell layout in operation 208 in FIG. 2 in the physical implementation stage in FIG. 46, in accordance with some embodiments.

FIG. 47 is a flow chart of a method 4740 for using the third cell layout in operation 208 in FIG. 2 in the physical implementation stage 4678 in FIG. 46, in accordance with some embodiments. In operation 47782 performed during the physical implementation stage 4678, a placed first design layout is provided. In operation 47784 performed during the physical implementation stage 4678, a candidate list of cells is generated from the placed first design layout, wherein the candidate list includes a first cell and a second cell to be combined. In operation 4708 performed during the cell design stage 4602, a first cell layout of the first cell and a second cell layout of the second cell are combined into a third cell layout. In operation 47786 performed during the physical implementation stage 4678, the first cell layout and the second cell layout in the first design layout are swapped with the third cell layout to generate a second design layout. In operation 47788 performed during the physical implementation stage 4678, the second design layout is replaced.

Figure 48:
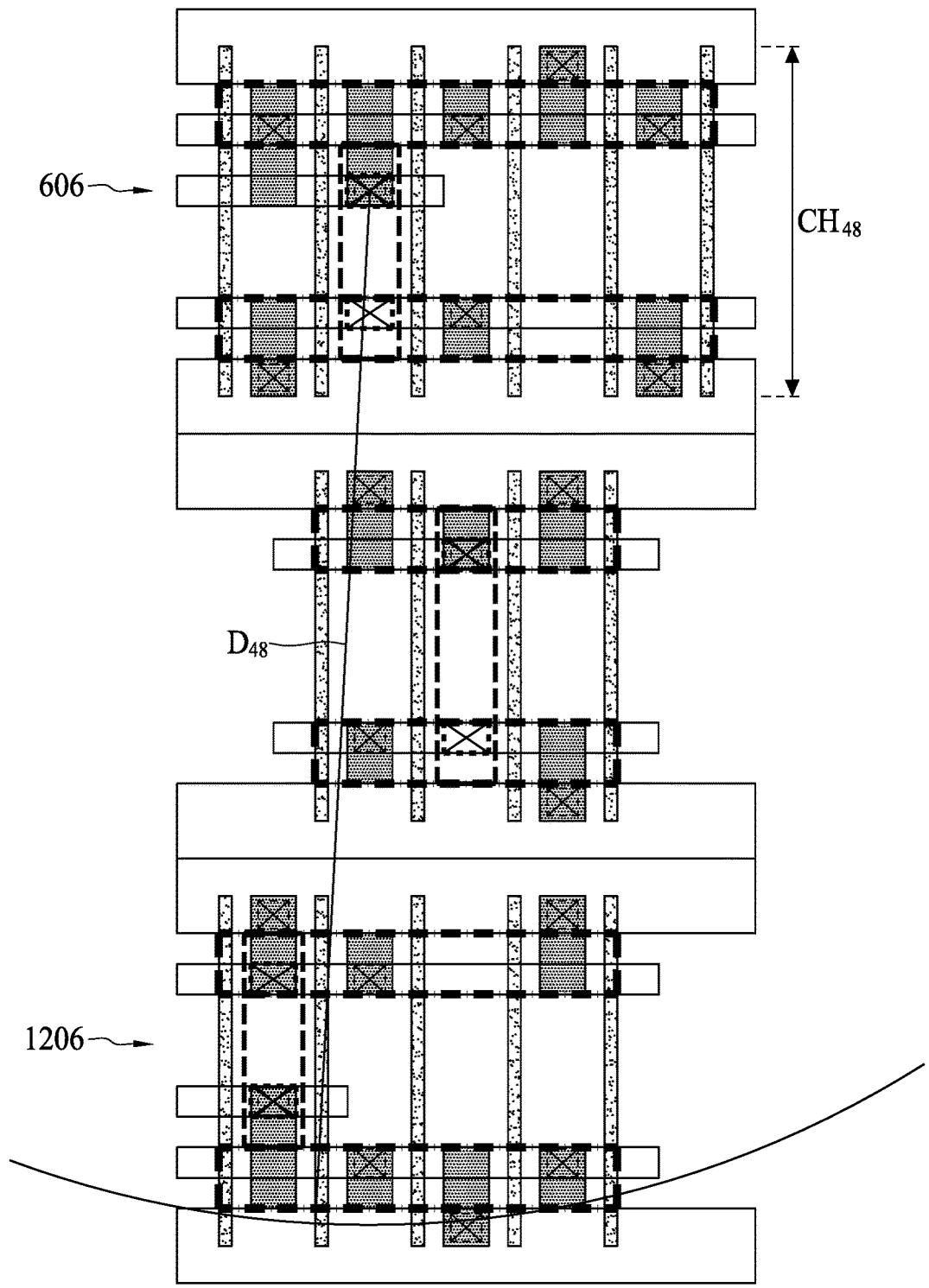
FIG. 48 is a diagram of a placed first design layout in operation in FIG. 47, in accordance with some embodiments.

FIG. 48 is a diagram of a placed first design layout 48784 in operation 47782 in FIG. 47, in accordance with some embodiments. In operation 47784, a candidate list of cells is generated from the placed first design layout 48784. The candidate list is a list of pairs of first cell and second cell to be combined based on following criteria illustrated using an example in FIGS. 4 to 20. The first cell 406 in FIG. 4 has an output pin O4 in FIG. 4 to be non-selectively electrically coupled to an input pin I11B in FIG. 11 of the second cell 1106 in FIG. 12. In some embodiments, the output pin O4 of the first cell 406 is to be non-selective electrically coupled to the input pin 11B of the second cell 1106 in a two-pin net. Furthermore, in some embodiments, in the placed first design layout 48784, the second cell layout 1206 is in a neighborhood of the first cell layout 606. In some embodiments, a gate line 12TG$_{11B}$ of the second cell layout 1206 to be connected to the output pin O6 of the first cell layout 606 is within the neighborhood of the first cell layout 606. The neighborhood of the first cell layout 606 is a circle having a center in the first cell layout 606 and a radius D$_{48}$. In some embodiments, the center is located at a geometric center of the conductive line 632A in FIG. 6. In other embodiments, the center is located at a geometric center of the first cell layout 606. In some embodiments, the radius D$_{48}$ is 1-5 times of a cell height CH$_{48}$ of the first cell layout 606. In some embodiments, the radius D$_{48}$ is 2-3 times of the cell height CH$_{48}$. When the radius D$_{48}$ is larger, combing the first cell 406 and the second cell 1106 may result in interconnects of other nets associated with other pins of the first cell 406 and the second cell 1106 to be lengthened. The operation 4708 is substantially the same as the operation 208 in FIG. 2 and is omitted to be described here.

Figure 49:
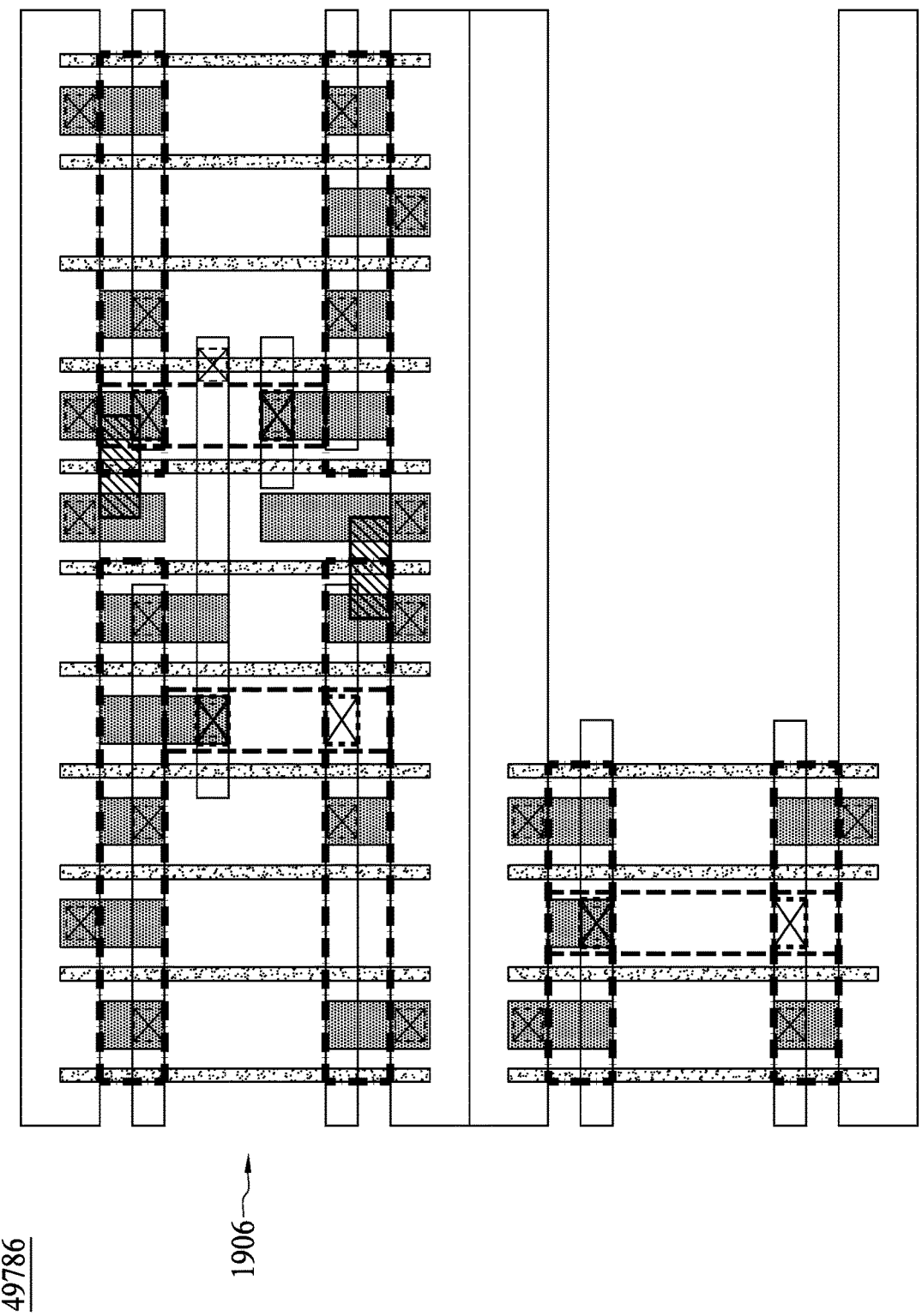
FIG. 49 is a second design layout in operation, in accordance with some embodiments.

FIG. 49 is a second design layout 49786 in operation 47786, in accordance with some embodiments. In operation 47786, the first cell layout 606 and the second cell layout 1206 in the first design layout 48784 are swapped with the third cell layout 1908 in FIG. 19 to generate a second design layout 49786. In operation 47788, the second design layout 49786 is re-placed so that overlapping of the third cell layout 1908 with other cell layouts adjacent to the first cell layout 606 in the placed first design layout 48784 is fixed.

By swapping the first cell layout 606 and the second cell layout 1206 in the placed first design layout with the third cell layout 1906, less pins are to be routed during the physical implementation stage 4678 in FIG. 46. In this way, routing resources used for a node N19 connecting the pin O6 of the first cell layout 606 and the input pin I13B of the second cell layout 1206 is saved. The wire length for the node N19 and the via counts of the node N19 may be reduced. In addition, the more instances of the first cell layout 606 and the second cell layout 1206 of which corresponding output pin O6 and input pin I13B are to be non-selectively electrically coupled in the placed first design layout 48784, the more saving of the routing resource may be resulted from such swapping for the third cell layout 1906.

Furthermore, when the first cell layout 2806 in FIG. 28 and the second cell layout 3106 in FIG. 31 are combined through sharing, the third cell layout 3608 in FIG. 36 has a smaller area compared to a sum of the areas of the first cell layout 2806 and the second cell layout 3106. Therefore, an area of a design layout (not shown) which is the re-placed second design layout (not shown) is reduced. In addition, the more instances of the first cell layout 2806 and the second cell layout 3106 of which corresponding output pin O28 and input pin I32B3 are to be non-selectively electrically coupled in the placed first design layout (not shown), the more reduction of the area of the design layout may be resulted from such swapping for the third cell layout 3608.

Figure 50:
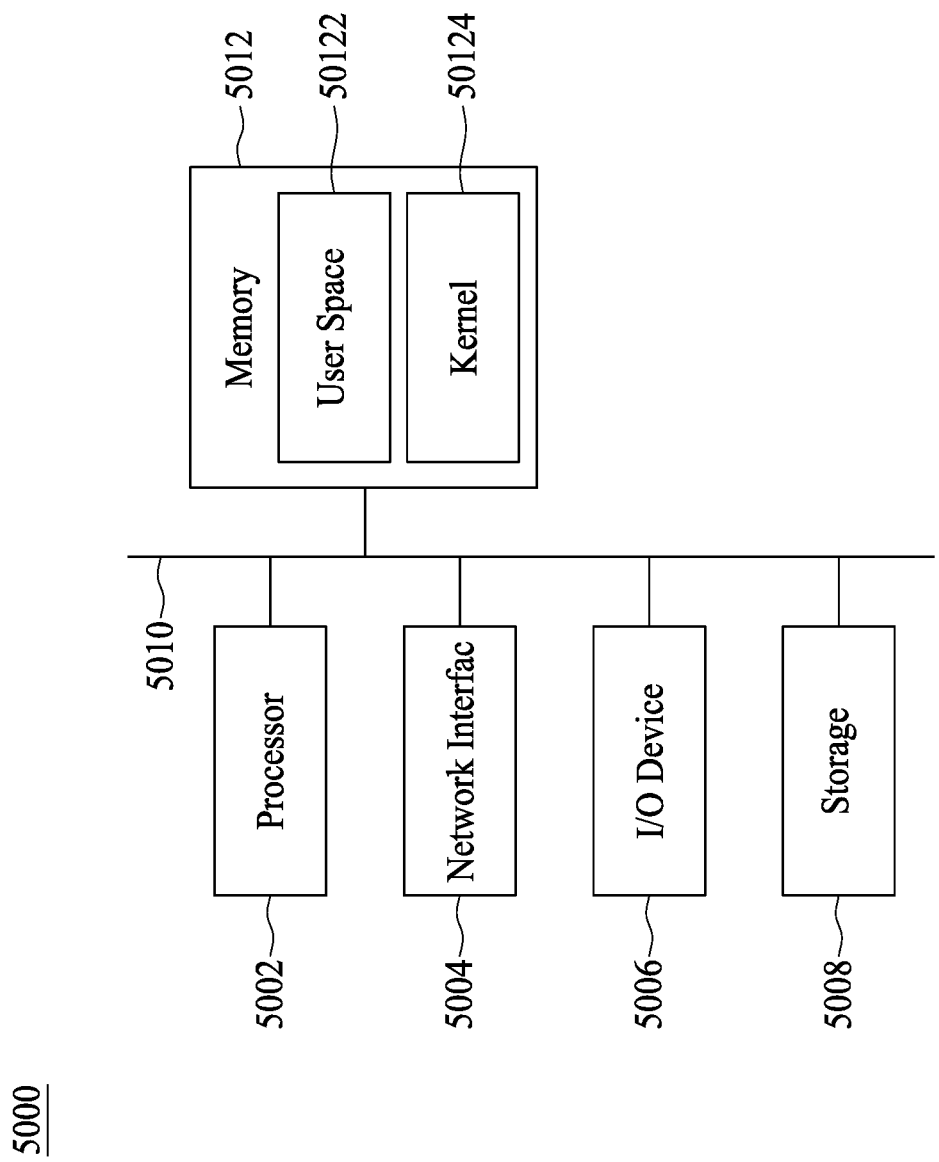
FIG. 50 is a block diagram of a hardware system for implementing the method embodiments described with reference to FIGS. 1 to 49, in accordance with some embodiments.

FIG. 50 is a block diagram of a hardware system 5000 for implementing the method embodiments described with reference to FIGS. 1 to 49, in accordance with some embodiments. The system 5000 includes at least one processor 5002, a network interface 5004, an input and output (I/O) device 5006, a storage 5008, a memory 5012, and a bus 5010. The bus 5010 couples the network interface 5004, the I/O device 5006, the storage 5008 and the memory 5012 to the processor 5002.

In some embodiments, the memory 5012 comprises a random access memory (RAM) and/or other volatile storage device and/or read only memory (ROM) and/or other non-volatile storage device. The memory 5012 includes a kernel 50124 and user space 50122, configured to store program instructions to be executed by the processor 5002 and data accessed by the program instructions.

In some embodiments, the network interface 5004 is configured to access program instructions and data accessed by the program instructions stored remotely through a network. The I/O device 5006 includes an input device and an output device configured for enabling user interaction with the system 5000. The input device comprises, for example, a keyboard, a mouse, etc. The output device comprises, for example, a display, a printer, etc. The storage device 5008 is configured for storing program instructions and data accessed by the program instructions. The storage device 5008 comprises, for example, a magnetic disk and an optical disk.

In some embodiments, when executing the program instructions, the processor 5002 is configured to perform methods described with reference to FIGS. 1-49.

In some embodiments, the program instructions are stored in a non-transitory computer readable recording medium such as one or more optical disks, hard disks and non-volatile memory devices.

Some embodiments have one or a combination of the following features and/or advantages. In some embodiments, a circuit includes combined cells. The combined cells includes a first source or drain region combined with a second source or drain region. The first source or drain region belongs to one of at least one first up transistor and at least one first down transistor. The second source or drain region belongs to one of at least one second up transistor and at least one second down transistor and is of the same conductivity type as the first source or drain region. In some embodiments, the first source or drain region and the second source or drain region are combined through joining to a joint portion. A node including parallel coupled first and second conductive lines overlapped with the joint portion and through which one of the first and second source or drain regions is non-selectively electrically coupled to a power line enhances performance of the combined cells. In other embodiments, the first and second source or drain regions are combined through joining to gate line. A node including parallel coupled first and conductive lines overlapping with the first and second source or drain regions and through which the first and source or drain regions are non-selectively electrically coupled to the power line enhances performance of the combined cells. In still other embodiments, the first and second source or drain regions are combined through sharing. The shared first and second source or drain regions rendering area of the combined cells being reduced. In some embodiments, a method for generating a design layout using a layout of the combined cells includes generating the layout of the combined cells and mapping cells in a netlist of the design layout to the layout of the combined cells during logic synthesis of the netlist. In other embodiments, a method for generating a design layout using a layout of the combined cells include generating the layout of the combined cells and swapping cell layouts in the design layout with the layout of the combined cell during placement of the design layout. In this way, less pins need to be routed during routing of the design layout. Therefore, routing resources are saved, wire lengths and via counts of the design layout are reduced.

In some embodiments, a circuit includes a higher power line and a lower power line, a first node, at least one first up transistor, at least one first down transistor, a second node, at least one second up transistor, at least one second down transistor and a third node. The at least one first up transistor is formed to electrically couple the first node to the higher power line. The at least one first down transistor is formed to electrically couple the first node to the lower power line. The second node is electrically isolated from the first node. The at least one second up transistor is formed to electrically couple the second node to the higher power line. The at least one second down transistor is formed to electrically couple the second node the lower power line. A first source or drain region of one of the at least one first up transistor and the at least one first down transistor is combined with a second source or drain region of one of the at least one second up transistor and the at least one second down transistor and is of a same conductivity type as the first source or drain region. The at least one second up transistor and the at least one second down transistor includes a first gate line non-selectively electrically coupled to the first node. The third node includes a first conductive line and a second conductive line. The first conductive line is overlapped with one of the first source or drain region and the second source or drain region and non-selectively electrically coupled to the one of the first source or drain region and the second source or drain region and to one of the higher power line and lower power line corresponding to the one of the first source or drain region and the second source or drain region. The second conductive line is in substantially the same direction as the first conductive line and non-selectively electrically coupled to the one of the higher power line and the lower power line.

In some embodiments, in a method, a first cell layout and a second cell layout are provided. The first cell layout includes a first higher power line and a first lower power line, a first output pin, at least one first up transistor and at least one first down transistor. The at least one first up transistor is formed to electrically couple the first output pin to the first higher power line. The at least one first down transistor is formed to electrically couple the first output pin to the first lower power line. The second cell layout includes a second higher power line and a second lower power line, a second output pin, at least one second up transistor, at least one second down transistor. The at least one second up transistor is formed to electrically couple the second output pin to the second higher power line. The at least one second down transistor is formed to electrically couple the second output pin to the second lower power line. The at least one second up transistor and the at least one second down transistor include a first gate line. The first cell layout and the second cell layout are combined into a third cell layout. The combing includes non-selectively electrically coupling the first gate line to the first output pin to form a first node. A design layout in which the third cell layout is used at different locations is generated by at least one processor.

In some embodiments, in a method, a first cell layout and a second cell layout are provided. The first cell layout includes a first higher power line and a first lower power line, a first output pin, at least one first up transistor and at least one first down transistor. The at least one first up transistor is formed to electrically couple the first output pin to the first higher power line. The at least one first down transistor is formed to electrically couple the first output pin to the first lower power line. The second cell layout includes a second higher power line and a second lower power line, a second output pin, at least one second up transistor, at least one second down transistor. The at least one second up transistor is formed to electrically couple the second output pin to the second higher power line. The at least one second down transistor is formed to electrically couple the second output pin to the second lower power line. The at least one second up transistor and the at least one second down transistor include a first gate line. The first cell layout and the second cell layout are combined into a third cell layout. The combing includes non-selectively electrically coupling the first gate line to the first output pin to form a first node. A design layout in which the third cell layout is used is generated by at least one processor. An integrated circuit chip is manufactured based on the design layout.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method of forming an integrated circuit, comprising:
   providing a first design layout having a first cell layout and a second cell layout using electronic design automation software;
   the step of providing the first cell layout comprising forming:
      a first higher power line and a first lower power line;
      a first output pin;
      at least one first up transistor formed to electrically couple the first output pin to the first higher power line; and
      at least one first down transistor formed to electrically couple the first output pin to the first lower power line;
   the step of providing the second cell layout comprising forming:
      a second higher power line and a second lower power line;
      a second output pin;
      at least one second up transistor formed to electrically couple the second output pin to the second higher power line;
      at least one second down transistor formed to electrically couple the second output pin to the second lower power line;
      the at least one second up transistor and the at least one second down transistor comprising a first gate line;
   generating a third cell layout according to the first cell layout and the second cell layout using the electronic design automation software, comprising:
      non-selectively electrically coupling the first gate line to the first output pin to form a first node; and
   generating a second design layout by replacing the first cell layout and the second cell layout in the first design layout with the third cell layout using the electronic design automation software; and
   generating a netlist for fabricating the integrated circuit according to the second design layout using the electronic design automation software to minimize at least one of routing resources, wire lengths, via counts and layout area required for fabricating the integrated circuit;
   wherein the step of generating of the third cell layout further comprises:
      combining a first source or drain region of one of the at least one first up transistor and the at least one first down transistor with a second source or drain region of one of the at least one second up transistor and the at least one second down transistor of a same conductivity type as the first source or drain region,
      during the combining, the first higher power line and the second higher power line being combined into a higher power line and the first lower power line and second lower power line being combined into a lower power line; and
      forming a second node by forming: a first conductive line overlapped with one of the first source or drain region and the second source or drain region and non-selectively electrically coupled to the one of the first source or drain region and the second source or drain region and to one of the higher power line and lower power line corresponding to the one of the first source or drain region and the second source or drain region, and a second conductive line in substantially the same direction as the first conductive line and non-selectively electrically coupled to the one of the higher power line and the lower power line; and
      forming a plurality of gate finger lines non-selectively electrically coupled to each other, one of the plurality of gate finger lines being adjacent to the one of the first source or drain region and the second source or drain region so as to enable forming of the second node; and
   wherein the first source or drain region and the second source or drain region are combined through joining, the first source or drain region and the second source or drain region are joined to opposite sides of a second gate line, and the second conductive line overlaps with the other of the first source or drain region and the second source or drain region.

2. The method of claim 1, wherein the generating the third cell layout further comprises:
reordering a plurality of transistors in series in one of the at least one first up transistor, the at least one second up transistor, the at least one first down transistor and the at least one second down transistor corresponding to the one of the first source or drain region and the second source or drain region so as to enable the forming of the second node.

3. The method of claim 1, wherein
the first source or drain region and the second source or drain region are combined through joining;
the first source or drain region and the second source or drain region are joined to opposite sides of a joint portion; and
the second conductive line resides in the joint portion.

4. The method of claim 1, wherein
the first second source or drain region and the second source or drain region are combined through sharing with each other;
the second conductive line overlaps with the other of the first source or drain region and the second source or drain region and is shared with the first conductive line.

5. The method of claim 1, wherein
the generating the second design layout comprises:
setting an area of the third cell layout in a cell library to be smaller than a sum of areas of the first cell layout and the second cell layout in the cell library; and
logic synthesizing a netlist of the design layout using the cell library.

6. The method of claim 1, further comprising:
placing the first design layout by forming:
the first cell layout; and
the second cell layout;
the first output pin being to be routed to the first gate line;
the generating the second design layout comprises:
swapping the first cell layout and the second cell layout in the first design layout with the third cell layout to generate the second design layout.

7. The method of claim 6, further comprising:
selecting the first cell layout and the second cell layout in the first design layout for the swapping based on a distance between the first output pin of the first cell layout and the first gate line of the second cell layout being within a range of about 1-5 times of a cell height of the first cell layout.

8. The method of claim 6, further comprising:
selecting the first cell layout and the second cell layout in the first design layout for the swapping based on the first output pin and the first gate line correspond to end points in a two-pin net in a netlist corresponding to the first design layout.

* * * * *